(12) United States Patent
Yamazaki et al.

(10) Patent No.: US 12,482,293 B2
(45) Date of Patent: Nov. 25, 2025

(54) ELECTRONIC DEVICE AND AUTHENTICATION METHOD FOR ELECTRONIC DEVICE

(71) Applicant: Semiconductor Energy Laboratory Co., Ltd., Atsugi (JP)

(72) Inventors: Shunpei Yamazaki, Setagaya (JP); Koji Kusunoki, Isehara (JP); Daisuke Kubota, Atsugi (JP); Ryo Hatsumi, Hadano (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 0 days.

(21) Appl. No.: 18/809,758

(22) Filed: Aug. 20, 2024

(65) Prior Publication Data

US 2024/0412552 A1    Dec. 12, 2024

Related U.S. Application Data

(63) Continuation of application No. 17/923,282, filed as application No. PCT/IB2021/055198 on Jun. 14, 2021, now Pat. No. 12,073,651.

(30) Foreign Application Priority Data

Jun. 26, 2020 (JP) .................................. 2020-110545

(51) Int. Cl.
*G06V 40/13* (2022.01)
*G06F 3/042* (2006.01)
(Continued)

(52) U.S. Cl.
CPC .......... *G06V 40/1318* (2022.01); *G06F 3/042* (2013.01); *G06V 40/15* (2022.01); *G06F 1/163* (2013.01)

(58) Field of Classification Search
None
See application file for complete search history.

(56) References Cited

U.S. PATENT DOCUMENTS 10,075,616 B2   9/2018   Morita
10,657,347 B2   5/2020   Zhang et al.
(Continued)

FOREIGN PATENT DOCUMENTS

CN   107220012 A   9/2017
CN   110058719 A   7/2019
(Continued)

OTHER PUBLICATIONS

International Search Report (Application No. PCT/IB2021/055198) Dated Aug. 10, 2021.
(Continued)

*Primary Examiner* — Joseph R Haley
(74) *Attorney, Agent, or Firm* — Eric J. Robinson; Robinson Intellectual Property Law Office, P.C.

(57) ABSTRACT

An electronic device having an authentication method with a high security level is provided. The electronic device includes a pixel portion, a sensor portion, an authentication portion, and a housing. The pixel portion includes a display element and a light-receiving element. The pixel portion has a function of turning on the display element. The pixel portion has a function of obtaining authentication information by capturing an image of a target object touching the pixel portion. The sensor portion has a function of detecting attachment or detachment to a living body or an object. The authentication portion has a function of performing authentication processing with the use of the authentication information. The housing includes a first surface and a second surface opposite to the first surface. The pixel portion is
(Continued)

positioned on the first surface and the sensor portion is positioned on the second surface.

15 Claims, 35 Drawing Sheets

(51) Int. Cl.
*G06V 40/10* (2022.01)
*G06F 1/16* (2006.01)

(56) References Cited

U.S. PATENT DOCUMENTS

| | | |
|---|---|---|
| 10,671,829 B2 | 6/2020 | Lee et al. |
| 11,393,257 B2 | 7/2022 | Wang et al. |
| 12,073,651 B2 | 8/2024 | Yamazaki et al. |
| 12,096,659 B2 | 9/2024 | Kamada et al. |
| 2013/0214279 A1 | 8/2013 | Nishimura et al. |
| 2014/0056493 A1 | 2/2014 | Gozzini |
| 2015/0019873 A1 | 1/2015 | Hagemann |
| 2015/0138699 A1 | 5/2015 | Yamazaki |
| 2015/0261254 A1 | 9/2015 | Hiroki et al. |
| 2016/0109852 A1 | 4/2016 | Kuwabara et al. |
| 2016/0125677 A1 | 5/2016 | Williams et al. |
| 2016/0157372 A1 | 6/2016 | Hiroki |
| 2016/0283703 A1 | 9/2016 | Allyn |
| 2017/0032168 A1* | 2/2017 | Kim ............... H04L 63/0861 |
| 2017/0280018 A1 | 9/2017 | Morita |
| 2017/0309752 A1 | 10/2017 | Yamazaki et al. |
| 2018/0129831 A1 | 5/2018 | Yokoi et al. |
| 2018/0225669 A1 | 8/2018 | Choi et al. |
| 2018/0268232 A1 | 9/2018 | Kim et al. |
| 2020/0401828 A1 | 12/2020 | Wang et al. |
| 2021/0066669 A1 | 3/2021 | Kubota et al. |
| 2021/0096678 A1 | 4/2021 | Kubota et al. |
| 2021/0110130 A1 | 4/2021 | Kim et al. |
| 2022/0037406 A1 | 2/2022 | Kubota et al. |
| 2022/0057873 A1 | 2/2022 | Kubota et al. |
| 2022/0059619 A1 | 2/2022 | Kubota et al. |
| 2022/0068181 A1 | 3/2022 | Watanabe et al. |
| 2023/0237831 A1 | 7/2023 | Yamazaki et al. |
| 2024/0397755 A1 | 11/2024 | Kamada et al. |

FOREIGN PATENT DOCUMENTS

| | | |
|---|---|---|
| CN | 111886570 A | 11/2020 |
| EP | 3407177 A | 11/2018 |
| EP | 3754477 A | 12/2020 |
| JP | 2002-318904 A | 10/2002 |
| JP | 2017-173943 A | 9/2017 |
| JP | 2020-042404 A | 3/2020 |
| TW | 201901523 | 1/2019 |
| WO | WO-2017/052727 | 3/2017 |
| WO | WO-2017/085598 | 5/2017 |
| WO | WO-2018/214600 | 11/2018 |
| WO | WO-2019/159500 | 8/2019 |
| WO | WO-2020/053692 | 3/2020 |
| WO | WO-2021/260483 | 12/2021 |

OTHER PUBLICATIONS

Written Opinion (Application No. PCT/IB2021/055198) Dated Aug. 10, 2021.
Taiwanese Office Action (Application No. 110121817) Dated Jun. 4, 2025.

* cited by examiner 475
472
405 406

477

451b

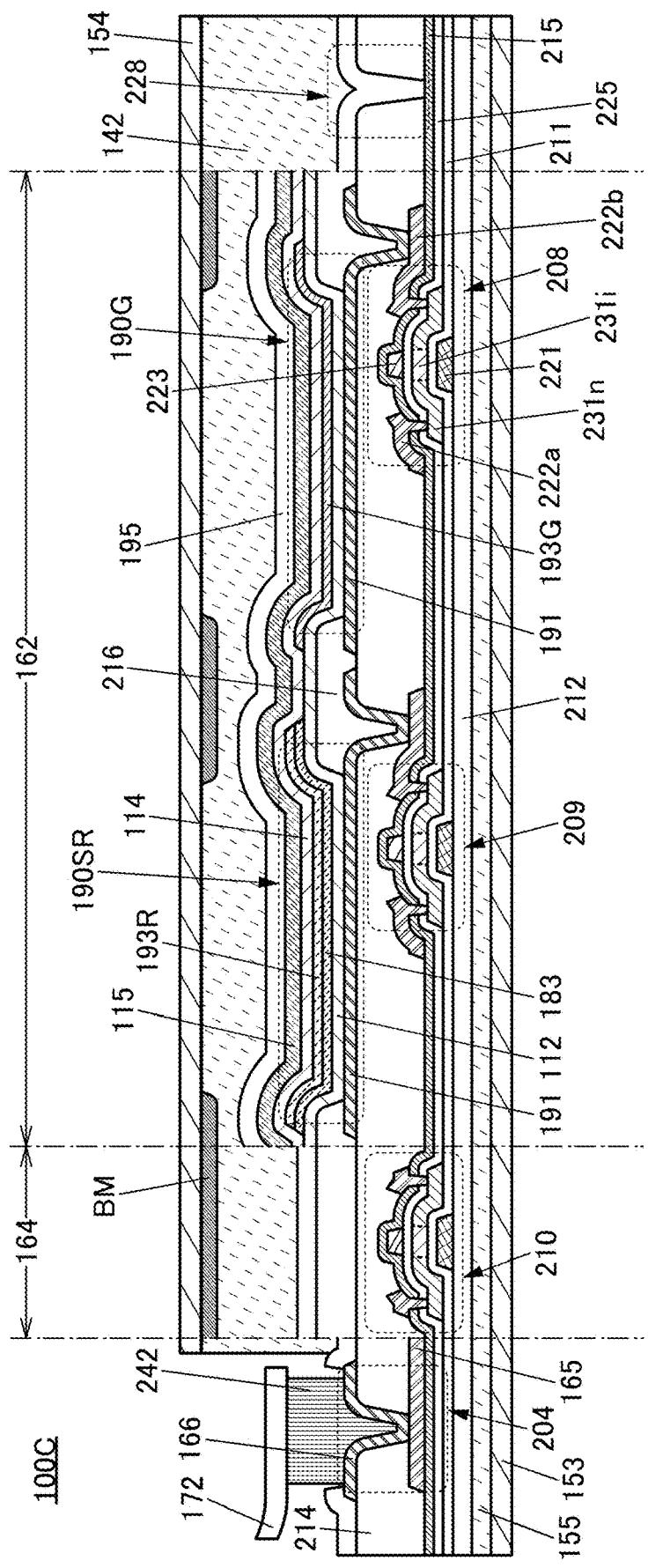
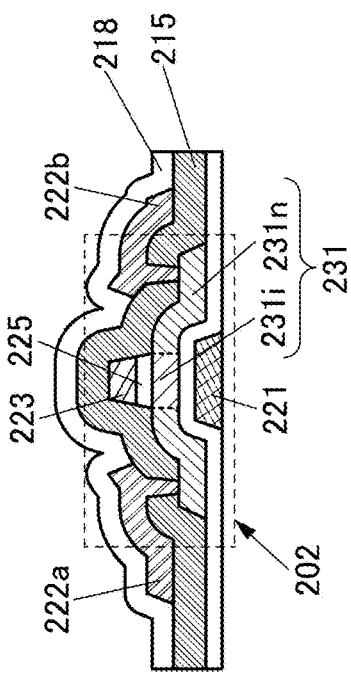
FIG. 33A
FIG. 33B

ELECTRONIC DEVICE AND AUTHENTICATION METHOD FOR ELECTRONIC DEVICE

TECHNICAL FIELD

One embodiment of the present invention relates to an electronic device. One embodiment of the present invention relates to an authentication method for an electronic device.

Note that one embodiment of the present invention is not limited to the above technical field. Examples of the technical field of one embodiment of the present invention disclosed in this specification and the like include a semiconductor device, a display device, a light-emitting device, a power storage device, a memory device, an electronic device, a lighting device, an input device, an input/output device, a driving method thereof, and a manufacturing method thereof. A semiconductor device generally means a device that can function by utilizing semiconductor characteristics.

BACKGROUND ART

In recent years, information terminal devices, for example, mobile phones such as smartphones, tablet information terminals, and laptop PCs (personal computers) have been widely used. In addition, wearable information terminal devices that can be attached to a human body have also been widely used. Such information terminal devices often include personal information or the like, and thus various authentication technologies for preventing unauthorized use have been developed.

For example, Patent Document 1 discloses an electronic device including a fingerprint sensor in a push button switch portion.

REFERENCE

Patent Document

[Patent Document 1] United States Published Patent Application No. 2014/0056493

SUMMARY OF THE INVENTION

Problems to be Solved by the Invention

An object of one embodiment of the present invention is to provide an electronic device having a function of performing authentication typified by fingerprint authentication. Another object of one embodiment of the present invention is to provide an electronic device with a high security level. Another object is to provide a highly usable electronic device. Another object is to provide a multifunctional electronic device. Another object is to provide a novel electronic device. Another object of one embodiment of the present invention is to provide an electronic device having an authentication method with a high security level. Another object is to provide an electronic device having a novel authentication method.

Note that the description of these objects does not preclude the existence of other objects. One embodiment of the present invention does not have to achieve all these objects. Objects other than these can be derived from the description of the specification, the drawings, the claims, and the like.

Means for Solving the Problems

One embodiment of the present invention is an electronic device including a pixel portion, a sensor portion, an authentication portion, and a housing. The pixel portion includes a display element and a light-receiving element. The pixel portion has a function of turning on the display element. The pixel portion has a function of obtaining authentication information by capturing an image of a target object touching the pixel portion using the light-receiving element. The sensor portion has a function of detecting attachment or detachment to a living body or an object. The authentication portion has a function of performing authentication processing using the authentication information. The housing includes a first surface and a second surface opposite to the first surface. The pixel portion is positioned on the first surface. The sensor portion is positioned on the second surface.

In the above electronic device, the pixel portion preferably includes a first transistor. The first transistor is electrically connected to the display element or the light-receiving element. The first transistor includes a metal oxide in a channel formation region.

In the above electronic device, the pixel portion preferably includes a first transistor. The first transistor is electrically connected to the display element or the light-receiving element. The first transistor contains silicon in a channel formation region.

In the above electronic device, the pixel portion preferably includes a first transistor and a second transistor. The first transistor is electrically connected to the display element or the light-receiving element. The second transistor is electrically connected to the display element or the light-receiving element. The first transistor includes a metal oxide in a channel formation region. The second transistor contains silicon in a channel formation region.

In the above electronic device, the pixel portion preferably includes a touch sensor. The touch sensor has a function of sensing a position of the target object touching the pixel portion. The pixel portion has a function of turning on the display element at and in the vicinity of the position.

In the above electronic device, the target object is preferably a finger.

One embodiment of the present invention is an authentication method of an electronic device that includes a pixel portion, a sensor portion, and an authentication portion. The pixel portion includes a display element and a light-receiving element. The authentication method of an electronic device includes a step where the sensor portion senses attachment to a living body or an object, a step where the pixel portion turns on the display element, a step where the light-receiving element obtains authentication information by capturing an image of a target object touching the pixel portion, and a step where the authentication portion performs authentication processing using the authentication information.

One embodiment of the present invention is an authentication method of an electronic device that includes a pixel portion, a sensor portion, and an authentication portion. The pixel portion includes a display element and a light-receiving element. The authentication method of an electronic device includes a step where the sensor portion obtains first authentication information, a step where the authentication portion performs first authentication processing using the first authentication information, a step where the pixel portion turns on the display element, a step where the light-receiving element obtains second authentication information by capturing an image of a target object touching the pixel portion, and a step where the authentication portion performs second authentication processing using the second authentication information.

One embodiment of the present invention is an authentication method of an electronic device that includes a pixel portion, a sensor portion, and an authentication portion. The pixel portion includes a display element, a light-receiving element, and a touch sensor. The authentication method of an electronic device includes a step where the sensor portion senses attachment to a living body or an object, a step where the touch sensor senses a position of a target object touching the pixel portion, a step where the pixel portion turns on the display elements at and in the vicinity of the position, a step where the light-receiving element obtains authentication information by capturing an image of the target object touching the position and the vicinity thereof, and a step where the authentication portion performs authentication processing using the authentication information.

Effect of the Invention

According to one embodiment of the present invention, an electronic device having a function of performing authentication typified by fingerprint authentication can be provided. An electronic device with a high security level can be provided. A highly usable electronic device can be provided. A multifunctional electronic device can be provided. A novel electronic device can be provided. An electronic device having an authentication method with a high security level can be provided. An electronic device having a novel authentication method can be provided.

Note that the description of these effects does not preclude the existence of other effects. One embodiment of the present invention does not need to have all the effects. Effects other than these can be derived from the description of the specification, the drawings, the claims, and the like.

BRIEF DESCRIPTION OF THE DRAWINGS

FIG. 33A is a cross-sectional view illustrating an example of a display device that can be used for an electronic device. FIG. 33B is a cross-sectional view illustrating a transistor example.

MODE FOR CARRYING OUT THE INVENTION

Figure 1:
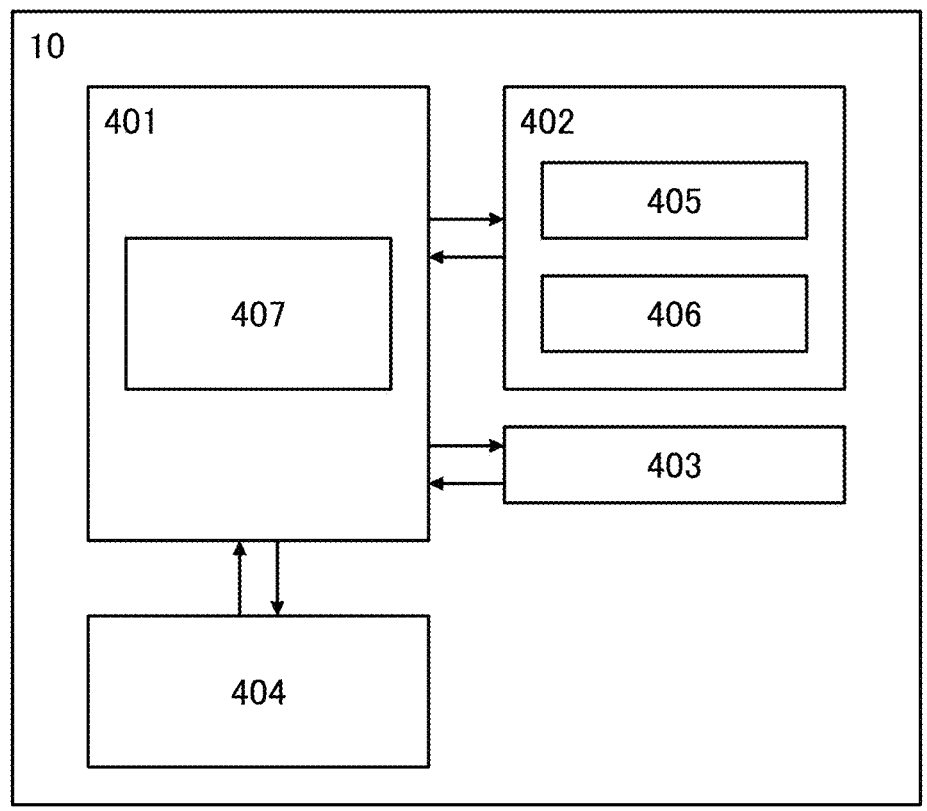
FIG. 1 is a diagram illustrating a structure example of an electronic device.

Hereinafter, embodiments are described with reference to the drawings. Note that the embodiments can be implemented in many different modes, and it is readily understood by those skilled in the art that modes and details thereof can be changed in various ways without departing from the spirit and scope thereof. Thus, the present invention should not be construed as being limited to the following description of the embodiments.

Note that in structures of the invention described below, the same portions or portions having similar functions are denoted by the same reference numerals in different drawings, and a description thereof is not repeated. Furthermore, the same hatch pattern is used for the portions having similar functions, and the portions are not especially denoted by reference numerals in some cases.

Note that in each drawing described in this specification, the size, the layer thickness, or the region of each component is exaggerated for clarity in some cases. Therefore, they are not limited to the illustrated scale.

Note that in this specification and the like, the ordinal numbers such as "first" and "second" are used in order to avoid confusion among components and do not limit the number.

Note that the expressions indicating directions such as "over" and "under" are basically used to correspond to the directions of drawings. However, in some cases, the direction indicating "over" or "under" in the specification does not correspond to the direction in the drawings for the purpose of description simplicity or the like. For example, when a stacking order (or formation order) of a stacked body or the like is described, even in the case where a surface on which the stacked body is provided (e.g., a formation surface, a support surface, an adhesion surface, or a planar surface) is positioned above the stacked body in the drawings, the direction and the opposite direction are referred to as "under" and "over", respectively, in some cases.

In this specification and the like, a display panel that is one embodiment of a display device has a function of displaying (outputting) an image or the like on (to) a display surface. Therefore, the display panel is one embodiment of an output device.

In this specification and the like, a structure where a connector such as an FPC (Flexible Printed Circuit) or a TCP (Tape Carrier Package) is attached to a substrate of a display panel, or a structure where an IC is mounted on a substrate by a COG (Chip On Glass) method or the like is referred to as a display panel module or a display module, or simply as a display panel or the like in some cases.

Note that in this specification and the like, a touch panel that is one embodiment of a display device has a function of displaying an image or the like on a display surface and a function of a touch sensor that senses the contact, press, approach, or the like of a sensing target such as a finger or a stylus with or to the display surface. Thus, the touch panel is one embodiment of an input/output device.

A touch panel can be referred to as, for example, a display panel (or a display device) with a touch sensor, or a display panel (or a display device) having a touch sensor function. A touch panel can include a display panel and a touch sensor panel. Alternatively, a touch panel can have a function of a touch sensor in the display panel or on the surface of the display panel.

In this specification and the like, a structure where a connector or an IC is mounted on a substrate of a touch panel is referred to as a touch panel module or a display module, or simply as a touch panel or the like in some cases.

Embodiment 1

In this embodiment, electronic devices which are embodiments of the present invention are described.

An electronic device that is one embodiment of the present invention includes a pixel portion, a sensor portion, and an authentication portion.

The pixel portion includes display elements and light-receiving elements arranged in a matrix. Part of light emitted from the display element is reflected by a target object and the reflected light is incident on the light-receiving element. The light-receiving element can output an electric signal in accordance with the intensity of incident light. Thus, the pixel portion can obtain (capture) the positional information or the shape of a target object (subject) touching or approaching the pixel portion as data, with the light-receiving elements arranged in a matrix. That is, the pixel portion has a function of displaying an image and can function as an image sensor panel or an optical sensor.

The pixel portion has a function of obtaining authentication information by capturing an image of a target object touching the pixel portion with the use of the light-receiving element. The sensor portion has a function of obtaining information on attachment or detachment of the electronic device to a living body or an object. The authentication portion has a function of performing authentication processing with the use of the authentication information. The electronic device that is one embodiment of the present invention can have a higher security level by performing authentication processing while being attached to a living body or an object.

A target object to be captured can be a finger or a palm, for example. In the case where a target object is a finger, a fingerprint image can be used as the authentication information. In the case where a target object is a palm, a palm print image can be used as the authentication information.

<Structure Example 1 of Electronic Device>

FIG. 1 is a block diagram of an electronic device 10 that is one embodiment of the present invention. The electronic device 10 includes a control portion 401, a pixel portion 402, a sensor portion 403, and a memory portion 404. The control portion 401 includes an authentication portion 407. The pixel portion 402 includes a display element 405 and a light-receiving element 406. The electronic device 10 can be used as, for example, a portable information terminal that can be attached to a living body or an object. The electronic device 10 can be suitably used as, for example, a wearable portable information terminal that can be attached to a human or an animal. When attached to a living body, the electronic device 10 can be attached to a wrist, an arm, a finger, or a foot, for example.

Note that in the drawings attached to this specification, the block diagram in which components are classified according to their functions and shown as independent blocks is illustrated; however, it is difficult to separate actual components completely according to their functions, and one component may be related to a plurality of functions or a plurality of components may achieve one function.

The control portion 401 has a function of performing entire control of the system of the electronic device 10. In addition, the control portion 401 has a function of collectively controlling the components included in the electronic device 10.

The control portion 401 has a function of, for example, a central processing unit (CPU). The control portion 401 interprets and executes instructions from various programs with the use of a processor to process various kinds of data or control programs. Programs that might be executed by the processor may be stored in a memory region of the processor or may be stored in the memory portion 404.

The control portion 401 has a function of processing first information input from the sensor portion 403, a function of generating image data to be output to the pixel portion 402, a function of processing second information input from the light-receiving element 406 in the pixel portion 402, a function of controlling the locked state of the electronic device 10, and the like.

The sensor portion 403 has a function of obtaining information on attachment or detachment of the electronic device 10 (the first information) and outputting the first information to the control portion 401. The information on attachment or detachment refers to information on whether the electronic device 10 is attached to or detached from a living body or an object. For the sensor portion 403, an optical sensor, an ultrasonic sensor, or the like can be used. The above structure of the display element 405 and the light-receiving element 406 may be employed for the sensor portion 403.

The pixel portion 402 has a function of displaying an image with the display element 405 on the basis of image data input from the control portion 401. In addition, the pixel portion 402 can capture an image of a target object (subject) touching or approaching the pixel portion 402. Part of light emitted from the display element 405 is reflected by the target object and the reflected light is incident on the light-receiving element 406, for example. The light-receiving element can output an electric signal corresponding to the intensity of incident light, and the pixel portion 402 can obtain (capture) the positional information and the shape of the target object as data, with the plurality of light-receiving elements 406 arranged in a matrix. The pixel portion 402 can be regarded as having a function of an image sensor panel or an optical sensor.

The pixel portion 402 has a function of obtaining the second information using the light-receiving element 406 and outputting the second information to the control portion 401. As the second information, a fingerprint image of a user who touches the pixel portion 402 (also referred to as a captured image or captured image data) can be used, for example. The pixel portion 402 can obtain the second information by capturing a fingerprint image of the user who touches the pixel portion 402 using the light-receiving element 406.

For example, with a structure where the display element 405 emits light of red (R), green (G), and blue (B) and light of the colors reflected by a target object is obtained by the light-receiving element 406, the pixel portion 402 can obtain information on the colors of the target object. Such a structure enables the second information to include color information. For example, in the case where a target object is a finger, skin color information as well as fingerprint information can be used as the second information.

As the display element 405, a liquid crystal element or a light-emitting element can be used, for example. A light-emitting element can be suitably used as the display element 405. As the light-emitting element, for example, a self-luminous light-emitting element such as an LED (Light Emitting Diode), an OLED (Organic Light Emitting Diode), a QLED (Quantum-dot Light Emitting Diode), or a semiconductor laser can be used. As a light-emitting substance contained in the light-emitting element, a substance that exhibits fluorescence (a fluorescent material), a substance that exhibits phosphorescence (a phosphorescent material), a substance that exhibits thermally activated delayed fluorescence (a thermally activated delayed fluorescent (TADF) material), an inorganic compound (e.g., a quantum dot material), and the like can be given.

As the light-receiving element 406, a pn photodiode or a pin photodiode can be used, for example. The light-receiving element 406 functions as a photoelectric conversion element that senses light incident on the light-receiving element and generates charge. The amount of generated charge in the photoelectric conversion element is determined depending on the amount of incident light. It is particularly preferable to use an organic photodiode including a layer containing an organic compound as the light-receiving element. An organic photodiode, which is easily made thin, lightweight, and large in area and has a high degree of freedom for shape and design, can be used in a variety of display devices.

An organic compound is preferably used for an active layer of the light-receiving element 406. In this case, one electrode of the display element 405 and one electrode of the light-receiving element 406 (the electrodes are also referred to as pixel electrodes) are preferably provided on the same plane. It is further preferable that the other electrode of the display element 405 and the other electrode of the light-receiving element 406 be an electrode (also referred to as a common electrode) formed using one continuous conductive layer. It is still further preferable that the display element 405 and the light-receiving element 406 include a common layer. Thus, the fabrication process of the display element 405 and the light-receiving element 406 can be simplified, so that the manufacturing cost can be reduced and the manufacturing yield can be increased.

The memory portion 404 has a function of retaining user information registered in advance. As the user information, user's fingerprint information can be used. The memory portion 404 can output the user information to the authentication portion 407 in accordance with requirement from the control portion 401.

The memory portion 404 preferably retains fingerprint information of all the fingers of the user which is used for authentication. For example, two pieces of fingerprint information on user's right and left index fingers can be retained. The user can freely register fingerprint information of not only an index finger but also one or more of a middle finger, a ring finger, a little finger, and a thumb, and the memory portion 404 can retain all the registered fingerprint information.

The control portion 401 has a function of bringing the system from the locked state into the unlocked state where the electronic device 10 can be used, in the case where authentication is successful in user authentication executed by the authentication portion 407.

The control portion 401 has a function of turning on the display element 405 in the pixel portion 402 when sensing an operation of the electronic device 10 while the system of the electronic device 10 is in the locked state. Furthermore, the control portion 401 has a function of requesting the pixel portion 402 to execute capturing of a fingerprint image while the display element 405 is on.

The control portion 401 may also have a function of generating image data including an image showing a position to be touched by a user (i.e., an image indicating a position to be touched) and outputting the image data to the display portion 402 while the system of the electronic device 10 is in the locked state.

The authentication portion 407 has a function of comparing the second information input from the pixel portion 402 and fingerprint information retained in the memory portion 404 and performing processing for determining whether those match or not (authentication processing). The second information can be regarded as information used for authentication (authentication information).

For the authentication processing, a method using the degree of similarity between two images compared, e.g., a template matching method or a pattern matching method can be used, for example. A minutia method comparing minutiae such as ridge endings and bifurcations of the pattern in the image may be used for the authentication processing. Alternatively, inference using machine learning may be used for the authentication processing. In this case, the authentication processing is preferably performed by inference using a neural network, in particular.

The electronic device 10 that is one embodiment of the present invention can be an electronic device with a high security level by performing authentication processing while being attached to a living body or an object. Furthermore, the electronic device can have a higher security level by being brought into the locked state when detachment from a living body or an object is sensed.

When the authentication information includes color information, the authentication processing may be performed using the color information. The use of the color information in addition to the fingerprint information enables the electronic device to have a higher security level.

An electronic device 420 employing the electronic device 10 is described with reference to FIG. 2A, FIG. 2B, FIG. 3A, FIG. 3B, FIG. 4A, and FIG. 4B.

Figure 2A:
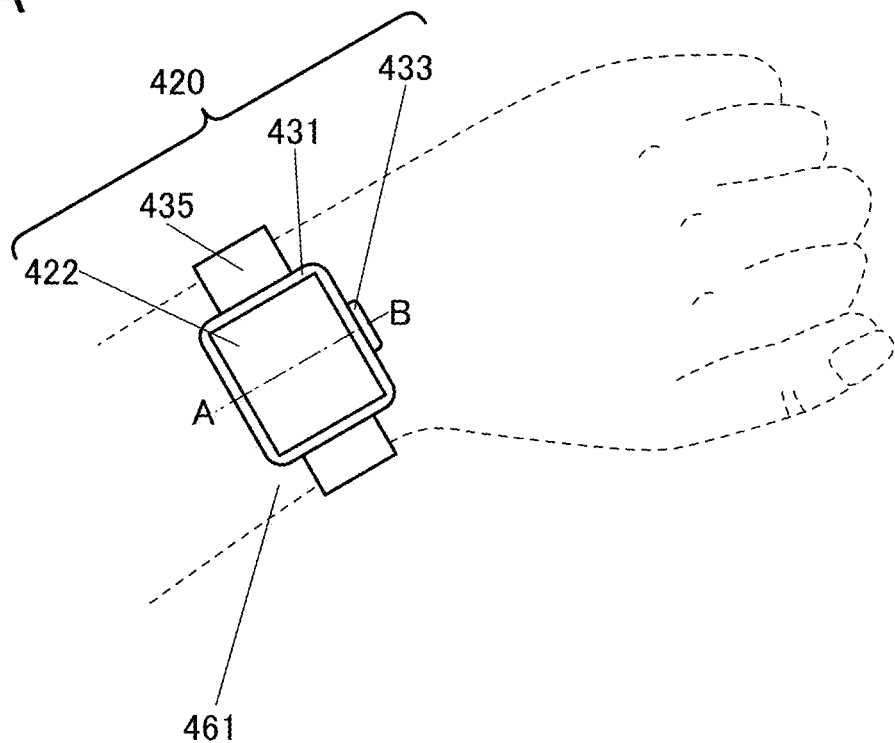
FIG. 2A and FIG. 2B are diagrams illustrating structure examples of electronic devices.

The electronic device 420 includes a housing 431, a pixel portion 422, and the sensor portion 403. The electronic device 420 includes the control portion 401 and the memory portion 404 in the housing 431. The above-described pixel portion 402 can be used as the pixel portion 422. FIG. 2A illustrates a state where the electronic device 420 is attached to a wrist.

Figure 4A:
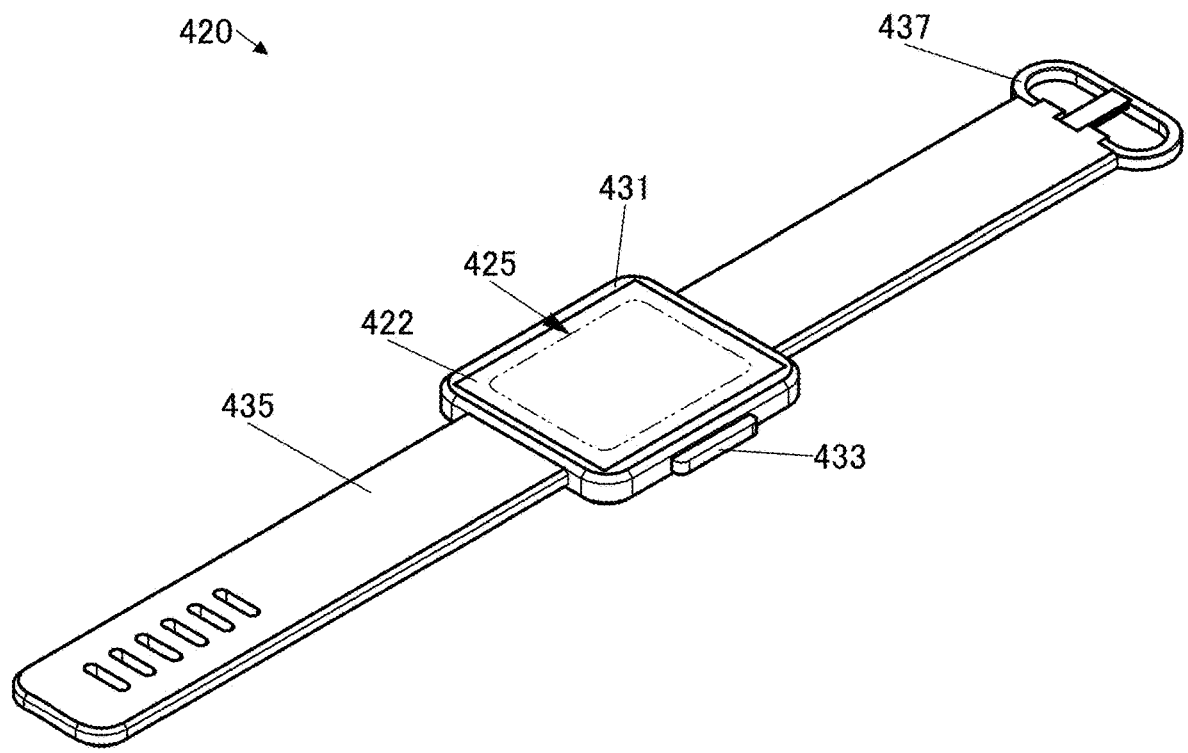
FIG. 4A and FIG. 4B are diagrams illustrating a structure example of an electronic device.
Figure 4B:
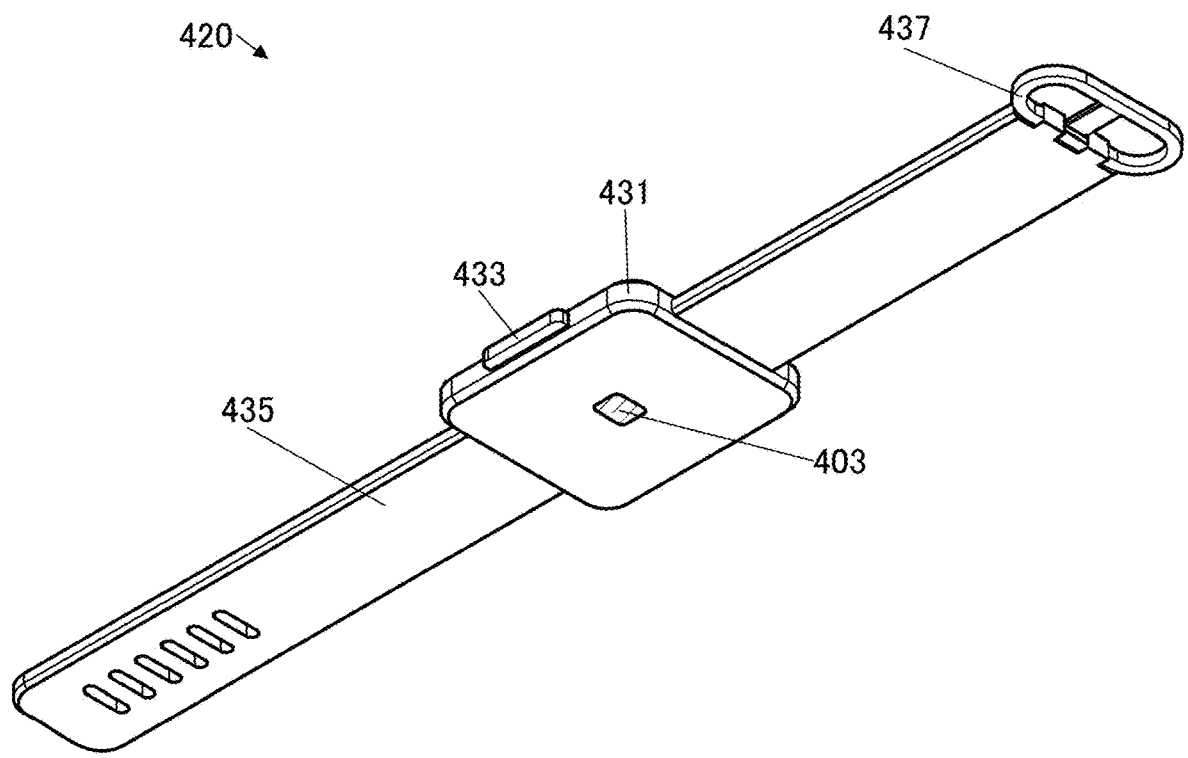

The housing 431 includes a first surface and a second surface opposite to the first surface. It is preferable that the pixel portion 422 be provided on the first surface and the sensor portion 403 be provided on the second surface. FIG. 4A is a perspective view illustrating an appearance of the electronic device 420 on the first surface (the pixel portion 422) side. FIG. 4B is a perspective view illustrating an appearance of the electronic device 420 on the second surface (the sensor portion 403) side. The sensor portion 403 is provided on the second surface to detect attachment or detachment of the electronic device 420.

Figure 2B:
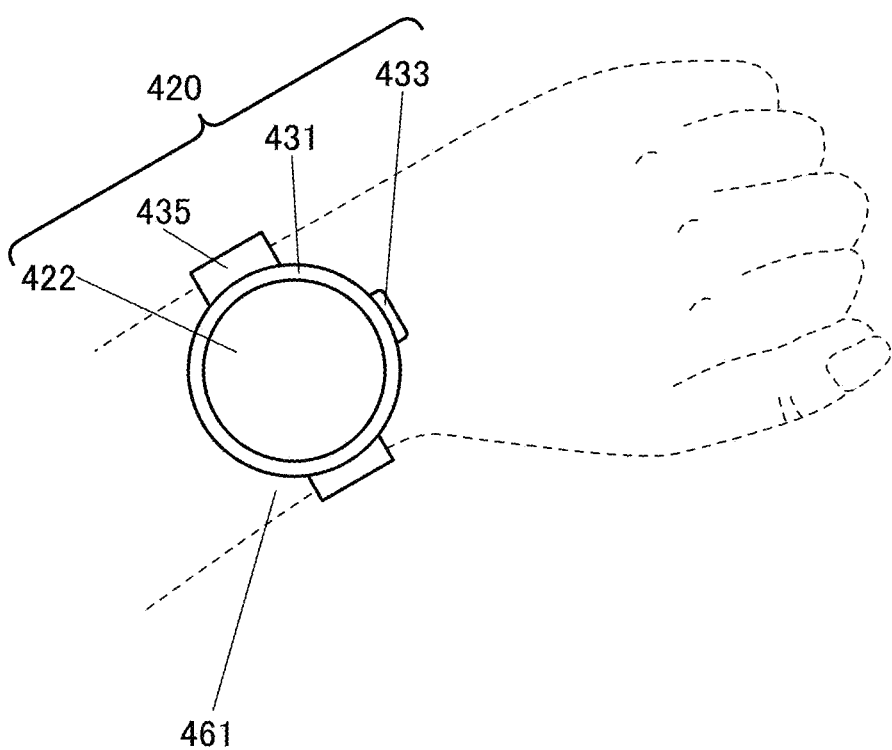
Figure 3A:
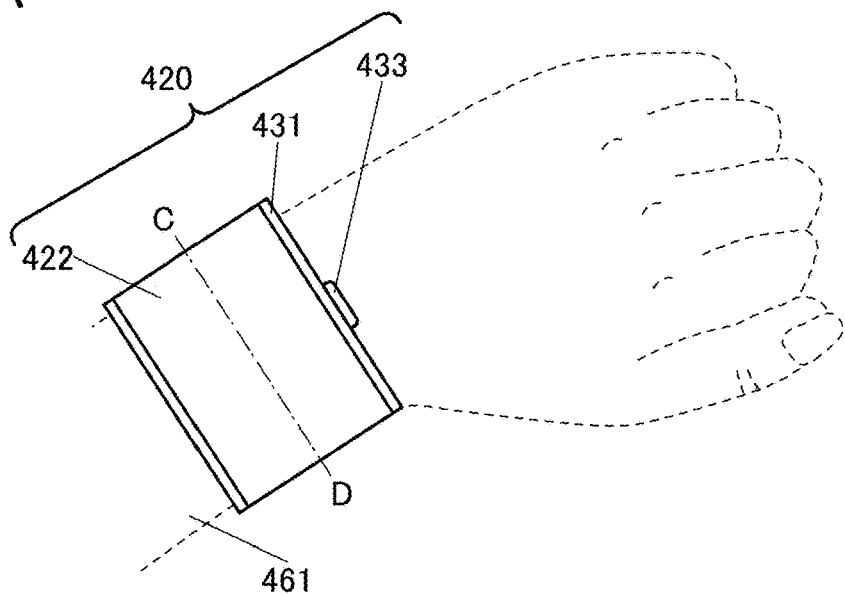
FIG. 3A and FIG. 3B are diagrams illustrating structure examples of electronic devices.
Figure 3B:
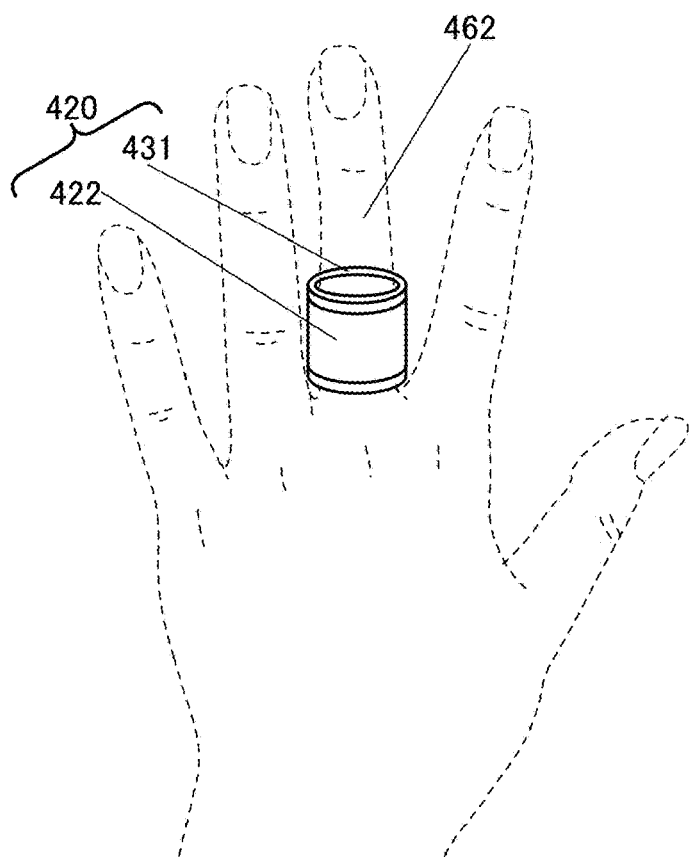

Although FIG. 2A illustrates an example where the pixel portion 422 of the electronic device 420 has a rectangular shape, there is no particular limitation on the shape of the pixel portion 422. When the pixel portion 422 has a shape other than a rectangular shape, the electronic device 420 can have higher design property. As illustrated in FIG. 2B, the pixel portion 422 may have a circular shape. As illustrated in FIG. 3A, the pixel portion 422 may be provided such that its display surface is curved, and display may be performed along the curved display surface. Alternatively, as illustrated in FIG. 3B, the electronic device 420 may have a cylindrical shape. FIG. 3B illustrates a state where the electronic device 420 is attached to a finger 462.

The electronic device 420 may include an operation button 433. A user can operate the electronic device 420 by pushing the operation button 433. The electronic device 420 may include a band 435 and a buckle 437. With the band 435 and the buckle 437, the electronic device 420 can be attached to a living body or an object. Although FIG. 2A and the like illustrate a structure where the electronic device 420 includes the operation button 433, the operation button 433 is not necessarily included. Although FIG. 4A and the like illustrate a structure where the electronic device 420 includes the buckle 437, the buckle 437 is not necessarily included. A structure may be employed where the electronic device 420 can be attached to a living body or an object only with the band 435. The electronic device 420 does not necessarily include the band 435.

The electronic device 420 may include any one or more of a speaker, a microphone, and a camera. The electronic device 420 may include any one or more of a speaker, a microphone, a camera, and a sensor (a sensor having a function of measuring force, displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, odor, or infrared rays), for example.

For example, the electronic device 420 can perform hands-free calling by mutual communication with a headset capable of wireless communication. With the connection terminal (not illustrated), the electronic device 420 can perform mutual data transmission with another information terminal or charging. Note that the charging operation may be performed by wireless power feeding.

Figure 5A:
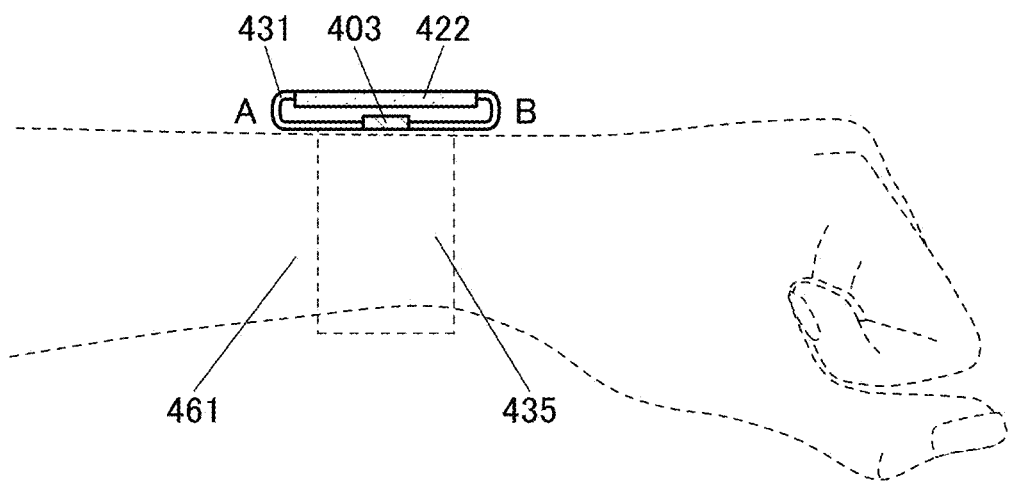
FIG. 5A to FIG. 5C are diagrams illustrating a structure example of an electronic device.
Figure 5B:
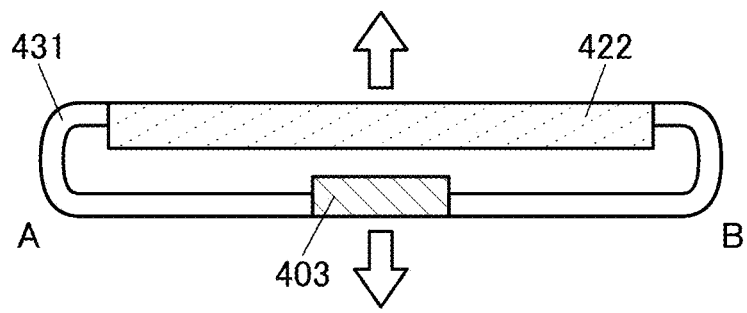
Figure 5C:
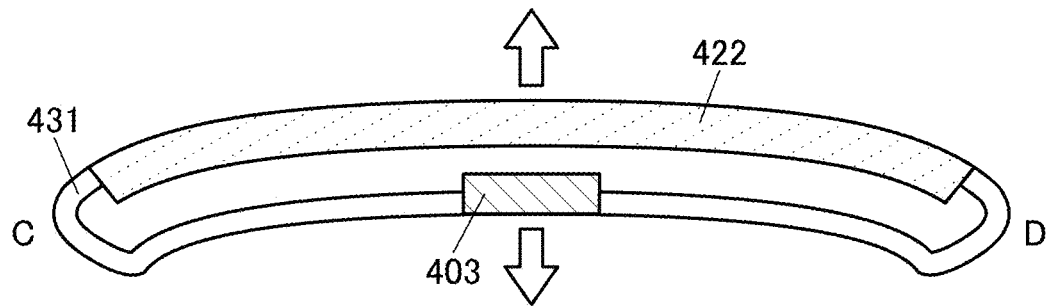

FIG. 5A to FIG. 5C are schematic views of the electronic device 420. FIG. 5A and FIG. 5B are cross-sectional views taken along the dashed-dotted line A-B illustrated in FIG. 2. FIG. 5C is a cross-sectional view taken along the dashed-dotted line C-D illustrated in FIG. 3A. FIG. 5B and FIG. 5C are enlarged views of the housing 431, the pixel portion 422, and the sensor portion 403. Note that the operation button 433 and the buckle 437 are omitted in FIG. 5A to FIG. 5C.

In a space inside the housing 431, an electronic component such as a communication antenna, a storage battery, or the like can be provided. The control portion 401 and the memory portion 404 may be provided in the space.

When part of emitted light is reflected by a living body or an object and the reflected light is incident on the sensor portion 403, information on attachment or detachment of the electronic device 420 (the first information) can be obtained. In FIG. 5B, light emitted from the pixel portion 422 and light emitted from the sensor portion 403 are indicated by arrows. As illustrated in FIG. 5B, the light from the pixel portion 422 and the light from the sensor portion 403 are preferably emitted in the opposite directions. Although FIG. 5A illustrates an example where the electronic device 420 is attached such that the sensor portion 403 is positioned on the back side of the hand, the attachment method of the electronic device 420 is not limited thereto. The electronic device 420 may be attached such that the sensor portion 403 is positioned on the palm side.

As illustrated in FIG. 5C, the pixel portion 422 may be provided such that its display surface is curved, and display may be performed along the curved display surface.

The structure of the pixel portion 422 is described.

[Structure Example 1 of Pixel Portion]

Figure 6A:
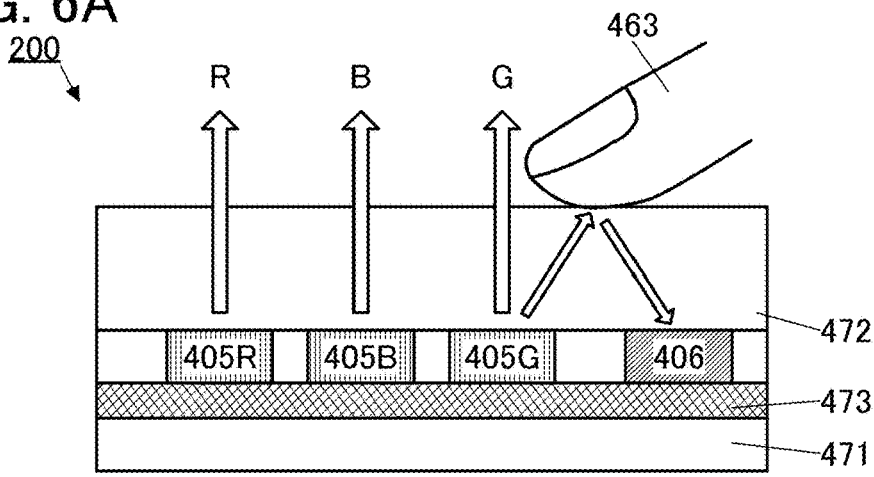
FIG. 6A and FIG. 6B are cross-sectional views illustrating a structure example of a pixel portion.

FIG. 6A is a schematic view of a display device 200 that can be used for the pixel portion 422. The pixel portion 422 includes a substrate 471, a substrate 472, the light-receiving element 406, a display element 405R, a display element 405G, a display element 405B, a functional layer 473, and the like.

A wearable electronic device might be broken by being dropped when attached or detached. In view of this, the thickness of the substrate 472 is preferably large. As the thickness of the substrate 472 is larger, the mechanical strength of the electronic device 420 can be higher. However, a large thickness of the substrate 472 increases a distance between the light-receiving element 406 and a target object, which might cause blur in a captured image and result in failure in clear image capturing. Thus, the thickness of the substrate 472 is preferably within the range that allows both clear image capturing and high mechanical strength. The thickness of the substrate 472 is preferably larger than or equal to 0.1 mm, further preferably larger than or equal to 0.2 mm and smaller than or equal to 5 mm, still further preferably larger than or equal to 0.5 mm and smaller than or equal to 3 mm, yet still further preferably larger than or equal to 0.7 mm and smaller than or equal to 2 mm. Typically, the thickness of the substrate 472 can be 0.5 mm, 0.7 mm, 1.0 mm, 1.3 mm, or 1.5 mm.

The display element 405R, the display element 405G, the display element 405B, and the light-receiving element 406 are provided between the substrate 471 and the substrate 472. The display element 405R, the display element 405G, and the display element 405B emit red (R) light, green (G) light, and blue (B) light, respectively. Note that the term "display element 405" may be used below in the case where the display element 405R, the display element 405G, and the display element 405B are not distinguished from each other.

The display device 200 includes a plurality of pixels arranged in a matrix. One pixel includes one or more subpixels. One subpixel includes one light-emitting element. For example, the pixel can have a structure including three subpixels (e.g., three colors of R, G, and B or three colors of yellow (Y), cyan (C), and magenta (M)) or four subpixels (e.g., four colors of R, G, B, and white (W) or four colors of R, G, B, and Y). The pixel further includes the light-receiving element 406. The light-receiving element 406 may be provided in all the pixels or may be provided in some of the pixels. In addition, one pixel may include a plurality of light-receiving elements 406.

FIG. 6A illustrates a state where a finger 463 touches a surface of the substrate 472. Part of light emitted from the display element 405G is reflected in a contact portion between the substrate 472 and the finger 463. Then, part of the reflected light is incident on the light-receiving element 406, so that the contact of the finger 463 with the substrate 472 can be detected. That is, the display device 200 can function as a touch panel.

The functional layer 473 includes circuits for driving the display element 405R, the display element 405G, and the display element 405B, and a circuit for driving the light-receiving element 406. The functional layer 473 is provided with a switch, a transistor, a capacitor, a wiring, and the like.

A semiconductor layer of a transistor included in the functional layer 473 preferably includes a metal oxide (also referred to as an oxide semiconductor). Alternatively, the semiconductor layer of the transistor may contain silicon. Examples of silicon include amorphous silicon and crystalline silicon (e.g., low-temperature polysilicon or single crystal silicon). Semiconductor layers of the transistors where channels are formed may be formed using different materials. The functional layer 473 may include a transistor containing silicon (hereinafter, also referred to as a Si transistor) and a transistor including a metal oxide (hereinafter, also referred to as an OS transistor).

An OS transistor has extremely higher field-effect mobility than a transistor containing amorphous silicon. In addition, the OS transistor has extremely low leakage current between a source and a drain in an off state (hereinafter, also referred to as off-state current), and charge accumulated in a capacitor that is connected in series to the transistor can be held for a long period. By using an OS transistor, a display device can have low power consumption. In particular, a transistor containing low-temperature polysilicon (LTPS) (hereinafter, also referred to as an LTPS transistor) has high field effect mobility and favorable frequency characteristics. By using an LTPS transistor, the display device is capable of high-speed operation. With the transistors containing different semiconductor layer materials, the display device 200 can be a high-performance electronic device utilizing an advantage of each of the transistors.

Note that in the case where the display element 405R, the display element 405G, the display element 405B, and the light-receiving element 406 are driven by a passive-matrix method, a structure not provided with a switch or a transistor may be employed.

Figure 6B:
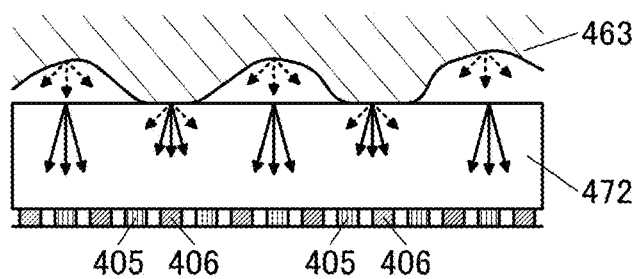

The display device 200 preferably has a function of sensing a fingerprint of the finger 463. FIG. 6B schematically illustrates an enlarged view of the contact portion in a state where the finger 463 touches the substrate 472. FIG. 6B illustrates the light-emitting elements 405 and the light-receiving elements 406 that are alternately arranged.

The fingerprint of the finger 463 is formed of depressions and projections. Therefore, as illustrated in FIG. 6B, the projections of the fingerprint touch the substrate 472.

Light reflected by a surface, an interface, or the like includes regularly reflected light and diffusely reflected light. Regularly reflected light is highly directional light with an incident angle equal to a reflex angle, and diffusely reflected light is light having low directionality and low angular dependence of intensity. As for regular reflection and diffuse reflection, diffuse reflection components are dominant in the light reflected by the surface of the finger 463. Meanwhile, regular reflection components are dominant in the light reflected by the interface between the substrate 472 and the air.

The intensity of light that is reflected by contact surfaces or non-contact surfaces between the finger 463 and the substrate 472 and is incident on the light-receiving elements 406 which are positioned directly below the contact surfaces or the non-contact surfaces is the sum of intensities of regularly reflected light and diffusely reflected light. As described above, regularly reflected light (indicated by solid arrows) is dominant near the depressions of the finger 463, where the finger 463 is not in contact with the substrate 472; whereas diffusely reflected light (indicated by dashed arrows) from the finger 463 is dominant near the projections of the finger 463, where the finger 463 is in contact with the substrate 472. Thus, the intensity of light received by the light-receiving element 406 positioned directly below the depression is higher than the intensity of light received by the light-receiving element 406 positioned directly below the projection. Utilizing this, a fingerprint image of the finger 463 can be captured.

In the case where an arrangement interval between the light-receiving elements 406 is smaller than a distance between two projections of a fingerprint, preferably a distance between a depression and a projection adjacent to each other, a clear fingerprint image can be obtained. The distance between a depression and a projection of a human's fingerprint is generally within the range from 150 µm to 250 µm; thus, the arrangement interval between the light-receiving elements 406 is, for example, less than or equal to 400 µm, preferably less than or equal to 200 µm, more preferably less than or equal to 150 µm, further preferably less than or equal to 120 µm, still further preferably less than or equal to 100 µm, yet still further preferably less than or equal to 50 µm. The arrangement interval is preferably as small as possible, and can be greater than or equal to 1 µm, greater than or equal to 10 µm, or greater than or equal to 20 µm, for example.

Figure 6C:
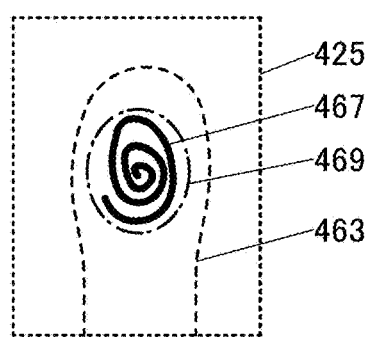
FIG. 6C is a diagram illustrating an example of a captured image.

FIG. 6C illustrates an example of a fingerprint image captured with the display device 200. In FIG. 6C, the outline of the finger 463 is indicated by a dashed line and the outline of a contact portion 469 is indicated by a dashed-dotted line in a first region 425. In the first region 425, a high-contrast image of a fingerprint 467 can be captured owing to a difference in the amount of light incident on the light-receiving elements 406.

Figure 6D:
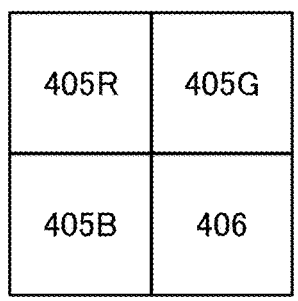
FIG. 6D to FIG. 6F are top views illustrating examples of pixels.
Figure 6E:
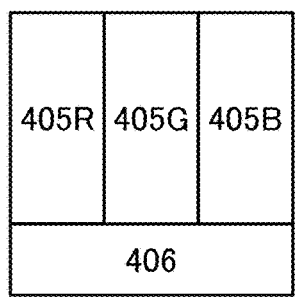
Figure 6F:
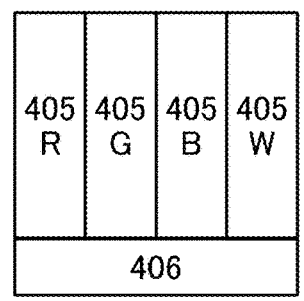

Here, FIG. 6D to FIG. 6F illustrate examples of pixels that can be employed for the display device 200.

Pixels illustrated in FIG. 6D and FIG. 6E each include the display element 405R for red (R), the display element 405G for green (G), the display element 405B for blue (B), and the light-receiving element 406. In addition, the pixels each include pixel circuits for driving the display element 405R, the display element 405G, the display element 405B, and the light-receiving element 406.

FIG. 6D illustrates an example where three light-emitting elements and one light-receiving element are arranged in a matrix of 2×2. FIG. 6E illustrates an example where three light-emitting elements are arranged in one line and one laterally long light-receiving element 406 is provided below the three light-emitting elements.

The pixel illustrated in FIG. 6F is an example including a display element 405W for white (W). Here, four light-emitting elements are arranged in one line and the light-receiving element 406 is provided below the four light-emitting elements.

Note that the pixel structure is not limited to the above, and a variety of arrangement methods can be employed. Although the areas of the subpixels are equal to each other in the examples in FIG. 6D to FIG. 6F, one embodiment of the present invention is not limited thereto. The areas of the subpixels may be different from each other.

[Structure Example 2 of Pixel Portion]

An example of a structure including a light-emitting element that emits visible light, a light-emitting element that emits infrared light, and a light-receiving element is described below.

Figure 7A:
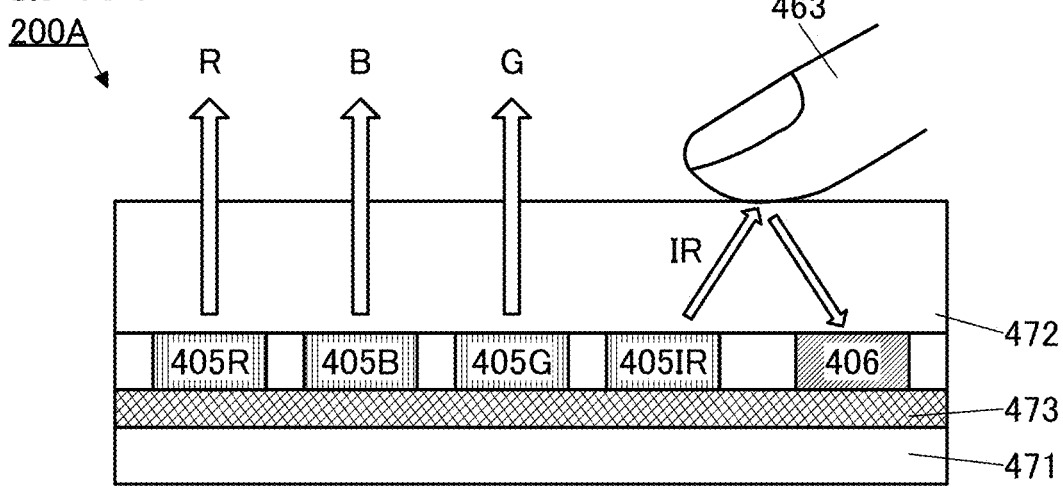
FIG. 7A is a cross-sectional view illustrating a structure example of a pixel portion.

A display device 200A illustrated in FIG. 7A includes a display element 405IR in addition to the components illustrated in FIG. 6A as an example. The display element 405IR is a light-emitting element emitting infrared light IR. Moreover, in this case, an element capable of receiving at least the infrared light IR emitted from the display element 405IR is preferably used as the light-receiving element 406. As the light-receiving element 406, an element capable of receiving both visible light and infrared light is further preferably used.

As illustrated in FIG. 7A, when the finger 463 touches the substrate 472, the infrared light IR emitted from the display element 405IR is reflected by the finger 463 and part of reflected light is incident on the light-receiving element 406, so that the positional information of the finger 463 can be obtained.

Figure 7B:
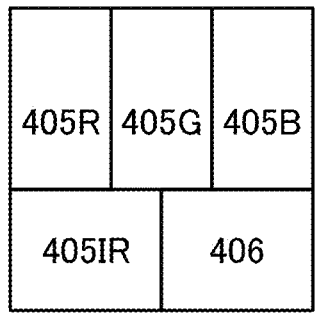
FIG. 7B to FIG. 7D are top views illustrating examples of pixels.
Figure 7C:
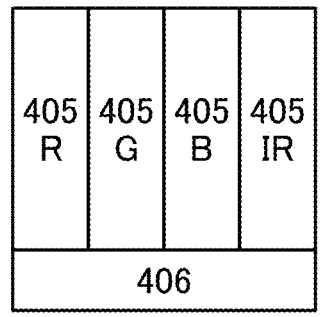
Figure 7D:
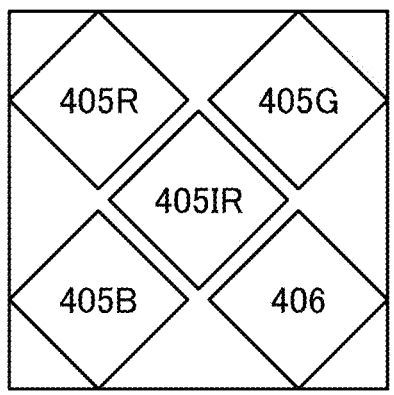

FIG. 7B to FIG. 7D illustrate examples of pixels that can be employed for the display device 200A.

FIG. 7B illustrates an example where three light-emitting elements are arranged in one line and the display element 405IR and the light-receiving element 406 are arranged below the three light-emitting elements in a horizontal direction. FIG. 7C illustrates an example where four light-emitting elements including the display element 405IR are arranged in one line and the light-receiving element 406 is provided below the four light-emitting elements.

FIG. 7D illustrates an example where three light-emitting elements and the light-receiving element 406 are arranged in all directions with the display element 405IR as a center.

Note that in the pixels illustrated in FIG. 7B to FIG. 7D, position exchange can be made between the light-emitting elements or between the light-emitting element and the light-receiving element.

[Structure Example 3 of Pixel Portion]

An example of a structure including a light-emitting element that emits visible light and a light-emitting and light-receiving element that emits visible light and receives visible light is described below.

Figure 8A:
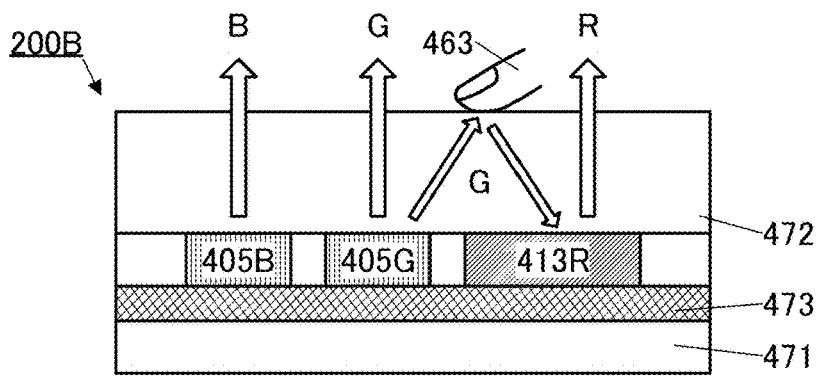
FIG. 8A is a cross-sectional view illustrating a structure example of a pixel portion.

A display device 200B illustrated in FIG. 8A includes the display element 405B, the display element 405G, and a light-emitting and light-receiving element 413R. The light-emitting and light-receiving element 413R has a function of a light-emitting element emitting red (R) light, and a function of a photoelectric conversion element receiving visible light. FIG. 8A illustrates an example where the light-emitting and light-receiving element 413R receives green (G) light emitted from the display element 405G. Note that the light-emitting and light-receiving element 413R may receive blue (B) light emitted from the display element 405B. Alternatively, the light-emitting and light-receiving element 413R may receive both green light and blue light.

For example, the light-emitting and light-receiving element 413R preferably receives light having a shorter wavelength than light emitted from itself. Alternatively, the light-emitting and light-receiving element 413R may receive light (e.g., infrared light) having a longer wavelength than light emitted from itself. The light-emitting and light-receiving element 413R may receive light having approximately the same wavelength as light emitted from itself; however, in that case, the light-emitting and light-receiving element 413R also receives light emitted from itself, whereby its emission efficiency might be decreased. Therefore, the peak of the emission spectrum and the peak of the absorption spectrum of the light-emitting and light-receiving element 413R preferably overlap as little as possible.

Here, light emitted from the light-emitting and light-receiving element is not limited to red light. Furthermore, light emitted from the light-emitting element is not limited to the combination of green light and blue light. For example, the light-emitting and light-receiving element can be an element that emits green light or blue light and receives light having a different wavelength from light emitted from itself.

The light-emitting and light-receiving element 413R serves as both a light-emitting element and a light-receiving element as described above, whereby the number of elements provided in one pixel can be reduced. Thus, higher resolution, a higher aperture ratio, higher definition, and the like can be easily achieved.

FIG. 8B to FIG. 8I illustrate examples of pixels that can be employed for the display device 200B.

Figure 8B:
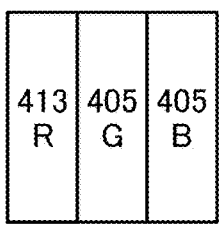
FIG. 8B to FIG. 8I are top views illustrating examples of pixels.
Figure 8C:
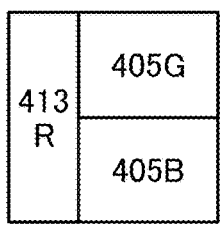

FIG. 8B illustrates an example where the light-emitting and light-receiving element 413R, the display element 405G, and the display element 405B are arranged in one line. FIG. 8C illustrates an example where the display element 405G and the display element 405B are alternately arranged in the vertical direction and the light-emitting and light-receiving element 413R is provided alongside the display elements.

Figure 8D:
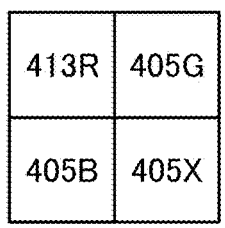

FIG. 8D illustrates an example where three light-emitting elements (the display element 405G, the display element 405B, and a display element 405X) and one light-emitting and light-receiving element are arranged in a matrix of 2×2. The display element 405X is an element emitting light of a color other than R, G, and B. The light of a color other than R, G, and B can be white (W) light, yellow (Y) light, cyan (C) light, magenta (M) light, infrared (IR) light, ultraviolet (UV) light, or the like. In the case where the display element 405X emits infrared light, the light-emitting and light-receiving element preferably has a function of sensing infrared light or a function of sensing both visible light and infrared light. The wavelength of light detected by the light-emitting and light-receiving element can be determined depending on the application of a sensor.

Figure 8E:
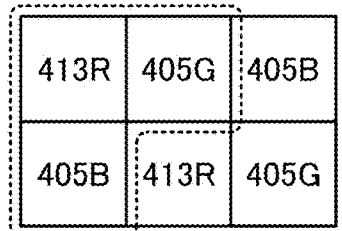

FIG. 8E illustrates two pixels. A region that includes three elements and is surrounded by a dotted line corresponds to one pixel. The pixels each include the display element 405G, the display element 405B, and the light-emitting and light-receiving element 413R. In the left pixel in FIG. 8E, the display element 405G is provided in the same row as the light-emitting and light-receiving element 413R, and the display element 405B is provided in the same column as the light-emitting and light-receiving element 413R. In the right pixel in FIG. 8E, the display element 405G is provided in the same row as the light-emitting and light-receiving element 413R, and the display element 405B is provided in the same column as the display element 405G. In the pixel layout in FIG. 8E, the light-emitting and light-receiving element 413R, the display element 405G, and the display element 405B are repeatedly arranged in both the odd-numbered row and the even-numbered row, and in each column, light-emitting elements of different colors or the light-emitting element and the light-emitting and light-receiving element of different colors are arranged in the odd-numbered row and the even-numbered row.

Figure 8F:
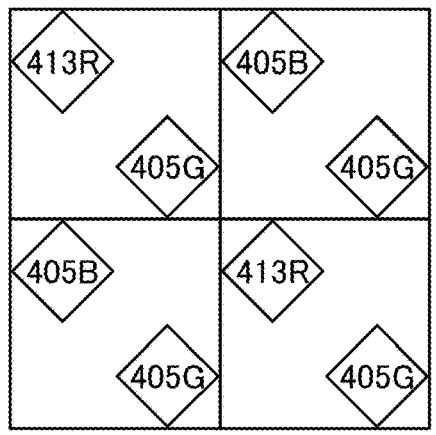

FIG. 8F illustrates four pixels which employ pentile arrangement; adjacent two pixels each have a different combination of light-emitting elements or that of a light-emitting element and a light-emitting and light-receiving element which emit light of two colors. Note that FIG. 8F illustrates the top surface shape of the light-emitting elements or light-emitting and light-receiving elements.

The upper left pixel and the lower right pixel in FIG. 8F each include the light-emitting and light-receiving element 413R and the display element 405G. The upper right pixel and the lower left pixel each include the display element 405G and the display element 405B. That is, in the example illustrated in FIG. 8F, the display element 405G is provided in each pixel.

The top surface shape of the light-emitting elements and the light-emitting and light-receiving elements is not particularly limited and can be a circular shape, an elliptical shape, a polygonal shape, a polygonal shape with rounded corners, or the like. FIG. 8F and the like illustrate examples where the top surface shape of the light-emitting elements and the light-emitting and light-receiving elements is a square tilted at approximately 45° (a diamond shape). Note that the top surface shape of the light-emitting elements and the light-emitting and light-receiving elements may vary depending on the color thereof, or the light-emitting elements and the light-emitting and light-receiving elements of some colors or every color may have the same top surface shape.

The size of the light-emitting region (or light-emitting and light-receiving region) of the light-emitting elements and the light-emitting and light-receiving elements may vary depending on the color thereof, or the light-emitting elements and the light-emitting and light-receiving elements of some colors or every color may have the same size of the light-emitting region (or the light-emitting and light-receiving region). For example, in FIG. 8F, the light-emitting region of the display element 405G provided in each pixel may have a smaller area than the light-emitting region (or the light-emitting and light-receiving region) of the other elements.

Figure 8H:
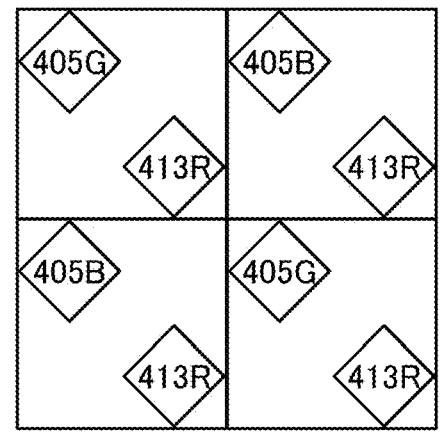
Figure 8G:
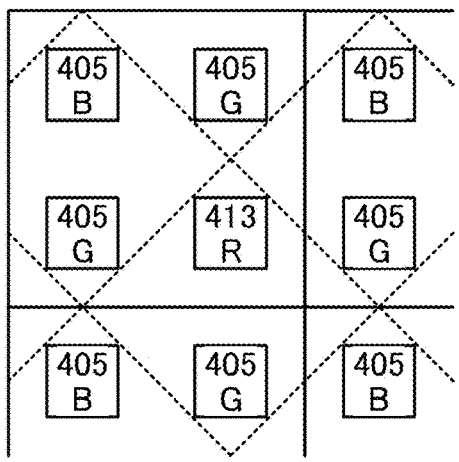

FIG. 8G is a variation example of the pixel arrangement illustrated in FIG. 8F. Specifically, the structure of FIG. 8G is obtained by rotating the structure of FIG. 8F by 45°. Although one pixel is described as including two elements in FIG. 8F, one pixel can be described as being composed of four elements as illustrated in FIG. 8G.

FIG. 8H is a variation example of the pixel arrangement illustrated in FIG. 8F. The upper left pixel and the lower right pixel in FIG. 8H each include the light-emitting and light-receiving element 413R and the display element 405G. The upper right pixel and the lower left pixel each include the light-emitting and light-receiving element 413R and the display element 405B. That is, in the example illustrated in FIG. 8H, the light-emitting and light-receiving element 413R is provided in each pixel. The structure illustrated in FIG. 8H achieves higher-resolution image capturing than the structure illustrated in FIG. 8F because the light-emitting and light-receiving element 413R is provided in each pixel. Thus, the accuracy of biometric authentication can be increased, for example.

Figure 8I:
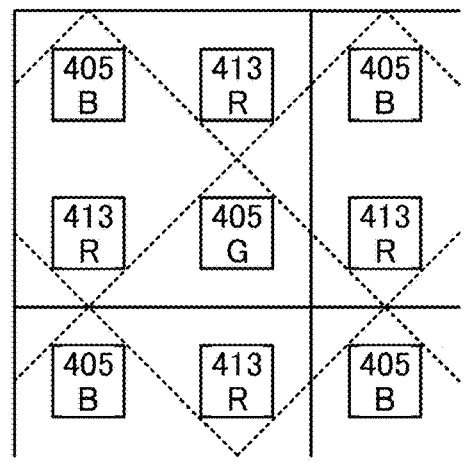

FIG. 8I illustrates a variation example of the pixel arrangement illustrated in FIG. 8H, obtained by rotating the pixel arrangement by 45°.

In FIG. 8I, one pixel is described as being composed of four elements (two light-emitting elements and two light-emitting and light-receiving elements). The pixel including a plurality of light-emitting and light-receiving element each having a light-receiving function allows high-resolution imaging. Accordingly, the accuracy of biometric authentication can be increased. For example, the resolution of imaging can be the square root of 2 times the resolution of display.

A display device which employs the structure illustrated in FIG. 8H or FIG. 8I includes p (p is an integer greater than or equal to 2) first light-emitting elements, q (q is an integer greater than or equal to 2) second light-emitting elements, and r (r is an integer greater than p and q) light-emitting and light-receiving elements. As for p and r, r=2p is satisfied. As for p, q, and r, r=p+q is satisfied. Either the first light-emitting elements or the second light-emitting elements emit green light, and the other light-emitting elements emit blue light. The light-emitting and light-receiving elements emit red light and have a light-receiving function.

In the case where touch operation is detected with the light-emitting and light-receiving elements, for example, it is preferable that light emitted from a light source be hard for a user to recognize. Since blue light has lower visibility than green light, light-emitting elements that emit blue light are preferably used as a light source. Accordingly, the light-emitting and light-receiving elements preferably have a function of receiving blue light. Note that without limitation to the above, light-emitting elements used as a light source can be selected as appropriate depending on the sensitivity of the light-emitting and light-receiving elements.

As described above, the display device of this embodiment can employ any of various types of pixel arrangements.

Figure 9A:
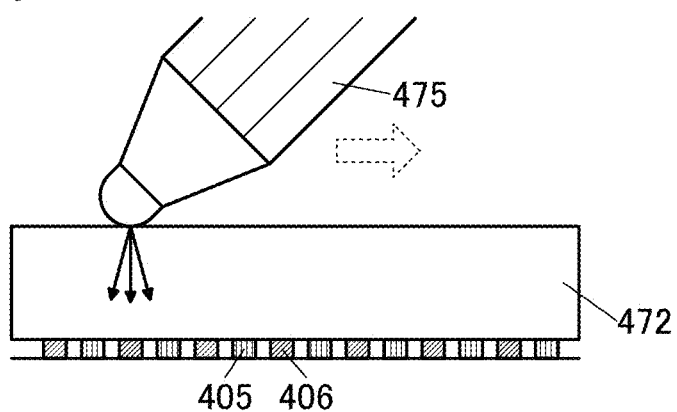
FIG. 9A is a cross-sectional view illustrating a structure example of a pixel portion.

The display device 200, the display device 200A, and the display device 200B described above can each function as a touch panel or a pen tablet. FIG. 9A illustrates a state where a tip of a stylus 475 slides in a direction indicated by a dashed arrow while touching the substrate 472.

As illustrated in FIG. 9A, when diffusely reflected light scattered at the contact surface of the tip of the stylus 475 and the substrate 472 is incident on the light-receiving element 406 overlapping with the contact surface, the position of the tip of the stylus 475 can be sensed with high accuracy.

Figure 9B:
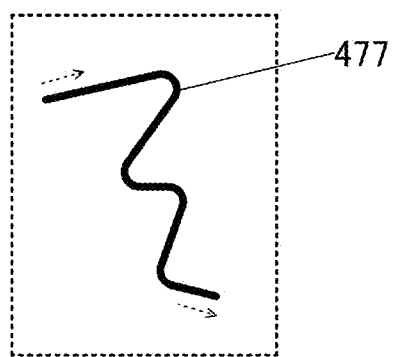
FIG. 9B is a diagram illustrating an example of a captured image.

FIG. 9B illustrates an example of a path 477 of the stylus 475 that is sensed with the display device 200. The display device 200 can sense the position of an object to be detected, such as the stylus 475, with high position accuracy, so that high-resolution drawing can be performed using a drawing application or the like. Unlike the case of using a capacitive touch sensor, an electromagnetic induction touch pen, or the like, the display device can sense even the position of a highly insulating object to be detected, the material of the tip portion of the stylus 475 is not limited, and a variety of writing materials (e.g., a brush, a glass pen, a quill pen, and the like) can be used.

A structure of the sensor portion 403 is described.

[Structure Example of Sensor Portion]

Figure 10A:
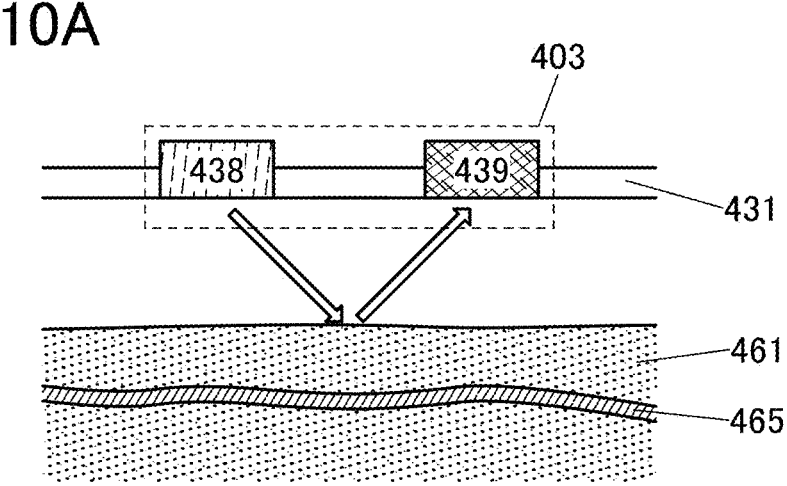
FIG. 10A to FIG. 10C are cross-sectional views illustrating structure examples of a sensor portion.

FIG. 10A is a schematic view of the sensor portion 403. The sensor portion 403 includes a light-receiving element 439 and a light-emitting element 438. As the light-emitting element 438, a light-emitting element emitting visible light or a light-emitting element emitting infrared light can be used. The light-emitting element 438 may employ the above-described structure of the display element 405. The light-receiving element 439 may employ the above-described structure of the light-receiving element 406.

Part of light emitted from the light-emitting element 438 is reflected by a target object (e.g., a wrist 461), and the reflected light is incident on the light-receiving element 439, so that information on attachment or detachment of the electronic device 420 (the first information) can be obtained. FIG. 10A illustrates a state where part of light emitted from the light-emitting element 438 is reflected by the target object (e.g., the wrist 461) and the reflected light is incident on the light-receiving element 439.

For example, when a light-emitting element emitting infrared light is used as the light-emitting element 438, data on user's health, such as a vein shape, a pulse wave, a blood glucose level, and a cholesterol concentration and a neutral fat concentration in blood, can be obtained. For example, when a light-emitting element emitting green light is used as the light-emitting element 438, a wave pulse can be measured. The use of a light-emitting element emitting green light as the light-emitting element 438 enables a pulse wave measurement with high sensitivity even in an environment with a large amount of infrared rays, such as an outdoor environment.

Figure 10B:
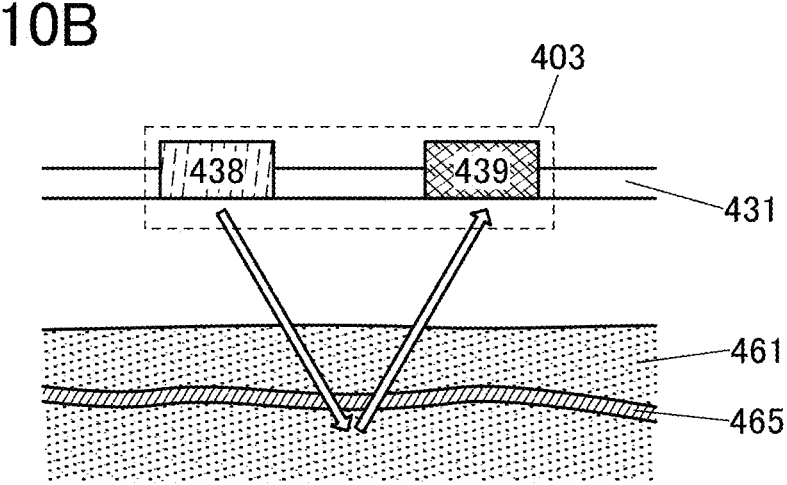

FIG. 10B illustrates a state where part of light emitted from the light-emitting element 438 passes through a blood vessel 465, and the light reflected by a biological tissue is incident on the light-receiving element 439. Data on health obtained in the sensor portion 403 may be used as information on attachment or detachment of the electronic device 420 (the first information). For example, in the case where the obtained blood glucose level is within the range registered by a user, the electronic device 420 can be determined to be attached to a human body.

Figure 10C:
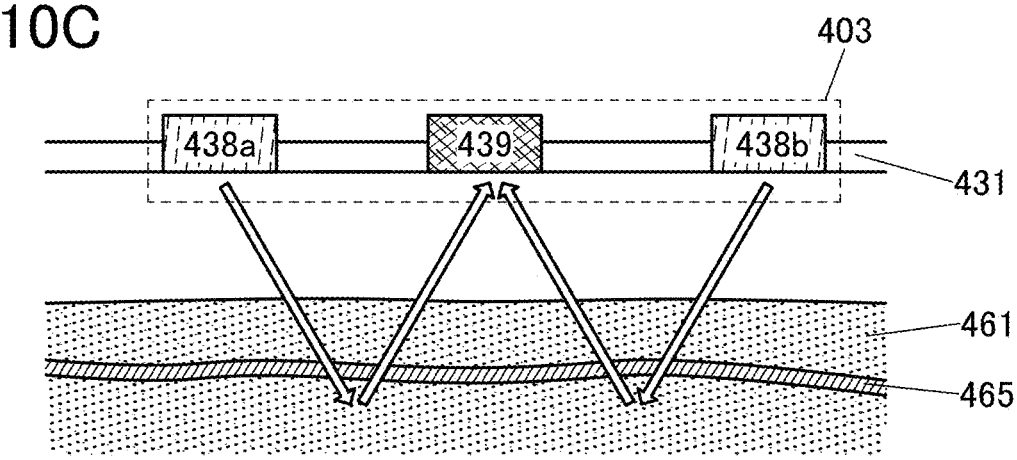

The sensor portion 403 may include a plurality of light-emitting elements 438. The sensor portion 403 may include a plurality of light-emitting elements 438 emitting light with different wavelengths. FIG. 10C illustrates a structure where the sensor portion 403 includes a light-emitting element 438a and a light-emitting element 438b. For example, when a light-emitting element emitting red light is used as the light-emitting element 438a and a light-emitting element emitting infrared light is used as the light-emitting element 438b, the oxygen saturation level in blood can be measured. For example, when a light-emitting element emitting green light is used as the light-emitting element 438a and a light-emitting element emitting infrared light is used as the light-emitting element 438b, the pulse wave can be measured with high sensitivity.

The sensor portion 403 may include a plurality of light-receiving elements 439. When the sensor portion 403 includes the plurality of light-receiving elements 439, information on attachment or detachment (the first information) can be obtained with high sensitivity. In the case where a plurality of light-emitting elements 438 emitting light with different wavelengths are used in the sensor portion 403, a plurality of kinds of light-receiving elements 439 corresponding to the wavelengths of the light emitted from the light-emitting elements 438 may be included.

In the case where data on health is obtained in the sensor portion 403, authentication processing may be performed using the data. By performing authentication with multi steps (hereinafter, also referred to as multi-step authentication) including authentication processing using data on health obtained in the sensor portion 403 and authentication processing using the aforementioned second information, the electronic device can have a higher security level.

Although the sensor portion 403 is described using an example where the electronic device 420 is attached to a living body (human body), information on attachment or detachment (the first information) can be obtained in a similar manner also in the case where the electronic device 420 is used while being attached to an object. Data obtained in the sensor portion 403 varies depending on the material of the object to which the electronic device 420 is attached. Thus, authentication processing using data obtained in the sensor portion 403 makes it impossible to use the electronic device 420 in a place other than the installation place of the electronic device 420. This can prevent unauthorized use of the electronic device 420 due to a theft.

<Authentication Method Example 1>

An authentication method example using the electronic device 420 is described below. Described here is an operation for authenticating a user with the electronic device 420 attached to a wrist of a human body by an authentication method using a fingerprint.

Figure 11:
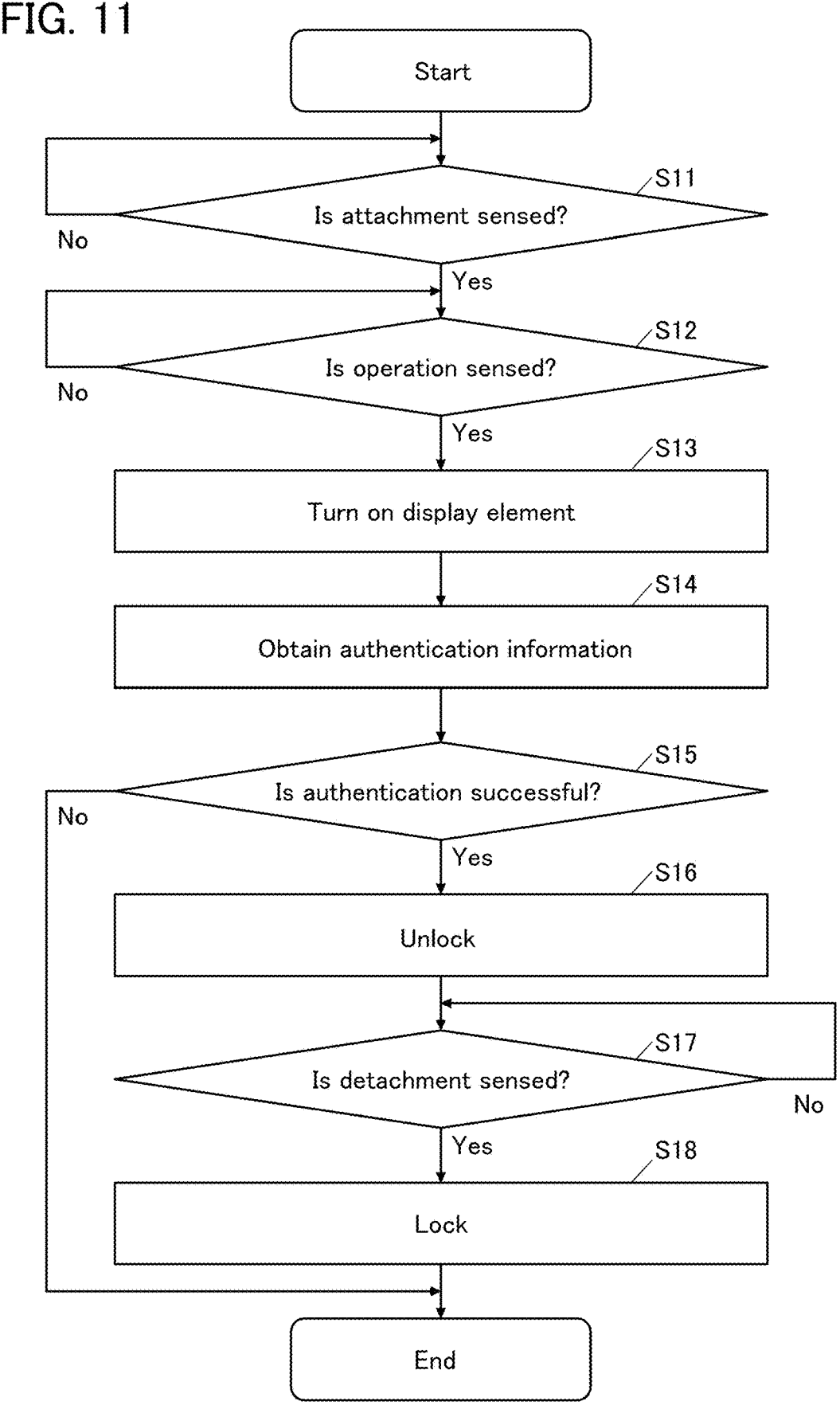
FIG. 11 is a flowchart showing an example of an authentication method.

FIG. 11 is a flow chart of the operation of the authentication method using the electronic device 420.

First, processing is started. At this time, the system of the electronic device 420 is in the locked state, i.e., in a state where functions that a user can execute are limited (including a log-out state and a log-off state).

In Step S11, attachment of the electronic device 420 to a user is sensed. The sensor portion 403 is used for sensing attachment. In the case where attachment is sensed ("Yes" in Step S11), the processing proceeds to Step S12. Step S11 is repeatedly executed until attachment is sensed (in the case of "No" in Step S11).

Next, in Step S12, an operation by the user for the electronic device 420 is sensed. Examples of a method for sensing the operation by the user include sensing power-on of the electronic device 420, push of the operation button 433, user's gaze, increase in brightness of environment light, and a large change in the attitude of the electronic device 420. In the case where such an operation is sensed ("Yes" in Step S12), the processing proceeds to Step S13. Step S12 is repeatedly executed until the operation is sensed (in the case of "No" in Step S12).

Then, in Step S13, the display elements 405 included in the pixel portion 422 are turned on. Light emitted from the display element 405 can be used as a light source for capturing an image by the light-receiving element 406. Accordingly, the display element 405 to be turned on can emit light that can be received by the light-receiving element 406. When the pixel portion 422 includes the display elements 405 of three colors of red (R), green (G), and blue (B), for example, any one or two or all of the display elements 405 can be turned on.

Figure 12:
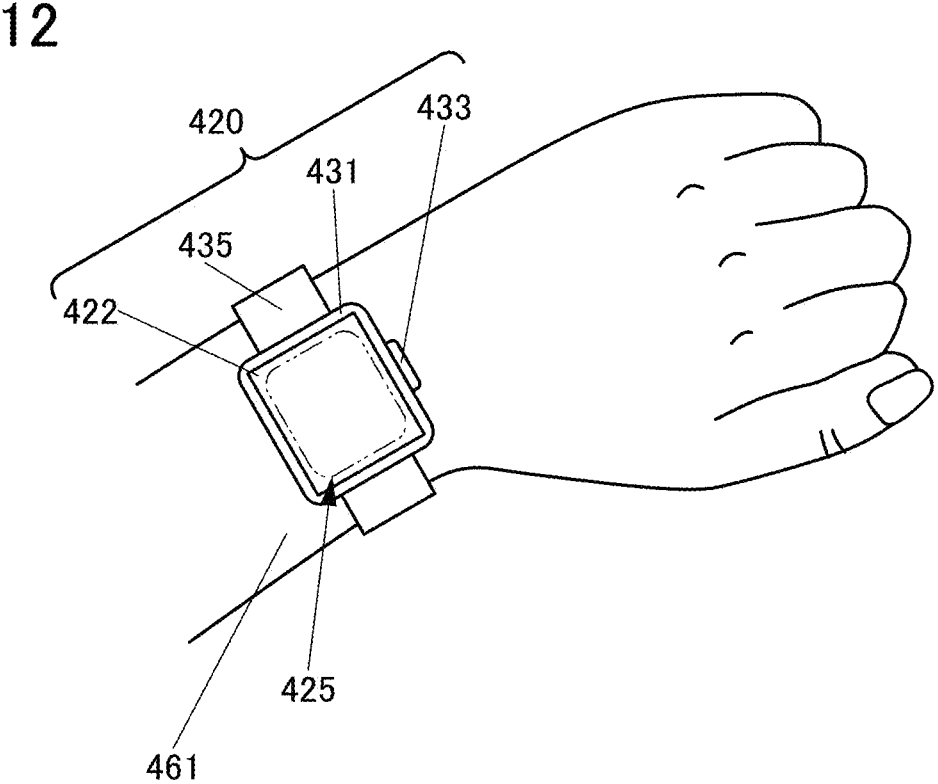
FIG. 12 is a diagram illustrating a structure example of an electronic device.

In Step S13, all of the display elements 405 in the pixel portion 422 may be turned on, or some of the display elements 405 in the pixel portion 422 may be turned on. Note that in this specification and the like, a region where the second information (authentication information) is obtained is referred to as the first region in some cases. FIG. 12 illustrates an example where all of the display elements 405 in the pixel portion 422 are turned on, that is, the entire pixel portion 422 is used as the first region 425. A user can be subjected to authentication by touching the first region 425. In the case where the entire pixel portion 422 is used as the first region 425, a user can be subjected to authentication by touching any region in the pixel portion 422.

In the case where some of the display elements 405 in the pixel portion 422 are turned on, that is, part of the pixel portion 422 is used as the first region 425, a user can be subjected to authentication by touching the first region 425. The display elements 405 in a region other than the first region 425 may be turned off. The display elements 405 that are on in the first region 425 are overlapped by the finger 463, thereby preventing a user from recognizing bright light. In other words, light for authentication can be prevented from being directly recognized by a user. Under a dark usage environment, for example, when a user directly recognizes light for authentication, the user feels glare, and furthermore, there is a risk that user's eyes might be damaged by the light; thus, only the first region 425 is turned on, whereby a load on the user can be reduced. Note that a given image may be displayed in a region other than the first region 425.

In Step S13, the brightness of the display element 405 to be turned on can be changed as appropriate depending on the brightness of the usage environment or the sensitivity of the light-receiving element 406, and is preferably as high as possible. For example, assuming that the luminance or the gray level of the display element 405 that emits the brightest light is 100%, the luminance or the gray level can be higher than or equal to 50% and lower than or equal to 100%, preferably higher than or equal to 70% and lower than or equal to 100%, further preferably higher than or equal to 80% and lower than or equal to 100%.

Subsequently, in Step S14, authentication information is obtained using the light-receiving element 406. The authentication information is output from the pixel portion 422 to the control portion 401 as image data (first image data) obtained by the light-receiving element 406.

A region for image capturing can be the first region 425.

Figure 13A:
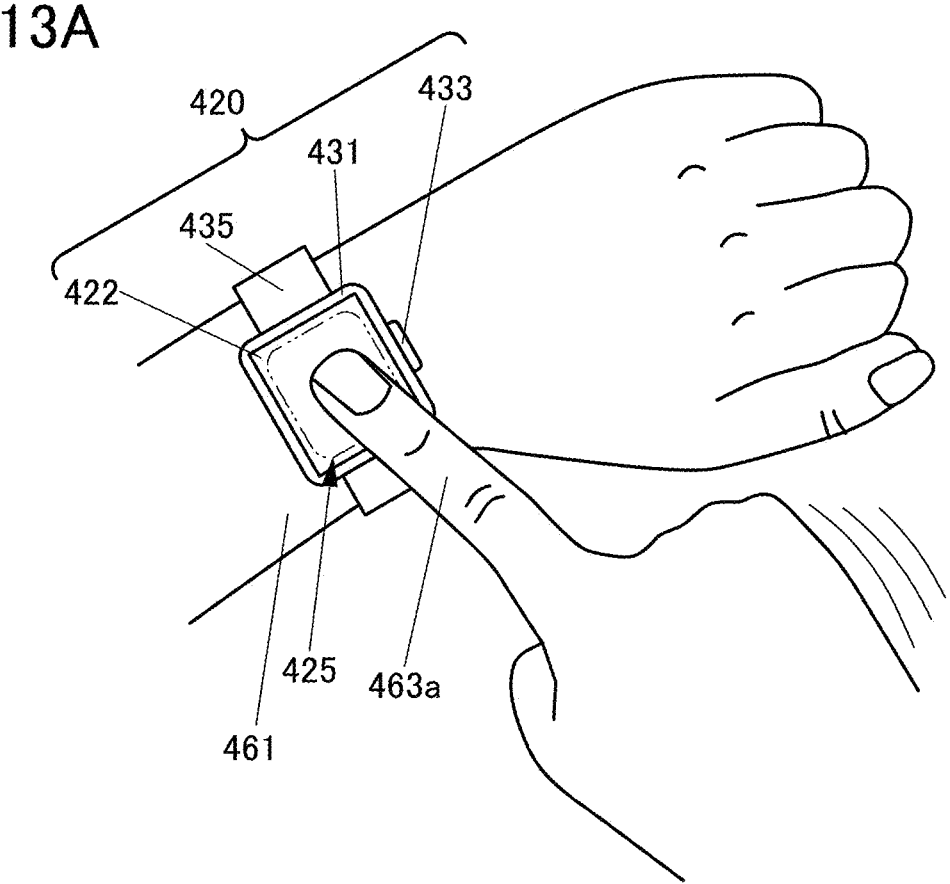
FIG. 13A is a diagram illustrating a structure example of an electronic device.
Figure 13B:
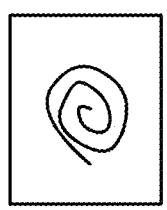
FIG. 13B is a diagram illustrating an example of authentication information.

In the case where all of the display elements 405 in the pixel portion 422 are turned on, that is, the entire pixel portion 422 is used as the first region 425 in Step S13, all of the light-receiving elements 406 in the pixel portion 422 are operated to obtain authentication information. FIG. 13A illustrates a state where a finger 463a touches the first region 425 and a fingerprint image is captured as the first image data. FIG. 13B illustrates an example of the image data (the first image data) of the fingerprint obtained as authentication information 451a.

In the case where some of the display elements 405 in the pixel portion 422 are turned on, that is, part of the pixel portion 422 is used as the first region 425 in Step S13, the light-receiving elements 406 in the first region 425 are operated to obtain authentication information. The first region can be regarded as part of the pixel portion 422. Also in the case where part of the pixel portion 422 is used as the first region 425 in Step S13, all of the light-receiving elements 406 in the pixel portion 422 may be operated to obtain authentication information.

In the case where part of the pixel portion 422 is used as the first region 425 in Step S13, the position of the first region 425 may be the same in each time processing is executed, but preferably differs each time processing is executed. That is, the user touches portions randomly shown at different positions each time processing is executed, whereby authentication can be performed.

Capturing a fingerprint image at the same position every time promotes degradation of the display element 405 that is turned on as a light source for capturing an image of a fingerprint and the transistor included in the pixel, for example, which might cause a problem such as a decrease in the emission luminance of the display element 405 or burn-in of the screen. Therefore, by performing fingerprint authentication at different positions each time processing is executed as described above, a decrease in the luminance of the display element 405, burn-in of the screen, or the like can be inhibited.

Fingerprint authentication performed at different positions each time processing is executed requires the user to perform operation for authentication actively, which leads to an improvement in user's security awareness.

The pixel portion 422 may include a plurality of first regions 425 to allow simultaneous touches by two or more fingers, in which case authentication can be performed on the basis of two or more pieces of fingerprint information. Alternatively, authentication may be performed a plurality of times in the following manner: one finger is subjected to authentication, and when the authentication is successful, another finger is subjected to authentication.

By performing authentication using a plurality of pieces of fingerprint information not using only one piece of fingerprint information, the electronic device 420 can have a high security level. For example, even when a malicious user obtains fingerprint information of a true user (owner) illegally and uses the electronic device 420, the electronic device 420 cannot be used without fingerprint information of a plurality (preferably, all) of fingers; thus, unauthorized use can be favorably prevented.

In the case of performing authentication a plurality of times, processing from Step S13 to Step S15 is executed a plurality of times. In the case of performing two-step authentication, the following processing can be performed, for example: authentication processing is performed using a fingerprint of a right middle finger in the first processing; when the fingerprint is authenticated, authentication processing is performed using a fingerprint of a right ring finger in the second processing; and when the fingerprint is authenticated, the system is unlocked. Fingers used for the first and second processing are preferably randomly changed each time processing is performed.

Then, in Step S15, authentication processing is executed by the authentication portion 407. Specifically, the authentication portion 407 compares the authentication information (the first image data) output from the pixel portion 422 and user's fingerprint information that is registered in advance and retained in the memory portion 404, and determines whether those data match or not. In the case where the authentication is successful, that is, the authentication information and the user's fingerprint information are determined to match ("Yes" in Step S15), the processing proceeds to Step S16. In the case where the authentication is unsuccessful, that is, the authentication information and the user's fingerprint information are determined not to match ("No" in Step S15), the processing ends. In the case where two or more pieces of fingerprint information are stored in the memory portion 404, all of the fingerprint information are subjected to the authentication processing.

Next, in Step S16, the control portion 401 brings the system of the electronic device 420 into the unlocked state (including bringing the system into a log-in state). When the system of the electronic device 420 is unlocked, the user can perform operation such as start-up of application with the electronic device 420.

Then, in Step S17, detachment of the electronic device 420 from the user is sensed. The sensor portion 403 is used for sensing detachment. In the case where detachment is sensed ("Yes" in Step S17), the processing proceeds to Step S18. Step S17 is repeatedly executed until detachment of the electronic device 420 from the user is sensed (in the case of "No" in Step S17). Subsequently, in Step S18, the system of the electronic device 420 is locked and accordingly brought into a state where functions that a user can execute are limited (including a log-out state and a log-off state).

The above is the description of the flow chart shown in FIG. 11.

The electronic device 420 that is one embodiment of the present invention can have a high security level by performing authentication with information on attachment or detachment obtained using the sensor portion 403 and authentication information obtained using the light-receiving element 406. For example, even when a malicious user obtains fingerprint information of a true user (owner) illegally to use the electronic device 420, unauthorized use can be prevented.

Note that a structure may be employed in which an application not including individual information, such as time display, can be used without authentication. It is preferable that a user can set the need of authentication for each application. Setting application performing authentication and application not performing authentication can achieve both a high security level and high usability.

<Authentication Method Example 2>

Figure 14:
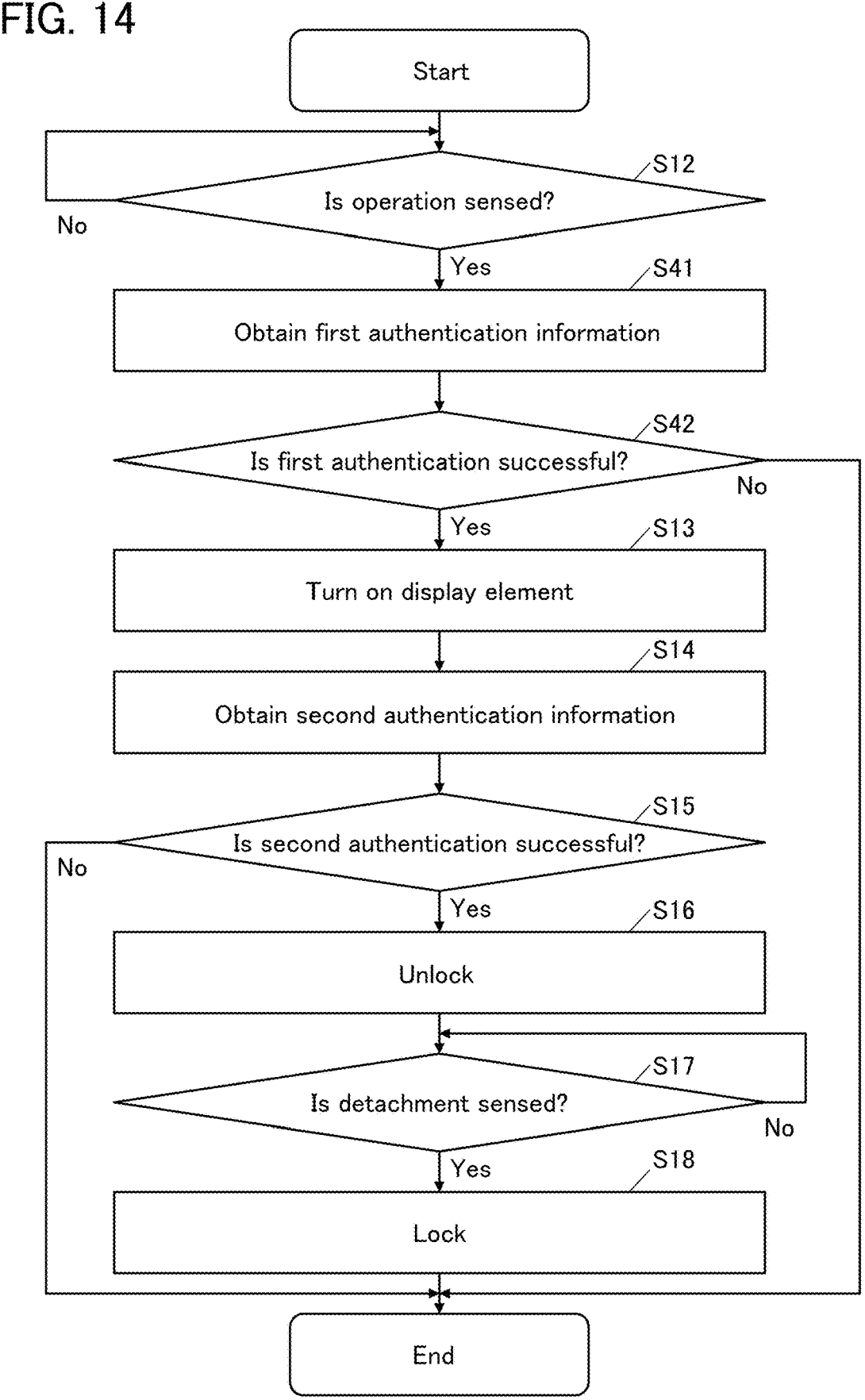
FIG. 14 is a flowchart showing an example of an authentication method.

An authentication method example different from that shown in FIG. 11 is described. FIG. 14 is a flow chart of the operation of the authentication method.

First, processing is started. At this time, the system of the electronic device 420 is in the locked state, i.e., in a state where functions that a user can execute are limited (including a log-out state and a log-off state).

In Step S12, an operation by a user for the electronic device 420 is sensed. Since the above description can be referred to for Step S12, the detailed description thereof is omitted.

Next, in Step S41, first authentication information is obtained using the sensor portion 403. As the first authentication information, data on user's health, such as a vein shape, a pulse wave, a blood glucose level, or a cholesterol concentration or a neutral fat concentration in blood, can be used. The first authentication information is output from the sensor portion 403 to the control portion 401.

Then, in Step S42, the first authentication processing is executed by the authentication portion 407. Specifically, the authentication portion 407 compares the first authentication information (data on health) output from the sensor portion 403 and data on user's health that is registered in advance and retained in the memory portion 404, and determines whether those data match or not. In the case where the authentication is successful, that is, the first authentication information and the user data are determined to match ("Yes" in Step S42), the processing proceeds to Step S13. In the case where the authentication is unsuccessful, that is, the first authentication information and the user data are determined not to match ("No" in Step S42), the processing ends.

Then, in Step S13, the display elements 405 included in the pixel portion 422 are turned on. Since the description in <Authentication method example 1> can be referred to for Step S13, the detailed description thereof is omitted.

Next, in Step S14, second authentication information is obtained using the light-receiving element 406. Since the description in <Authentication method example 1> can be referred to for Step S14, the detailed description thereof is omitted.

Then, in Step S15, the second authentication processing is executed by the authentication portion 407. Specifically, the authentication portion 407 compares the second authentication information output from the pixel portion 422 and user's fingerprint information that is registered in advance and retained in the memory portion 404, and determines whether those data match or not. Since the description in <Authentication method example 1> can be referred to for Step S15, the detailed description thereof is omitted.

Since the description in <Authentication method example 1> can be referred to for the subsequent Step S16 to Step S18, the detailed description thereof is omitted.

The electronic device 420 that is one embodiment of the present invention can be a display device with a high security level by performing multi-step authentication including the first authentication and the second authentication. Although FIG. 14 shows a structure where the second authentication is performed after the first authentication, one embodiment of the present invention is not limited thereto. The first authentication may be performed after the second authentication. In this case, for example, Step S41 and Step S42 for the first authentication can be performed after Step S13 to Step S15 for the second authentication. Alternatively, Step S41 and Step S42 for the first authentication and Step S13 to Step S14 for the second authentication may proceed in parallel.

The above is the description of the flow chart shown in FIG. 14.

<Authentication Method Example 3>

Figure 15:
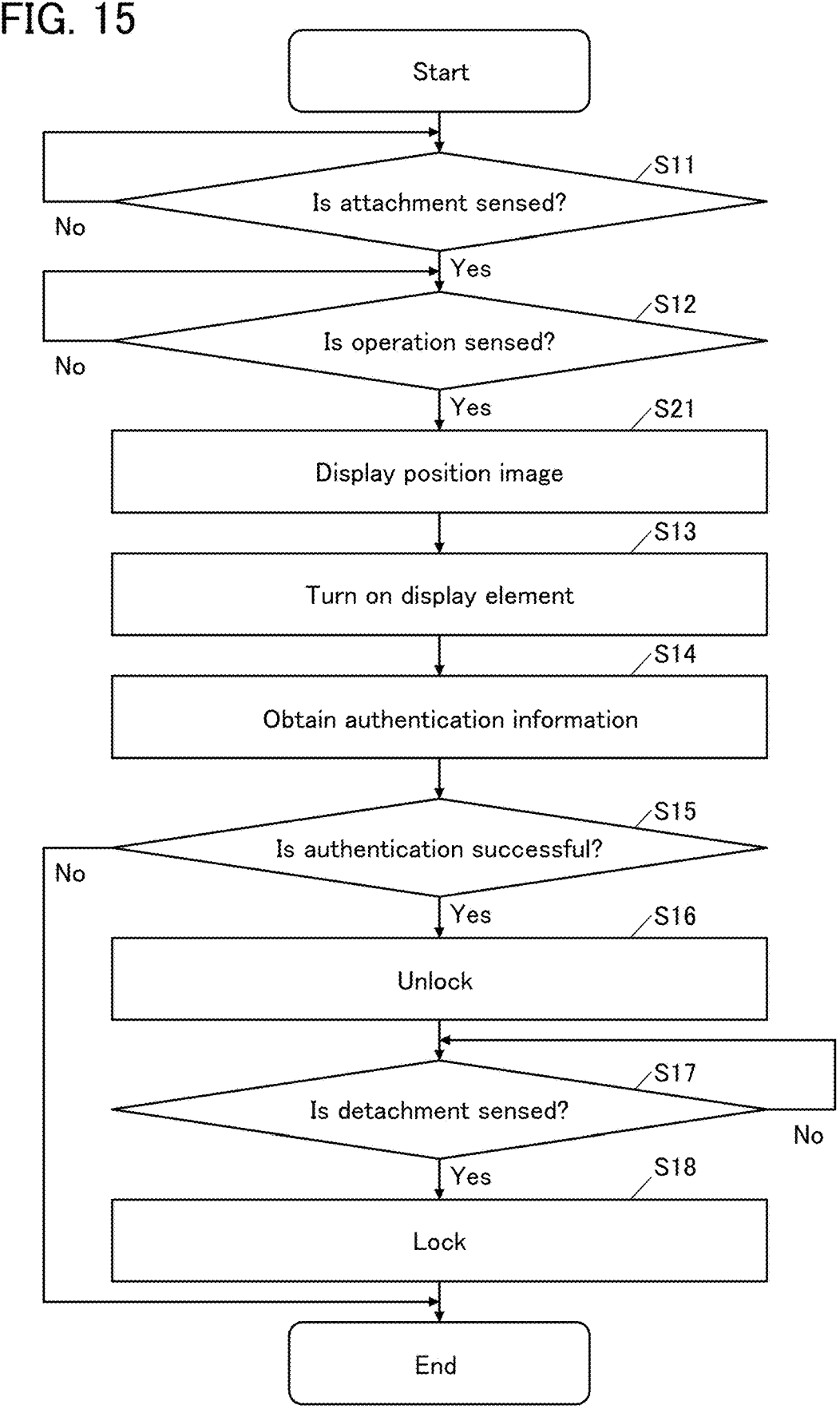
FIG. 15 is a flowchart showing an example of an authentication method.

An authentication method example different from that shown in FIG. 11 is described. FIG. 15 is a flow chart of the operation of the authentication method.

First, processing is started. At this time, the system of the electronic device 420 is in the locked state, i.e., in a state where functions that a user can execute are limited (including a log-out state and a log-off state).

In Step S11, attachment of the electronic device 420 to a user is sensed. Since the above description can be referred to for Step S11, the detailed description thereof is omitted.

Next, In Step S12, an operation by the user for the electronic device 420 is sensed. Since the above description can be referred to for Step S12, the detailed description thereof is omitted.

Then, in Step S21, a position image for authentication is displayed in the first region 425. The position image includes an image showing a position to be touched by the user, an image indicating a position to be touched, text information urging the user to touch, or the like.

Specifically, the control portion 401 generates image data including a position image and outputs the image data to the pixel portion 422, whereby an image based on the image data is displayed on the pixel portion 422. A region where the position image is displayed can be the first region 425 where the second information is obtained using the sensor portion 403.

Figure 16:
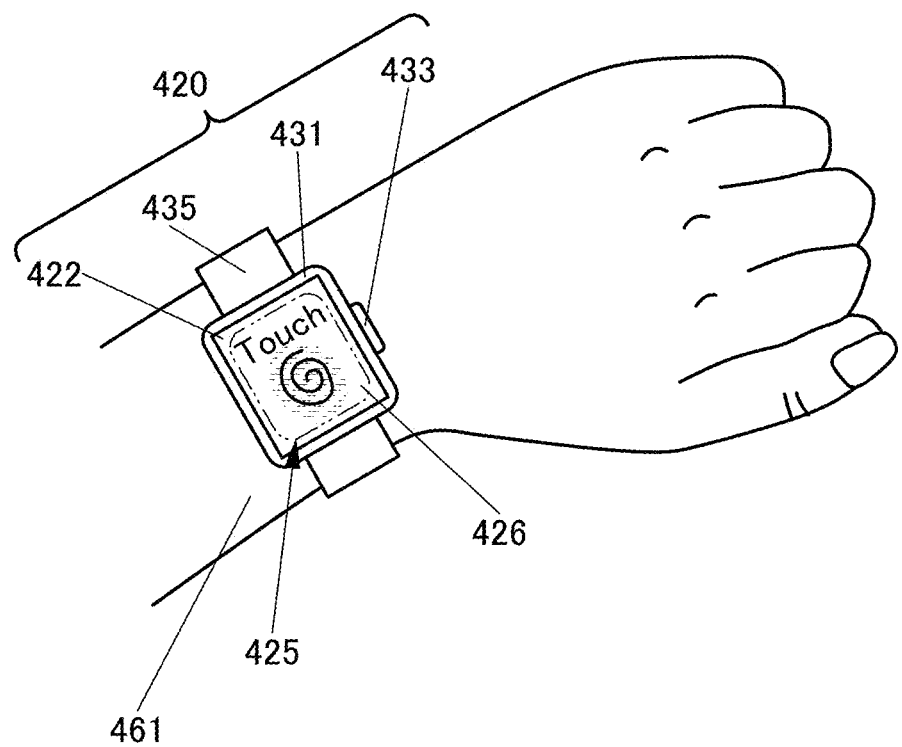
FIG. 16 is a diagram illustrating a structure example of an electronic device.

FIG. 16 illustrates an example where an image 426 includes a text "Touch" as text information for urging the user to touch in addition to an illustration that imitates a fingerprint. The illustration added with the text information can clearly show the position to the user.

Here, as the image 426, a position to be touched and an image or text information which specifies a finger to touch can be displayed in combination. For example, text information such as "Please touch with an index finger" can be displayed and authentication can be executed using fingerprint information of the index finger. Different fingers and positions to be touched may be randomly specified in each processing.

Next, in Step S13, the display elements 405 in the first region 425 are turned on. The user can be subjected to the first authentication by touching the first region 425. Since the above description can be referred to for Step S13, the detailed description thereof is omitted. Note that in Step S13, all of the display elements 405 in the pixel portion 422 may be turned on.

Since the description in <Authentication method example 1> can be referred to for the subsequent Step S14 to Step S18, the detailed description thereof is omitted.

The above is the description of the flow chart shown in FIG. 15.

<Authentication Method Example 4>

Figure 17:
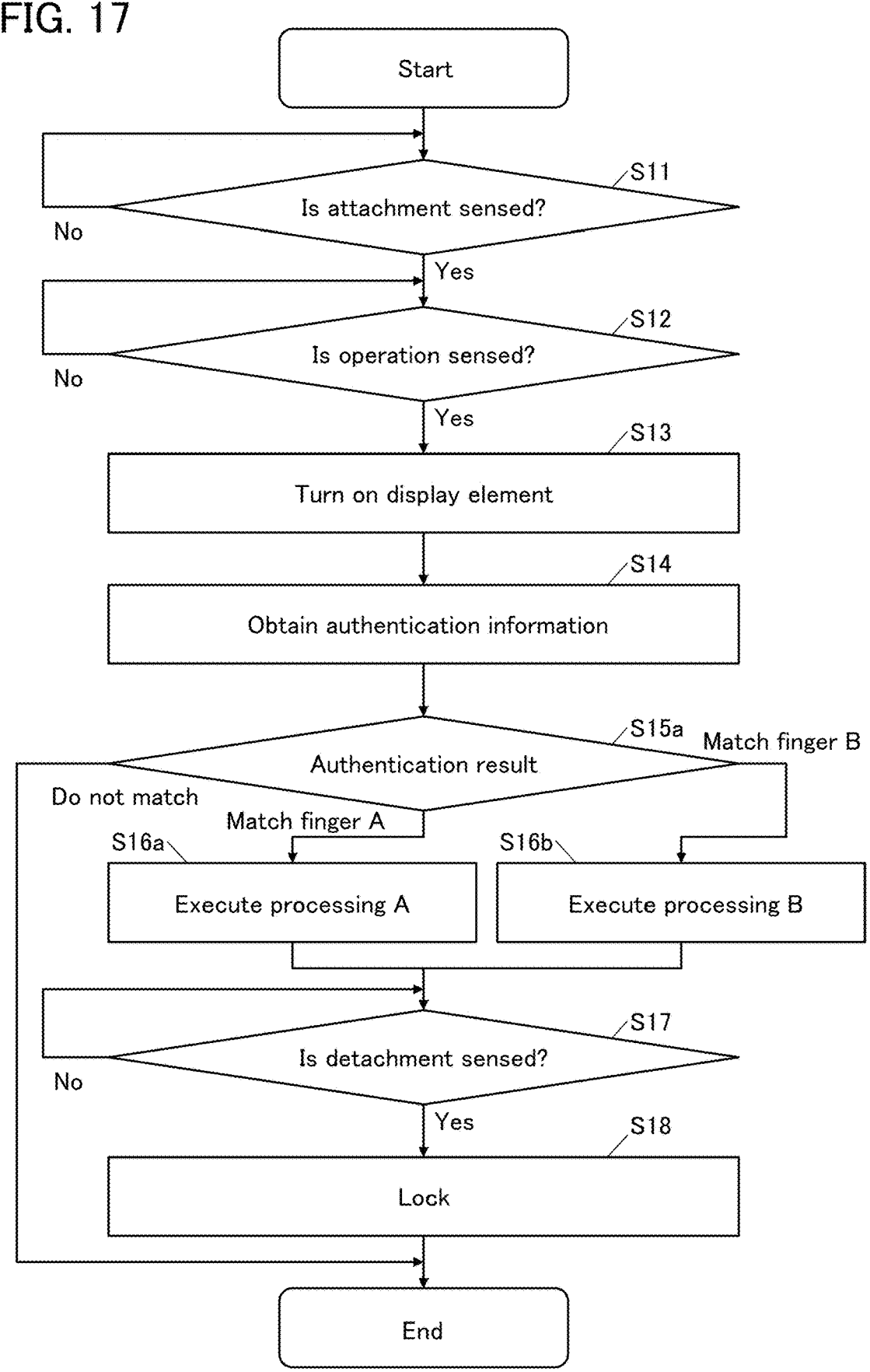
FIG. 17 is a flow chart showing an example of an authentication method.

An authentication method example different from that shown in FIG. 11 is described. FIG. 17 is a flow chart of the operation of the authentication method.

First, processing is started. At this time, the system of the electronic device 420 is in the locked state, i.e., in a state where functions that a user can execute are limited (including a log-out state and a log-off state).

Since the description of FIG. 11 can be referred to for Step S11 to Step S14, the detailed description thereof is omitted.

Next, in Step S15a, authentication processing is executed by the authentication portion 407. Specifically, the authentication portion 407 compares the authentication information output from the pixel portion 422 and a plurality of pieces of user's fingerprint information that are registered in advance and retained in the memory portion 404, and determines whether those data match or not. In the case where the authentication information output from the pixel portion 422 and fingerprint information of a finger A of the user are determined to match ("Match finger A" in Step S15a), the processing proceeds to Step S16a. In the case where the authentication information output from the pixel portion 422 and fingerprint information of a finger B of the user are determined to match ("Match finger B" in Step S15a), the processing proceeds to Step S16b. In the case where the authentication is unsuccessful, that is, the authentication information output from the pixel portion 422 is determined not to match any of the user's fingerprint information ("Do not match" in Step S15a), the processing ends.

In Step S16a, the control portion 401 executes processing A based on the fingerprint information of the finger A. In Step S16b, the control portion 401 executes processing A based on the fingerprint information of the finger B. A given operation can be assigned to each of the processing A and the processing B. For example, to each of the processing A and the processing B, start-up of a given application, operation of an application, end of an application, or the like can be assigned. For example, start-up of a video replay application can be assigned to the processing A, and start-up of an electronic payment application can be assigned to the processing B. For example, operation for replaying a given video with a video replay application may be assigned to the processing A, and operation for logging into an electronic payment application may be assigned to the processing B. It is preferable that the processing A and the processing B can be freely set by a user.

Figure 18A:
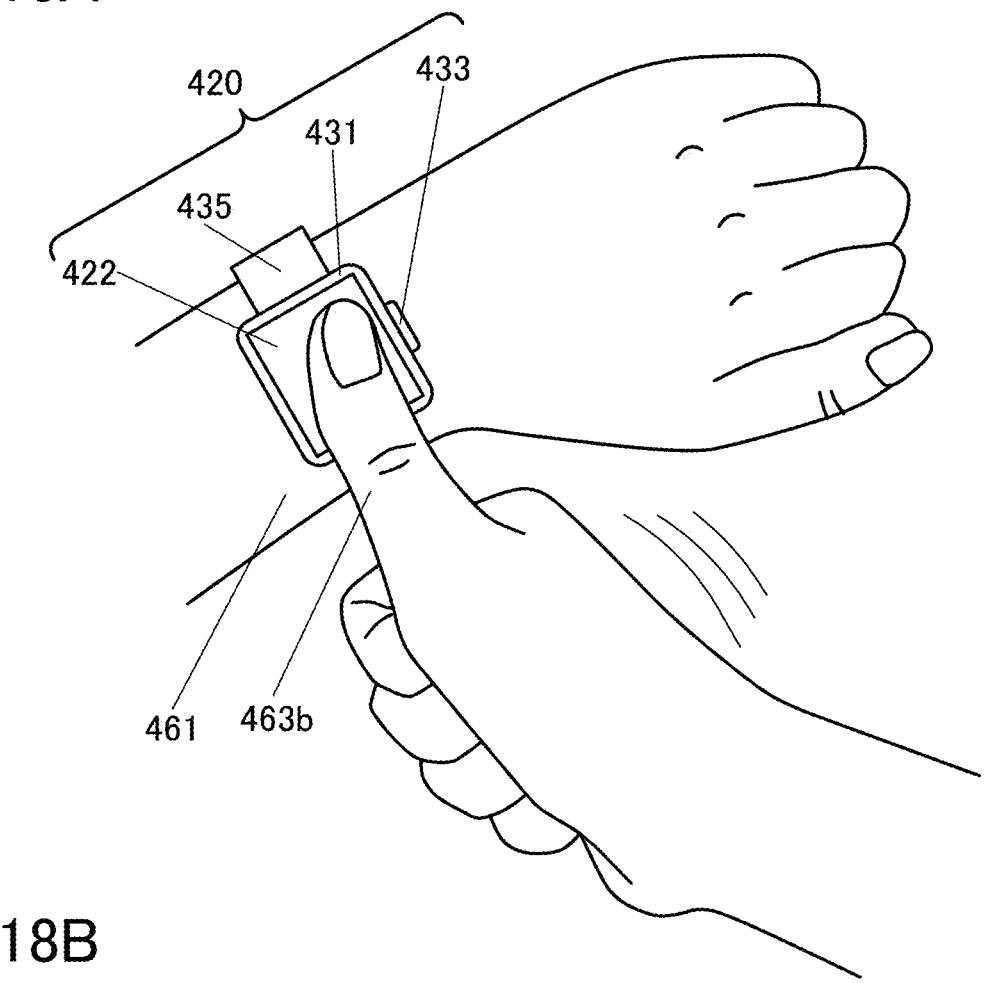
FIG. 18A is a diagram illustrating a structure example of an electronic device.
Figure 18B:
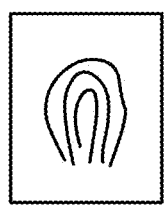
FIG. 18B is a diagram illustrating an example of authentication information.

For example, a given video can be replayed with a video replay application when the authentication information 451a is obtained using a right index finger (the finger 463a) as illustrated in FIG. 13A and FIG. 13B, and a user can log in an electronic payment application when the authentication information 451b is obtained using a right thumb (the finger 463b) as illustrated in FIG. 18A and FIG. 18B.

Note that each of the finger A and the finger B is a predetermined finger having fingerprint information retained in advance in the memory portion 404 and refers to, for example, any of a thumb, an index finger, a middle finger, a ring finger, and a little finger. Although FIG. 17 illustrates an example of using fingerprint information of two fingers, the finger A and the finger B, one embodiment of the present invention is not limited thereto. Fingerprint information of three or more fingers may be used and processing for each finger may be executed.

By performing different processing after authentication depending on a finger used for authentication, both a high security level and high usability can be achieved.

Since the description of FIG. 11 can be referred to for the subsequent Step S17 and Step S18, the detailed description thereof is omitted.

The above is the description of the flow chart shown in FIG. 17.

<Structure Example 2 of Electronic Device>

Figure 19:
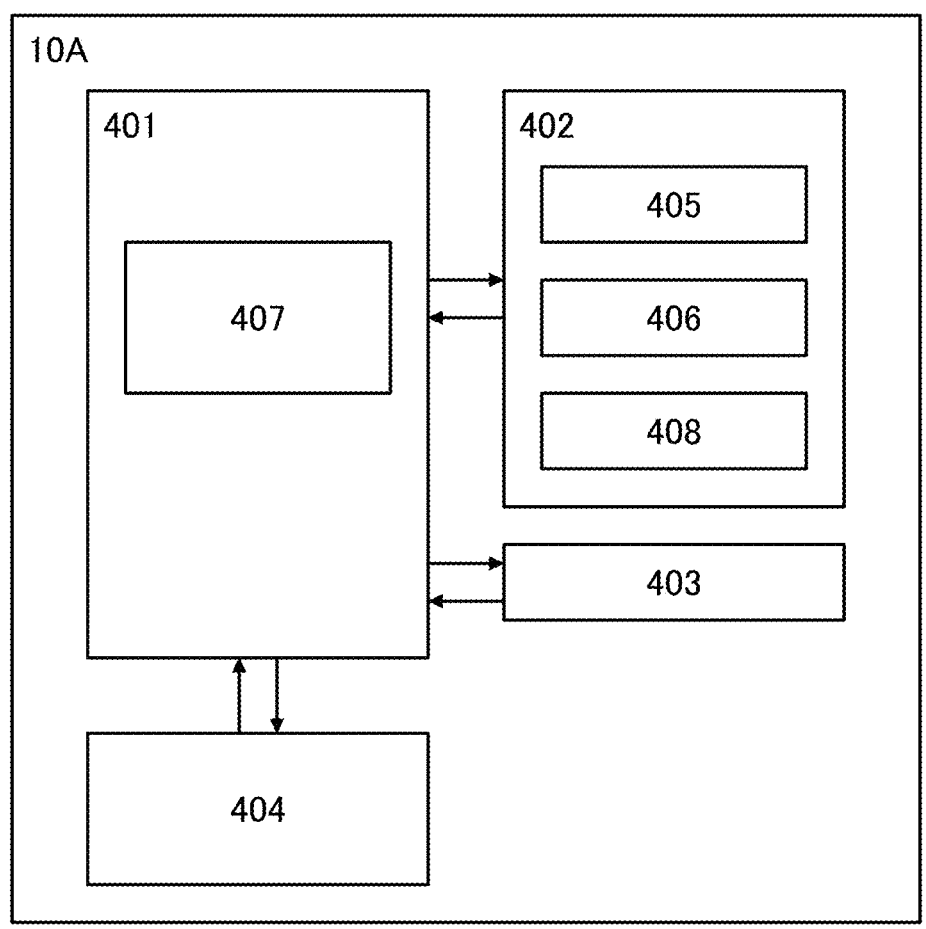
FIG. 19 is a diagram illustrating a structure example of an electronic device.

A structure example different from that of the electronic device 10 is described. FIG. 19 is a block diagram of an electronic device 10A that is one embodiment of the present invention. The electronic device 10A is different from the electronic device 10 mainly in that the pixel portion 402 includes a touch sensor 408.

The touch sensor 408 has a function of detecting a touch on the pixel portion 402, and a function of obtaining information on a touched position and outputting the information to the control portion 401.

The control portion 401 has a function of processing the positional information of an object to be sensed which is input from the touch sensor 408. In addition, when the touch sensor 408 detects a touch and outputs information on the touched position while the system of the electronic device 10A is in the locked state, the control portion 401 has a function of generating image data and outputting it to the pixel portion 402 such that the display elements 405 in the touched position in the pixel portion 402 are turned on. Furthermore, the control portion 401 has a function of requesting the pixel portion 402 to execute fingerprint image capturing while the display elements 405 are on.

The control portion 401 may also have a function of generating image data including an image showing a position to be touched by a user (a position image) on the pixel portion 402 and outputting the image data to the pixel portion 402 while the system of the electronic device 10A is in the locked state. Furthermore, the pixel portion 402 has a function of obtaining the positional information of an object to be sensed such as a finger using the touch sensor 408 and outputting the positional information to the control portion 401.

It is preferable that the pixel portion 402 be capable of obtaining fingerprint information on a finger touching any position in the pixel portion 402. That is, a range where the touch sensor 408 functions and a range where fingerprint information can be obtained preferably match or substantially match in the pixel portion 402.

<Authentication Method Example 5>

Figure 20:
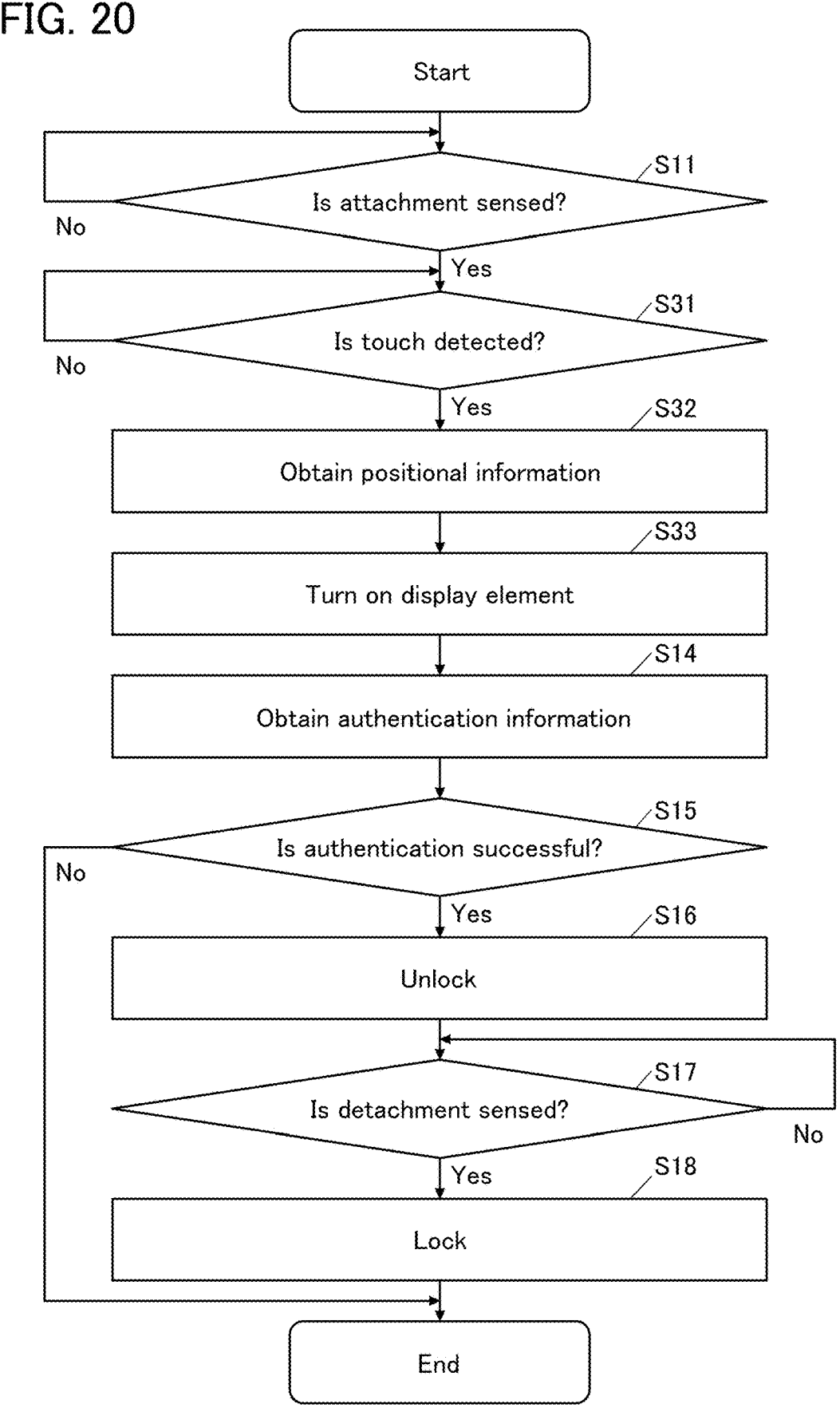
FIG. 20 is a flowchart showing an example of an authentication method.
Figure 21A:
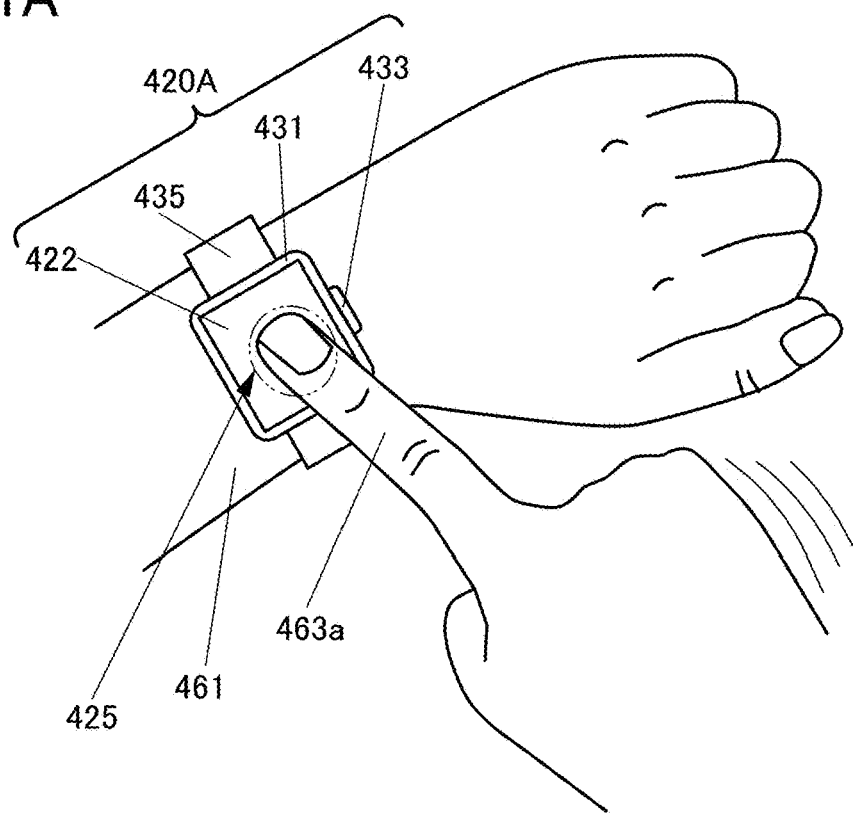
FIG. 21A and FIG. 21B are diagrams illustrating a structure example of an electronic device.

An authentication method example of the electronic device 10A is described. FIG. 20 is a flow chart of the operation of the authentication method using the electronic device 10A. FIG. 21A illustrates an electronic device 420A employing the electronic device 10A. The electronic device 420A includes the housing 431 and the pixel portion 422. The electronic device 420A includes the control portion 401, the sensor portion 403, and the memory portion 404 in the housing 431. The pixel portion 402 can be used as the pixel portion 422.

First, processing is started. At this time, the system of the electronic device 420A is in the locked state. In Step S11, attachment of the electronic device 420 to a user is sensed. Since the above description can be referred to for Step S11, the detailed description thereof is omitted.

In Step S31, whether the pixel portion 422 is touched or not is detected. Touch detection is performed by the touch sensor 408. In the case where a touch is detected ("Yes" in Step S31), the processing proceeds to Step S32. Step S31 is repeatedly executed until a touch is detected (in the case of "No" in Step S31). In the case where a touch is not detected for a certain period or a different position is touched, the processing ends.

In Step S32, the positional information of a touched position is obtained. The positional information is output from the touch sensor 408 to the control portion 401.

In Step S33, the display elements 405 at and in the vicinity of the touched position are turned on in accordance with the positional information. The touched position and the vicinity thereof can be the first region 425. At this time, the control portion 401 generates image data with which the first region 425 is bright (have a high gray level) and the other portions are dark (have a low gray level) and outputs the image data to the pixel portion 422, whereby the pixel portion 422 displays an image based on the image data.

In Step S33, the first region 425 may perform bright display (be turned on) and the other portions may be turned off. Note that a given image may be displayed in a region other than the first region 425.

A range where the display elements 405 are turned on (the first region 425) is preferably a range that is hidden by a finger. In the case where a finger touches a screen, a contact surface of the finger is positioned inside the outline of the finger that is seen by a user and the projected area of the finger on the screen is larger than the contact area of the finger. Therefore, assuming that the contact area is 100%, the range that emits light can be larger than or equal to 50% and smaller than or equal to 150%, preferably larger than or equal to 70% and smaller than or equal to 130%, further preferably larger than or equal to 80% and smaller than or equal to 120%. When the light-emitting area is smaller than 50%, fingerprint information obtained by imaging is insufficient and thus the accuracy of authentication might be decreased. Meanwhile, when the light-emitting area exceeds 150%, a light source might be directly recognized by a user.

Alternatively, a structure may be employed in which the range that emits light is a circle of radius r whose center is a touched position and the value of the radius r can be set in advance. The size and shape of a finger varies depending on user's age, gender, physique, or the like, so that a user may be allowed to set the radius r of the circle, which defines the range that emits light.

Figure 21B:
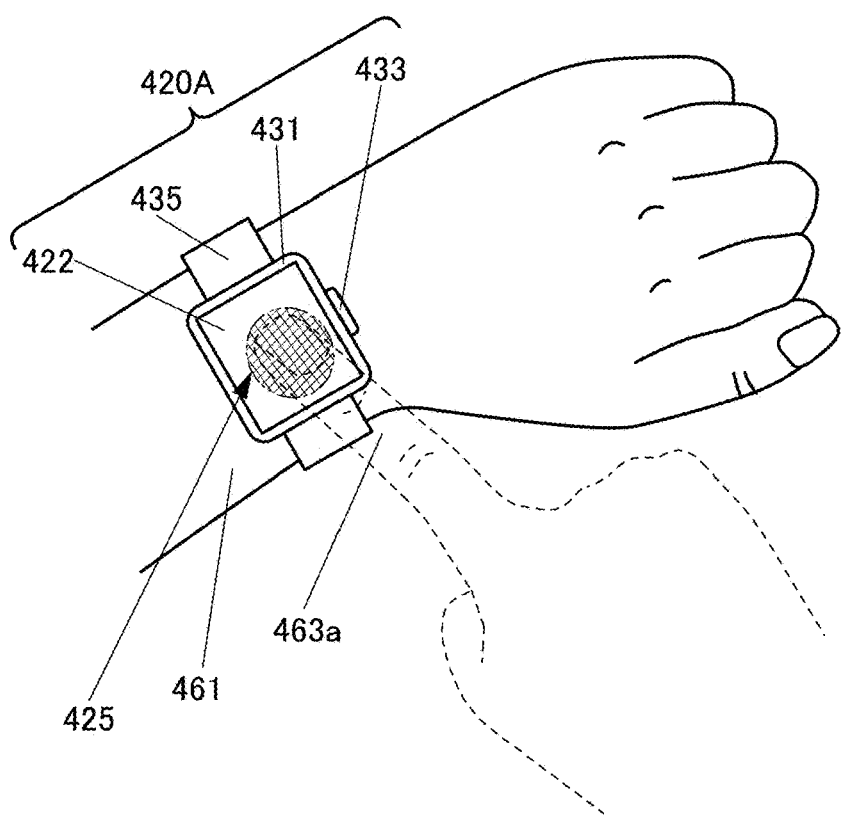

FIG. 21A illustrates a state where a region where a touch is detected by the touch sensor 408 and the vicinity of the region are used as the first region 425 and the display elements 405 in the first region 425 are turned on. In FIG. 21B, the finger 463 in FIG. 21A is illustrated to be transparent with the outline indicated by a dashed line, and the first region 425 is hatched. As illustrated in FIG. 21A and FIG. 21B, the first region 425 that emits bright light is hidden by the finger 463 and thus is less likely to be recognized by a user. Therefore, fingerprint authentication can be performed without causing stress to the user. In addition, the electronic device 420A can perform fingerprint authentication at any position in the display portion 422.

Since the description of FIG. 11 can be referred to for the subsequent Step S14 to Step S18, the detailed description thereof is omitted.

The above is the description of the flow chart shown in FIG. 20.

The above is the description of the structure examples and the authentication method examples of the electronic device that is one embodiment of the present invention.

Note that an authentication method, a processing method, an operation method, a driving method, a display method, or the like that is executed by the electronic device of one embodiment of the present invention might be described as a program, for example. For example, a program in which the authentication method, the processing method, the operation method, the driving method, the display method, or the like that is described above as an example and executed by the electronic device 420 or the like is written can be stored in a non-temporary storage medium and can be read and executed by an arithmetic device or the like included in the control portion 401 of the electronic device 420. That is, a program that makes hardware execute the authentication method, the operation method, or the like described above as an example and a non-transitory storage medium storing the program are embodiments of the present invention.

At least part of the structure examples, the drawings corresponding thereto, and the like shown in this embodiment as an example can be combined with the other structure examples, the other drawings, and the like as appropriate.

At least part of this embodiment can be implemented in combination with the other embodiments described in this specification as appropriate.

Embodiment 2

In this embodiment, pixel portions of an electronic device of one embodiment of the present invention will be described.

The pixel portion of the electronic device of one embodiment of the present invention can have any of the following structures: a top-emission structure in which light is emitted in a direction opposite to the substrate where the light-emitting elements are formed, a bottom-emission structure in which light is emitted toward the substrate where the light-emitting elements are formed, and a dual-emission structure in which light is emitted toward both surfaces.

In this embodiment, a top-emission structure is described as an example.

In this specification and the like, unless otherwise specified, in describing a structure including a plurality of components (e.g., light-emitting elements or light-emitting layers), alphabets are not added when a common part for the components is described. For example, when a common part of a light-emitting layer 283R, a light-emitting layer 283G, and the like is described, the light-emitting layers are simply referred to as a light-emitting layer 283, in some cases.

<Structure Example 1>

Figure 22A:
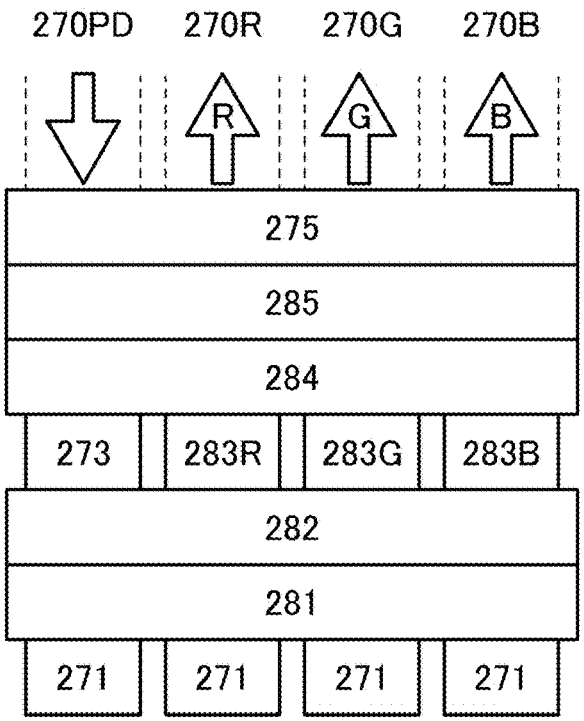
FIG. 22A and FIG. 22B are diagrams illustrating structure examples of a light-emitting element, a light-receiving element, and a light-emitting and light-receiving element.

A pixel portion 280A illustrated in FIG. 22A includes a light-receiving element 270PD, a light-emitting element 270R that emits red (R) light, a light-emitting element 270G that emits green (G) light, and a light-emitting element 270B that emits blue (B) light.

Each of the light-emitting elements includes a pixel electrode 271, a hole-injection layer 281, a hole-transport layer 282, the light-emitting layer 283, an electron-transport layer 284, an electron-injection layer 285, and a common electrode 275, which are stacked in this order. The light-emitting element 270R includes the light-emitting layer 283R, the light-emitting element 270G includes the light-emitting layer 283G, and the light-emitting element 270B includes a light-emitting layer 283B. The light-emitting layer 283R contains a light-emitting substance that emits red light, the light-emitting layer 283G contains a light-emitting substance that emits green light, and the light-emitting layer 283B contains a light-emitting substance that emits blue light.

The light-emitting elements are electroluminescent elements that emit light to the common electrode 275 side by voltage application between the pixel electrodes 271 and the common electrode 275.

The light-receiving element 270PD includes the pixel electrode 271, the hole-injection layer 281, the hole-transport layer 282, an active layer 273, the electron-transport layer 284, the electron-injection layer 285, and the common electrode 275, which are stacked in this order.

The light-receiving element 270PD is a photoelectric conversion element that receives light incident from the outside of the pixel portion 280A and converts it into an electric signal.

In the description made in this embodiment, the pixel electrode 271 functions as an anode and the common electrode 275 functions as a cathode in both the light-emitting element and the light-receiving element. In other words, when the light-receiving element is driven by application of reverse bias between the pixel electrode 271 and the common electrode 275, light incident on the light-receiving element can be detected and charge can be generated and extracted as current.

In the pixel portion included in the electronic device of this embodiment, an organic compound is used for the active layer 273 of the light-receiving element 270PD. In the light-receiving element 270PD, the layers other than the active layer 273 can have structures in common with the layers in the light-emitting elements. Therefore, the light-receiving element 270PD can be formed concurrently with the formation of the light-emitting elements only by adding a step of forming the active layer 273 in the fabrication process of the light-emitting elements. In addition, the light-emitting elements and the light-receiving element 270PD can be formed over one substrate. Accordingly, the light-receiving element 270PD can be incorporated into the pixel portion without a significant increase in the number of fabrication steps.

The pixel portion 280A is an example where the light-receiving element 270PD and the light-emitting elements have a common structure except that the active layer 273 of the light-receiving element 270PD and the light-emitting layers 283 of the light-emitting elements are separately formed. Note that the structures of the light-receiving element 270PD and the light-emitting elements are not limited thereto. The light-receiving element 270PD and the light-emitting elements may include separately formed layers other than the active layer 273 and the light-emitting layers 283. The light-receiving element 270PD and the light-emitting elements preferably include at least one layer used in common (common layer). Thus, the light-receiving element 270PD can be incorporated into the pixel portion without a significant increase in the number of fabrication steps.

A conductive film that transmits visible light is used as the electrode through which light is extracted, which is either the pixel electrode 271 or the common electrode 275. A conductive film that reflects visible light is preferably used as the electrode through which light is not extracted.

The light-emitting element included in the pixel portion included in the electronic device of this embodiment preferably employs a micro optical resonator (microcavity) structure. Thus, one of the pair of electrodes of the light-emitting element is preferably an electrode having properties of transmitting and reflecting visible light (a semi-transmissive and semi-reflective electrode), and the other is preferably an electrode having a property of reflecting visible light (a reflective electrode). When the light-emitting element has a microcavity structure, light obtained from the light-emitting layer can be resonated between both of the electrodes, whereby light emitted from the light-emitting element can be intensified.

Note that the semi-transmissive and semi-reflective electrode can have a stacked-layer structure of a reflective electrode and an electrode having a property of transmitting visible light (also referred to as a transparent electrode).

The transparent electrode has a light transmittance higher than or equal to 40%. For example, an electrode having a visible light (light with a wavelength greater than or equal to 400 nm and less than 750 nm) transmittance higher than or equal to 40% is preferably used in the light-emitting elements. The semi-transmissive and semi-reflective electrode has a visible light reflectance of higher than or equal to 10% and lower than or equal to 95%, preferably higher than or equal to 30% and lower than or equal to 80%. The reflective electrode has a visible light reflectance higher than or equal to 40% and lower than or equal to 100%, preferably higher than or equal to 70% and lower than or equal to 100%. These electrodes preferably have a resistivity lower than or equal to $1 \times 10^{-2}$ Ωcm. Note that in the case where any of the light-emitting elements emits near-infrared light (light with a wavelength greater than or equal to 750 nm and less than or equal to 1300 nm), the near-infrared light transmittance and reflectance of these electrodes preferably satisfy the above-described numerical ranges of the visible light transmittance and reflectance.

The light-emitting element includes at least the light-emitting layer 283. The light-emitting element may further include, as a layer other than the light-emitting layer 283, a layer containing a substance with a high hole-injection property, a substance with a high hole-transport property, a hole-blocking material, a substance with a high electron-transport property, a substance with a high electron-injection property, a substance with a bipolar property (a substance with a high electron- and hole-transport property), or the like.

For example, the light-emitting elements and the light-receiving element can share at least one of the hole-injection layer, the hole-transport layer, the electron-transport layer, and the electron-injection layer. Furthermore, at least one of the hole-injection layer, the hole-transport layer, the electron-transport layer, and the electron-injection layer can be separately formed for the light-emitting elements and the light-receiving element.

The hole-injection layer is a layer injecting holes from an anode to the hole-transport layer, and is a layer containing a material with a high hole-injection property. As the material with a high hole-injection property, it is possible to use, for example, a composite material containing a hole-transport material (e.g., an aromatic amine compound) and an acceptor material (electron-accepting material).

In the light-emitting element, the hole-transport layer is a layer transporting holes, which are injected from the anode by the hole-injection layer, to the light-emitting layer. In the light-receiving element, the hole-transport layer is a layer transporting holes, which are generated in the active layer on the basis of incident light, to the anode. The hole-transport layer is a layer containing a hole-transport material. As the hole-transport material, a substance having a hole mobility greater than or equal to $10^{-6}$ cm$^2$/Vs is preferable. Note that other substances can also be used as long as they have a property of transporting more holes than electrons. As the hole-transport material, a material with a high hole-transport property, such as a π-electron rich heteroaromatic compound (e.g., a carbazole derivative, a thiophene derivative, or a furan derivative) or an aromatic amine (a compound having an aromatic amine skeleton), is preferable.

In the light-emitting element, the electron-transport layer is a layer transporting electrons, which are injected from the cathode by the electron-injection layer, to the light-emitting layer. In the light-receiving element, the electron-transport layer is a layer transporting electrons, which are generated in the active layer on the basis of incident light, to the cathode. The electron-transport layer is a layer containing an electron-transport material. As the electron-transport material, a substance having an electron mobility greater than or equal to $1\times10^{-6}$ cm$^2$/Vs is preferable. Note that other substances can also be used as long as they have a property of transporting more electrons than holes. As the electron-transport material, it is possible to use a material with a high electron-transport property, such as a metal complex having a quinoline skeleton, a metal complex having a benzoquinoline skeleton, a metal complex having an oxazole skeleton, a metal complex having a thiazole skeleton, an oxadiazole derivative, a triazole derivative, an imidazole derivative, an oxazole derivative, a thiazole derivative, a phenanthroline derivative, a quinoline derivative having a quinoline ligand, a benzoquinoline derivative, a quinoxaline derivative, a dibenzoquinoxaline derivative, a pyridine derivative, a bipyridine derivative, a pyrimidine derivative, or a π-electron deficient heteroaromatic compound such as a nitrogen-containing heteroaromatic compound.

The electron-injection layer is a layer injecting electrons from the cathode to the electron-transport layer, and is a layer containing a material with a high electron-injection property. As the material with a high electron-injection property, an alkali metal, an alkaline earth metal, or a compound thereof can be used. As the material with a high electron-injection property, a composite material containing an electron-transport material and a donor material (electron-donating material) can also be used.

The light-emitting layer 283 is a layer containing a light-emitting substance. The light-emitting layer 283 can contain one or more kinds of light-emitting substances. As the light-emitting substance, a substance that exhibits an emission color of blue, purple, bluish purple, green, yellowish green, yellow, orange, red, or the like is appropriately used. As the light-emitting substance, a substance that emits near-infrared light can also be used.

Examples of the light-emitting substance include a fluorescent material, a phosphorescent material, a TADF material, and a quantum dot material.

Examples of the fluorescent material include a pyrene derivative, an anthracene derivative, a triphenylene derivative, a fluorene derivative, a carbazole derivative, a dibenzothiophene derivative, a dibenzofuran derivative, a dibenzoquinoxaline derivative, a quinoxaline derivative, a pyridine derivative, a pyrimidine derivative, a phenanthrene derivative, and a naphthalene derivative.

Examples of the phosphorescent material include an organometallic complex (particularly an iridium complex) having a 4H-triazole skeleton, a 1H-triazole skeleton, an imidazole skeleton, a pyrimidine skeleton, a pyrazine skeleton, or a pyridine skeleton; an organometallic complex (particularly an iridium complex) having a phenylpyridine derivative including an electron-withdrawing group as a ligand; a platinum complex; and a rare earth metal complex.

The light-emitting layer 283 may include one or more kinds of organic compounds (e.g., a host material and an assist material) in addition to the light-emitting substance (a guest material). As one or more kinds of organic compounds, one or both of the hole-transport material and the electron-transport material can be used. Alternatively, as one or more kinds of organic compounds, a bipolar material or a TADF material may be used.

The light-emitting layer 283 preferably contains a phosphorescent material and a combination of a hole-transport material and an electron-transport material that easily forms an exciplex. With such a structure, light emission can be efficiently obtained by ExTET (Exciplex-Triplet Energy Transfer), which is energy transfer from an exciplex to a light-emitting substance (a phosphorescent material). When a combination of materials is selected so as to form an exciplex that exhibits light emission whose wavelength overlaps with the wavelength of a lowest-energy-side absorption band of the light-emitting substance, energy can be transferred smoothly and light emission can be obtained efficiently. With this structure, high efficiency, low-voltage driving, and a long lifetime of the light-emitting element can be achieved at the same time.

In the combination of materials for forming an exciplex, the HOMO level (highest occupied molecular orbital level) of the hole-transport material is preferably higher than or equal to the HOMO level of the electron-transport material. The LUMO level (lowest unoccupied molecular orbital level) of the hole-transport material is preferably higher than or equal to the LUMO level of the electron-transport material. The LUMO levels and the HOMO levels of the materials can be derived from the electrochemical characteristics (reduction potentials and oxidation potentials) of the materials that are measured by cyclic voltammetry (CV).

Note that the formation of an exciplex can be confirmed by a phenomenon in which the emission spectrum of a mixed film in which the hole-transport material and the electron-transport material are mixed is shifted to the longer wavelength side than the emission spectrum of each of the materials (or has another peak on the longer wavelength side), observed by comparison of the emission spectrum of the hole-transport material, the emission spectrum of the electron-transport material, and the emission spectrum of the mixed film of these materials, for example. Alternatively, the formation of an exciplex can be confirmed by a difference in transient response, such as a phenomenon in which the transient photoluminescence (PL) lifetime of the mixed film has longer lifetime components or has a larger proportion of delayed components than that of each of the materials, observed by comparison of the transient PL of the hole-transport material, the transient PL of the electron-transport material, and the transient PL of the mixed film of these materials. The transient PL can be rephrased as transient electroluminescence (EL). That is, the formation of an exciplex can also be confirmed by a difference in transient response observed by comparison of the transient EL of the hole-transport material, the transient EL of the electron-transport material, and the transient EL of the mixed film of these materials.

The active layer 273 includes a semiconductor. Examples of the semiconductor include an inorganic semiconductor such as silicon and an organic semiconductor including an organic compound. This embodiment shows an example where an organic semiconductor is used as the semiconductor included in the active layer 273. The use of an organic semiconductor is preferable because the light-emitting layer 283 and the active layer 273 can be formed by the same method (e.g., a vacuum evaporation method) and thus the same manufacturing apparatus can be used.

Examples of an n-type semiconductor material contained in the active layer 273 include electron-accepting organic semiconductor materials such as fullerene (e.g., $C_{60}$ and $C_{70}$) and a fullerene derivative. Fullerene has a soccer ball-like shape, which is energetically stable. Both the HOMO level and the LUMO level of fullerene are deep (low). Having a deep LUMO level, fullerene has an extremely high electron-accepting property (acceptor property). When π-electron conjugation (resonance) spreads in a plane as in benzene, the electron-donating property (donor property) usually increases; however, since fullerene has a spherical shape, fullerene has a high electron-accepting property even when I-electrons widely spread. The high electron-accepting property efficiently causes rapid charge separation and is useful for a light-receiving element. Both $C_{60}$ and $C_{70}$ have a wide absorption band in the visible light region, and $C_{70}$ is especially preferable because of having a larger r-electron conjugation system and a wider absorption band in the long wavelength region than $C_{60}$.

Examples of the n-type semiconductor material include a metal complex having a quinoline skeleton, a metal complex having a benzoquinoline skeleton, a metal complex having an oxazole skeleton, a metal complex having a thiazole skeleton, an oxadiazole derivative, a triazole derivative, an imidazole derivative, an oxazole derivative, a thiazole derivative, a phenanthroline derivative, a quinoline derivative, a benzoquinoline derivative, a quinoxaline derivative, a dibenzoquinoxaline derivative, a pyridine derivative, a bipyridine derivative, a pyrimidine derivative, a naphthalene derivative, an anthracene derivative, a coumarin derivative, a rhodamine derivative, a triazine derivative, and a quinone derivative.

Examples of a p-type semiconductor material contained in the active layer 273 include electron-donating organic semiconductor materials such as copper (II) phthalocyanine (CuPc), tetraphenyldibenzoperiflanthene (DBP), zinc phthalocyanine (ZnPc), tin phthalocyanine (SnPc), and quinacridone.

Examples of a p-type semiconductor material include a carbazole derivative, a thiophene derivative, a furan derivative, and a compound having an aromatic amine skeleton. Other examples of the p-type semiconductor material include a naphthalene derivative, an anthracene derivative, a pyrene derivative, a triphenylene derivative, a fluorene derivative, a pyrrole derivative, a benzofuran derivative, a benzothiophene derivative, an indole derivative, a dibenzofuran derivative, a dibenzothiophene derivative, an indolocarbazole derivative, a porphyrin derivative, a phthalocyanine derivative, a naphthalocyanine derivative, a quinacridone derivative, a polyphenylene vinylene derivative, a polyparaphenylene derivative, a polyfluorene derivative, a polyvinylcarbazole derivative, and a polythiophene derivative.

The HOMO level of the electron-donating organic semiconductor material is preferably shallower (higher) than the HOMO level of the electron-accepting organic semiconductor material. The LUMO level of the electron-donating organic semiconductor material is preferably shallower (higher) than the LUMO level of the electron-accepting organic semiconductor material.

Fullerene having a spherical shape is preferably used as the electron-accepting organic semiconductor material, and an organic semiconductor material having a substantially planar shape is preferably used as the electron-donating organic semiconductor material. Molecules of similar shapes tend to aggregate, and aggregated molecules of similar kinds, which have molecular orbital energy levels close to each other, can improve the carrier-transport property.

For example, the active layer 273 is preferably formed by co-evaporation of an n-type semiconductor and a p-type semiconductor. Alternatively, the active layer 273 may be formed by stacking an n-type semiconductor and a p-type semiconductor.

Either a low molecular compound or a high molecular compound can be used for the light-emitting element and the light-receiving element, and an inorganic compound may also be contained. Each of the layers included in the light-emitting element and the light-receiving element can be formed by an evaporation method (including a vacuum evaporation method), a transfer method, a printing method, an inkjet method, a coating method, or the like.

Figure 22B:
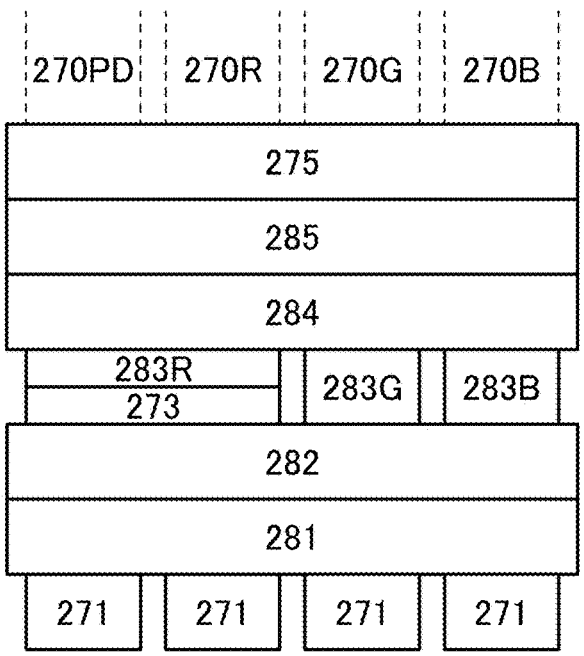

A pixel portion 280B illustrated in FIG. 22B is different from the pixel portion 280A in that the light-receiving element 270PD and the light-emitting element 270R have the same structure.

The light-receiving element 270PD and the light-emitting element 270R share the active layer 273 and the light-emitting layer 283R.

Here, it is preferable that the light-receiving element 270PD have a structure in common with the light-emitting element that emits light with a wavelength longer than that of the light desired to be detected. For example, the light-receiving element 270PD having a structure in which blue light is detected can have a structure which is similar to that of one or both of the light-emitting element 270R and the light-emitting element 270G. For example, the light-receiving element 270PD having a structure in which green light is detected can have a structure similar to that of the light-emitting element 270R.

When the light-receiving element 270PD and the light-emitting element 270R have a common structure, the number of deposition steps and the number of masks can be smaller than those for the structure in which the light-receiving element 270PD and the light-emitting element 270R include separately formed layers. As a result, the number of fabrication steps and the fabrication cost of the pixel portion can be reduced.

When the light-receiving element 270PD and the light-emitting element 270R have a common structure, a margin for misalignment can be narrower than that for the structure in which the light-receiving element 270PD and the light-emitting element 270R include separately formed layers. Accordingly, the aperture ratio of a pixel can be increased, so that the outcoupling efficiency of the pixel portion can be increased. This can extend the lifetime of the light-emitting element. Furthermore, the pixel portion can have a high luminance. Moreover, the pixel portion can have a high resolution.

The light-emitting layer 283R contains a light-emitting material that emits red light. The active layer 273 includes an organic compound that absorbs light with a wavelength shorter than that of red light (e.g., one or both of green light and blue light). The active layer 273 preferably includes an organic compound that does not easily absorb red light and that absorbs light with a wavelength shorter than that of red light. In this way, red light can be efficiently extracted from the light-emitting element 270R, and the light-receiving element 270PD can detect light with a wavelength shorter than that of red light at high accuracy.

Although the light-emitting element 270R and the light-receiving element 270PD have the same structure in an example of the pixel portion 280B, the light-emitting element 270R and the light-receiving element 270PD may include optical adjustment layers with different thicknesses.

Figure 23A:
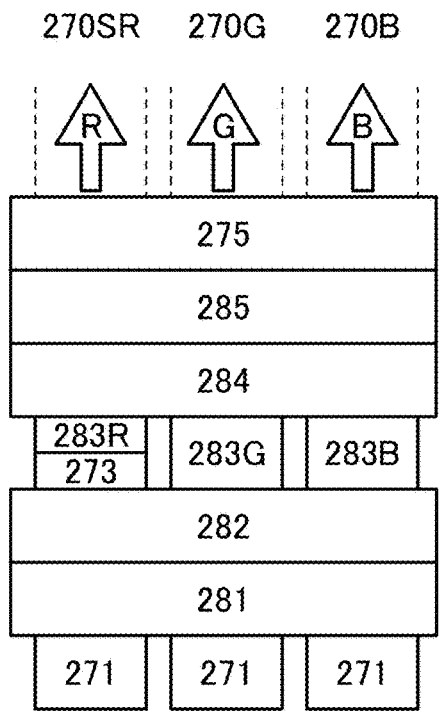
FIG. 23A to FIG. 23G are diagrams illustrating structure examples of a light-emitting element, a light-receiving element, and a light-emitting and light-receiving element.
Figure 23B:
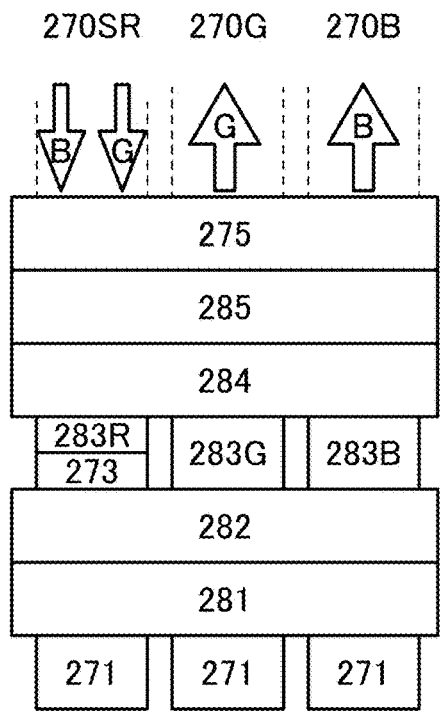

A display device 280C illustrated in FIG. 23A and FIG. 23B includes a light-emitting and light-receiving element 270SR that emits red (R) light and has a light-receiving function, the light-emitting element 270G that emits green (G) light, and the light-emitting element 270B that emits blue (B) light. The above description of the pixel portion 280A and the like can be referred to for the structures of the light-emitting element 270G and the light-emitting element 270B.

The light-emitting and light-receiving element 270SR includes the pixel electrode 271, the hole-injection layer 281, the hole-transport layer 282, the active layer 273, the light-emitting layer 283R, the electron-transport layer 284, the electron-injection layer 285, and the common electrode 275, which are stacked in this order. The light-emitting and light-receiving element 270SR has the same structure as the light-emitting element 270R and the light-receiving element 270PD in the pixel portion 280B.

FIG. 23A illustrates a case where the light-emitting and light-receiving element 270SR functions as a light-emitting element. In the example illustrated in FIG. 23A, the light-emitting element 270B emits blue light, the light-emitting element 270G emits green light, and the light-emitting and light-receiving element 270SR emits red light.

FIG. 23B illustrates a case where the light-emitting and light-receiving element 270SR functions as a light-receiving element. In the example illustrated in FIG. 23B, the light-emitting and light-receiving element 270SR detects blue light emitted by the light-emitting element 270B and green light emitted by the light-emitting element 270G.

The light-emitting element 270B, the light-emitting element 270G, and the light-emitting and light-receiving element 270SR each include the pixel electrode 271 and the common electrode 275. In this embodiment, the case where the pixel electrode 271 functions as an anode and the common electrode 275 functions as a cathode is described as an example. When the light-emitting and light-receiving element 270SR is driven by application of reverse bias between the pixel electrode 271 and the common electrode 275, light incident on the light-emitting and light-receiving element 270SR can be detected and charge can be generated and extracted as current.

It can be said that the light-emitting and light-receiving element 270SR has a structure in which the active layer 273 is added to the light-emitting element. That is, the light-emitting and light-receiving element 270SR can be formed concurrently with the formation of the light-emitting element only by adding a step of forming the active layer 273 in the fabrication process of the light-emitting element. In addition, the light-emitting element and the light-emitting and light-receiving element can be formed over one substrate. Thus, the pixel portion can be provided with one or both of an image capturing function and a sensing function without a significant increase in the number of fabrication steps.

The stacking order of the light-emitting layer 283R and the active layer 273 is not limited. FIG. 23A and FIG. 23B each illustrate an example where the active layer 273 is provided over the hole-transport layer 282, and the light-emitting layer 283R is provided over the active layer 273. The stacking order of the light-emitting layer 283R and the active layer 273 may be reversed.

The light-emitting and light-receiving element may exclude at least one layer of the hole-injection layer 281, the hole-transport layer 282, the electron-transport layer 284, and the electron-injection layer 285. Furthermore, the light-emitting and light-receiving element may include another functional layer such as a hole-blocking layer or an electron-blocking layer.

In the light-emitting and light-receiving element, a conductive film that transmits visible light is used as the electrode through which light is extracted. A conductive film that reflects visible light is preferably used as the electrode through which light is not extracted.

The functions and materials of the layers included in the light-emitting and light-receiving element are similar to those of the layers included in the light-emitting elements and the light-receiving element and thus are not described in detail.

FIG. 23C to FIG. 23G illustrate examples of stacked-layer structures of light-emitting and light-receiving elements.

Figure 23C:
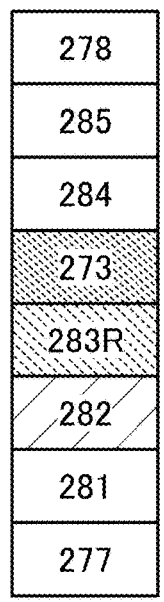

The light-emitting and light-receiving element illustrated in FIG. 23C includes a first electrode 277, the hole-injection layer 281, the hole-transport layer 282, the light-emitting layer 283R, the active layer 273, the electron-transport layer 284, the electron-injection layer 285, and a second electrode 278.

FIG. 23C illustrates an example where the light-emitting layer 283R is provided over the hole-transport layer 282, and the active layer 273 is stacked over the light-emitting layer 283R.

As illustrated in FIG. 23A to FIG. 23C, the active layer 273 and the light-emitting layer 283R may be in contact with each other.

Figure 23D:
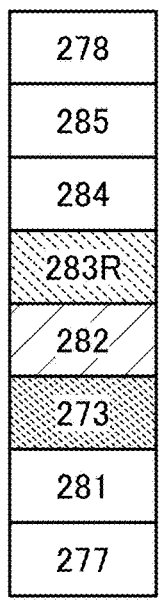

A buffer layer is preferably provided between the active layer 273 and the light-emitting layer 283R. In this case, the buffer layer preferably has a hole-transport property and an electron-transport property. For example, a substance with a bipolar property is preferably used for the buffer layer. Alternatively, as the buffer layer, at least one layer of a hole-injection layer, a hole-transport layer, an electron-transport layer, an electron-injection layer, a hole-blocking layer, an electron-blocking layer, and the like can be used. FIG. 23D illustrates an example where the hole-transport layer 282 is used as the buffer layer.

The buffer layer provided between the active layer 273 and the light-emitting layer 283R can inhibit transfer of excitation energy from the light-emitting layer 283R to the active layer 273. Furthermore, the buffer layer can also be used to adjust the optical path length (cavity length) of the microcavity structure. Thus, high emission efficiency can be obtained from a light-emitting and light-receiving element including the buffer layer between the active layer 273 and the light-emitting layer 283R.

Figure 23E:
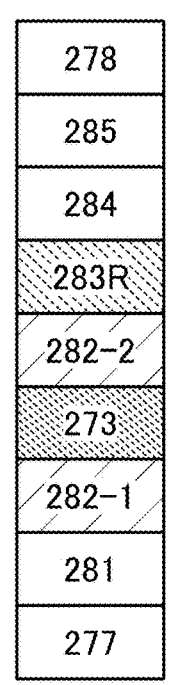

FIG. 23E illustrates an example of a stacked-layer structure in which a hole-transport layer 282-1, the active layer 273, a hole-transport layer 282-2, and the light-emitting layer 283R are stacked in this order over the hole-injection layer 281. The hole-transport layer 282-2 functions as a buffer layer. The hole-transport layer 282-1 and a hole-transport layer 281-2 may contain the same material or different materials. Instead of the hole-transport layer 281-2, any of the above layers that can be used as the buffer layer may be used. The positions of the active layer 273 and the light-emitting layer 283R may be interchanged.

Figure 23F:
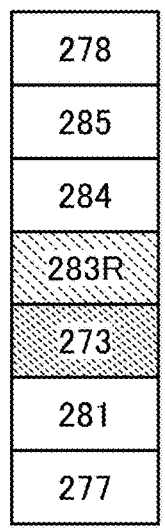

The light-emitting and light-receiving element illustrated in FIG. 23F is different from the light-emitting and light-receiving element illustrated in FIG. 23A in not including the hole-transport layer 282. In this manner, the light-emitting and light-receiving element may exclude at least one layer of the hole-injection layer 281, the hole-transport layer 282, the electron-transport layer 284, and the electron-injection layer 285. Furthermore, the light-emitting and light-receiving element may include another functional layer such as a hole-blocking layer or an electron-blocking layer.

Figure 23G:
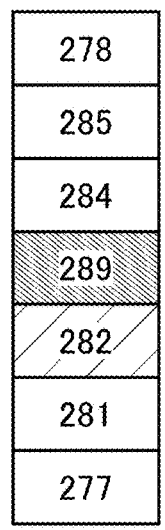

The light-emitting and light-receiving element illustrated in FIG. 23G is different from the light-emitting and light-receiving element illustrated in FIG. 23A in including a layer 289 serving as both a light-emitting layer and an active layer instead of including the active layer 273 and the light-emitting layer 283R.

As the layer 289 serving as both a light-emitting layer and an active layer, it is possible to use, for example, a layer containing three materials which are an n-type semiconductor that can be used for the active layer 273, a p-type semiconductor that can be used for the active layer 273, and a light-emitting substance that can be used for the light-emitting layer 283R.

Note that an absorption band on the lowest energy side of an absorption spectrum of a mixed material of the n-type semiconductor and the p-type semiconductor and a maximum peak of an emission spectrum (PL spectrum) of the light-emitting substance preferably do not overlap with each other and are further preferably positioned fully apart from each other.

<Structure Example 2>

A detailed structure of a display device that can be used for the pixel portion of the electronic device of one embodiment of the present invention will be described below. Here, in particular, an example of the display device including light-receiving elements and light-emitting elements will be described.

[Structure Example 2-1]

Figure 24A:
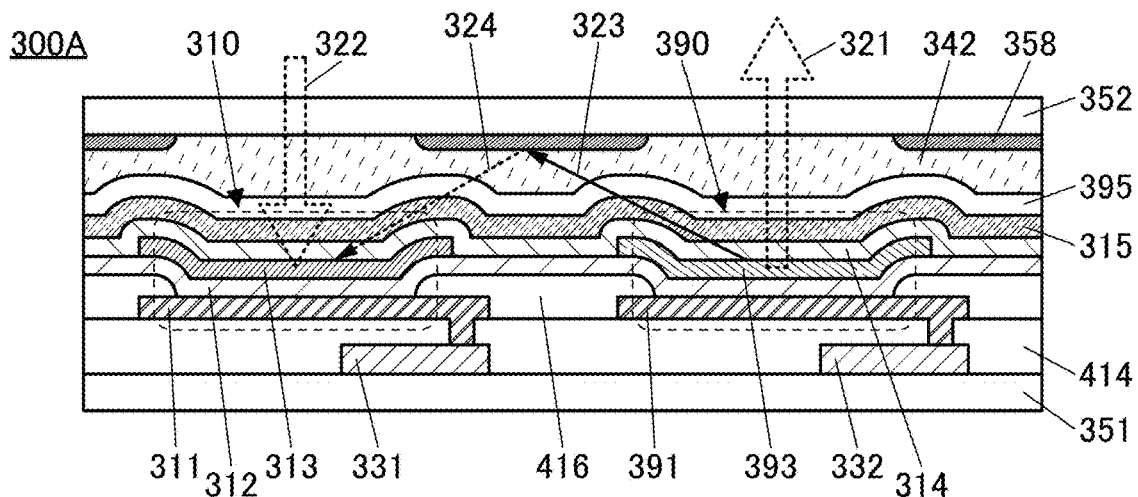
FIG. 24A to FIG. 24C are diagrams illustrating structure examples of a light-emitting element, a light-receiving element, and a light-emitting and light-receiving element.

FIG. 24A illustrates a cross-sectional view of a display device 300A. The display device 300A includes a substrate 351, a substrate 352, a light-receiving element 310, and a light-emitting element 390.

The light-emitting element 390 includes a pixel electrode 391, a buffer layer 312, a light-emitting layer 393, a buffer layer 314, and a common electrode 315, which are stacked in this order. The buffer layer 312 can include one or both of a hole-injection layer and a hole-transport layer. The light-emitting layer 393 includes an organic compound. The buffer layer 314 can include one or both of an electron-injection layer and an electron-transport layer. The light-emitting element 390 has a function of emitting visible light 321. Note that the display device 300A may also include a light-emitting element having a function of emitting infrared light.

The light-receiving element 310 includes a pixel electrode 311, the buffer layer 312, an active layer 313, the buffer layer 314, and the common electrode 315, which are stacked in this order. The active layer 313 includes an organic compound. The light-receiving element 310 has a function of detecting visible light. Note that the light-receiving element 310 may also have a function of detecting infrared light.

The buffer layer 312, the buffer layer 314, and the common electrode 315 are common layers shared by the light-emitting element 390 and the light-receiving element 310 and provided across them. The buffer layer 312, the buffer layer 314, and the common electrode 315 each include a portion overlapping with the active layer 313 and the pixel electrode 311, a portion overlapping with the light-emitting layer 393 and the pixel electrode 391, and a portion overlapping with none of them.

This embodiment is described assuming that the pixel electrode functions as an anode and the common electrode 315 functions as a cathode in both of the light-emitting element 390 and the light-receiving element 310. In other words, the light-receiving element 310 is driven by application of reverse bias between the pixel electrode 311 and the common electrode 315, so that light incident on the light-receiving element 310 can be detected and charge can be generated and extracted as current in the display device 300A.

The pixel electrode 311, the pixel electrode 391, the buffer layer 312, the active layer 313, the buffer layer 314, the light-emitting layer 393, and the common electrode 315 may each have a single-layer structure or a stacked-layer structure.

The pixel electrode 311 and the pixel electrode 391 are each positioned over an insulating layer 414. The pixel electrodes can be formed using the same material in the same step. An end portion of the pixel electrode 311 and an end portion of the pixel electrode 391 are covered with a partition 416. Two adjacent pixel electrodes are electrically insulated (electrically isolated) from each other by the partition 416.

An organic insulating film is suitable for the partition 416. Examples of materials that can be used for the organic insulating film include an acrylic resin, a polyimide resin, an epoxy resin, a polyamide resin, a polyimide-amide resin, a siloxane resin, a benzocyclobutene-based resin, a phenol resin, and precursors of these resins. The partition 416 is a layer that transmits visible light. A partition that blocks visible light may be provided instead of the partition 416.

The common electrode 315 is a layer shared by the light-receiving element 310 and the light-emitting element 390.

The material, thickness, and the like of the pair of electrodes can be the same between the light-receiving element 310 and the light-emitting element 390. Accordingly, the fabrication cost of the display device can be reduced and the fabrication process of the display device can be simplified.

The display device 300A includes the light-receiving element 310, the light-emitting element 390, a transistor 331, a transistor 332, and the like between a pair of substrates (the substrate 351 and the substrate 352).

In the light-receiving element 310, the buffer layer 312, the active layer 313, and the buffer layer 314, which are positioned between the pixel electrode 311 and the common electrode 315, can each be referred to as an organic layer (a layer including an organic compound). The pixel electrode 311 preferably has a function of reflecting visible light. The common electrode 315 has a function of transmitting visible light. Note that in the case where the light-receiving element 310 is configured to detect infrared light, the common electrode 315 has a function of transmitting infrared light. Furthermore, the pixel electrode 311 preferably has a function of reflecting infrared light.

The light-receiving element 310 has a function of detecting light. Specifically, the light-receiving element 310 is a photoelectric conversion element that receives light 322 incident from the outside of the display device 300A and converts it into an electric signal. The light 322 can also be expressed as light that is emitted from the light-emitting element 390 and then reflected by a target object. The light 322 may be incident on the light-receiving element 310 through a lens or the like provided in the display device 300A.

In the light-emitting element 390, the buffer layer 312, the light-emitting layer 393, and the buffer layer 314, which are positioned between the pixel electrode 391 and the common electrode 315, can be collectively referred to as an EL layer. The EL layer includes at least the light-emitting layer 393. As described above, the pixel electrode 391 preferably has a function of reflecting visible light. The common electrode 315 has a function of transmitting visible light. Note that in the case where the display device 300A includes a light-emitting element that emits infrared light, the common electrode 315 has a function of transmitting infrared light. Furthermore, the pixel electrode 391 preferably has a function of reflecting infrared light.

The light-emitting element included in the display device of this embodiment preferably employs a micro optical resonator (microcavity) structure. The light-emitting element 390 may include an optical adjustment layer between the pixel electrode 391 and the common electrode 315. The use of the micro resonator structure enables light of a specific color to be intensified and extracted from each of the light-emitting elements.

The light-emitting element 390 has a function of emitting visible light. Specifically, the light-emitting element 390 is an electroluminescent element that emits light (here, the visible light 321) to the substrate 352 side when voltage is applied between the pixel electrode 391 and the common electrode 315.

The pixel electrode 311 included in the light-receiving element 310 is electrically connected to a source or a drain of the transistor 331 through an opening provided in the insulating layer 414. The pixel electrode 391 included in the light-emitting element 390 is electrically connected to a source or a drain of the transistor 332 through an opening provided in the insulating layer 414.

The transistor 331 and the transistor 332 are on and in contact with the same layer (the substrate 351 in FIG. 24A).

At least part of a circuit electrically connected to the light-receiving element 310 and a circuit electrically connected to the light-emitting element 390 are preferably formed using the same material in the same step. In this case, the thickness of the display device can be reduced compared with the case where the two circuits are separately formed, resulting in simplification of the fabrication process.

The light-receiving element 310 and the light-emitting element 390 are each preferably covered with a protective layer 395. In FIG. 24A, the protective layer 395 is provided on and in contact with the common electrode 315. Providing the protective layer 395 can inhibit entry of impurities such as water into the light-receiving element 310 and the light-emitting element 390, so that the reliability of the light-receiving element 310 and the light-emitting element 390 can be increased. The protective layer 395 and the substrate 352 are bonded to each other with an adhesive layer 342.

A light-blocking layer 358 is provided on the surface of the substrate 352 on the substrate 351 side. The light-blocking layer 358 has openings in a position overlapping with the light-emitting element 390 and in a position overlapping with the light-receiving element 310.

Here, the light-receiving element 310 detects light that is emitted from the light-emitting element 390 and then reflected by a target object. However, in some cases, light emitted from the light-emitting element 390 is reflected inside the display device 300A and is incident on the light-receiving element 310 without through a target object. The light-blocking layer 358 can reduce the influence of such stray light (reflected light). For example, in the case where the light-blocking layer 358 is not provided, light 323 emitted from the light-emitting element 390 is reflected by the substrate 352 and reflected light 324 is incident on the light-receiving element 310 in some cases. Providing the light-blocking layer 358 can inhibit the reflected light 324 to be incident on the light-receiving element 310. Consequently, noise can be reduced, and the sensitivity of a sensor using the light-receiving element 310 can be increased.

For the light-blocking layer 358, a material that blocks light emitted from the light-emitting element can be used. The light-blocking layer 358 preferably absorbs visible light. As the light-blocking layer 358, a black matrix can be formed using a metal material or a resin material containing pigment (e.g., carbon black) or dye, for example. The light-blocking layer 358 may have a stacked-layer structure of a red color filter, a green color filter, and a blue color filter.

[Structure Example 2-2]

Figure 24B:
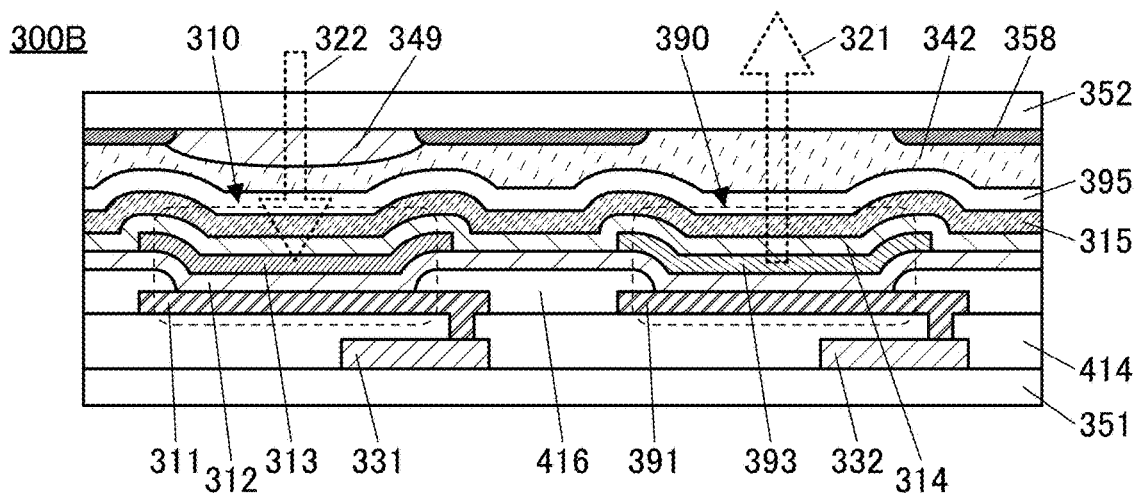

A display device 300B illustrated in FIG. 24B is different from the display device 300A mainly in including a lens 349.

The lens 349 is provided on a surface of the substrate 352 on the substrate 351 side. The light 322 from the outside is incident on the light-receiving element 310 through the lens 349. For each of the lens 349 and the substrate 352, a material that has high visible-light-transmitting property is preferably used.

When light is incident on the light-receiving element 310 through the lens 349, the range of light incident on the light-receiving element 310 can be narrowed. Thus, overlap of imaging ranges between a plurality of light-receiving elements 310 can be inhibited, whereby a clear image with little blurring can be captured.

In addition, the lens 349 can condense incident light. Accordingly, the amount of light to be incident on the light-receiving element 310 can be increased. This can increase the photoelectric conversion efficiency of the light-receiving element 310.

[Structure Example 2-3]

Figure 24C:
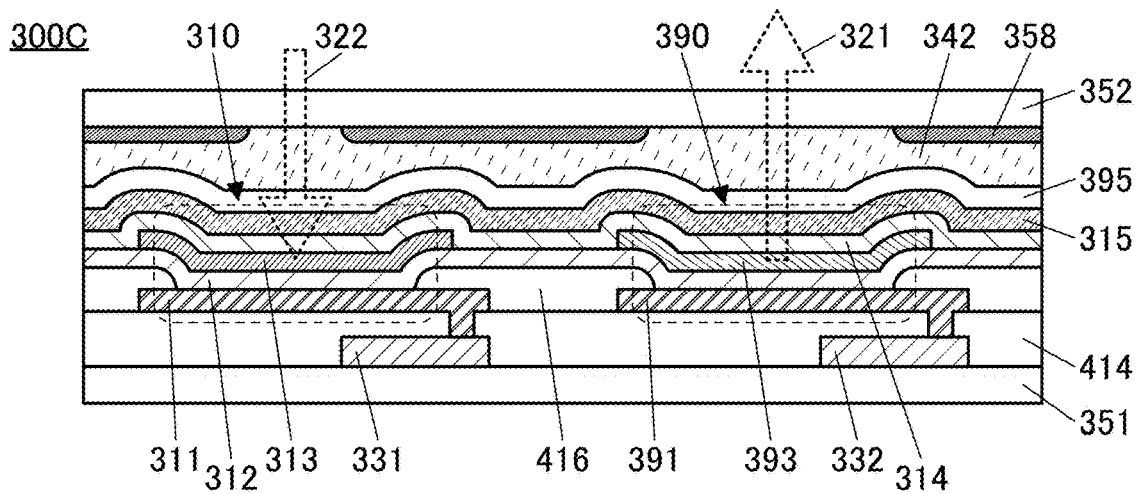

A display device 300C illustrated in FIG. 24C is different from the display device 300A mainly in the shape of the light-blocking layer 358.

The light-blocking layer 358 is provided such that an opening portion overlapping with the light-receiving element 310 is positioned on an inner side of the light-receiving region of the light-receiving element 310 in a plan view. The smaller the diameter of the opening portion overlapping with the light-receiving element 310 of the light-blocking layer 358 is, the narrower the range of light incident on the light-receiving element 310 becomes. Thus, overlap of imaging ranges between a plurality of light-receiving elements 310 can be inhibited, whereby a clear image with little blurring can be captured.

For example, the area of the opening portion of the light-blocking layer 358 can be less than or equal to 80%, less than or equal to 70%, less than or equal to 60%, less than or equal to 50%, or less than or equal to 40% and greater than or equal to 1%, greater than or equal to 5%, or greater than or equal to 10% of the area of the light-receiving region of the light-receiving element 310. A clearer image can be captured as the area of the opening portion of the light-blocking layer 358 becomes smaller. In contrast, when the area of the opening portion is too small, the amount of light reaching the light-receiving element 310 might be reduced to reduce light sensitivity. Therefore, the area of the opening portion is preferably set within the above-described range. The above upper limits and lower limits can be combined freely. Furthermore, the light-receiving region of the light-receiving element 310 can be referred to as the opening portion of the partition 416.

Note that the center of the opening portion of the light-blocking layer 358 overlapping with the light-receiving element 310 may be shifted from the center of the light-receiving region of the light-receiving element 310 in a plan view. Moreover, a structure in which the opening portion of the light-blocking layer 358 does not overlap with the light-receiving region of the light-receiving element 310 in a plan view may be employed. Thus, only oblique light that has passed through the opening portion of the light-blocking layer 358 can be received by the light-receiving element 310. Accordingly, the range of light incident on the light-receiving element 310 can be limited more effectively, so that a clear image can be captured.

[Structure Example 2-4]

Figure 25A:
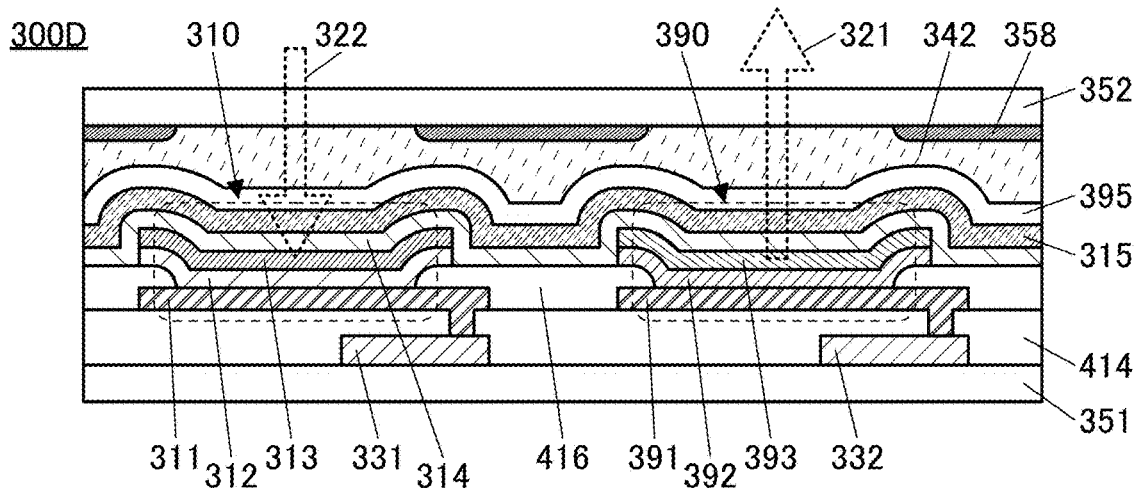
FIG. 25A to FIG. 25C are diagrams illustrating structure examples of a light-emitting element, a light-receiving element, and a light-emitting and light-receiving element.

A display device 300D illustrated in FIG. 25A is different from the display device 300A mainly in that the buffer layer 312 is not a common layer.

The light-receiving element 310 includes the pixel electrode 311, the buffer layer 312, the active layer 313, the buffer layer 314, and the common electrode 315. The light-emitting element 390 includes the pixel electrode 391, a buffer layer 392, the light-emitting layer 393, the buffer layer 314, and the common electrode 315. Each of the active layer 313, the buffer layer 312, the light-emitting layer 393, and the buffer layer 392 has an island-shaped top surface.

The buffer layer 312 and the buffer layer 392 may contain different materials or the same material.

As described above, when the buffer layers are formed separately in the light-emitting element 390 and the light-receiving element 310, the degree of freedom for selecting materials of the buffer layers included in the light-emitting element 390 and the light-receiving element 310 can be increased, which facilitates optimization. In addition, the buffer layer 314 and the common electrode 315 are common layers, whereby the fabrication process can be simplified and manufacturing cost can be reduced as compared to the case where the light-emitting element 390 and the light-receiving element 310 are fabricated separately.

[Structure Example 2-5]

Figure 25B:
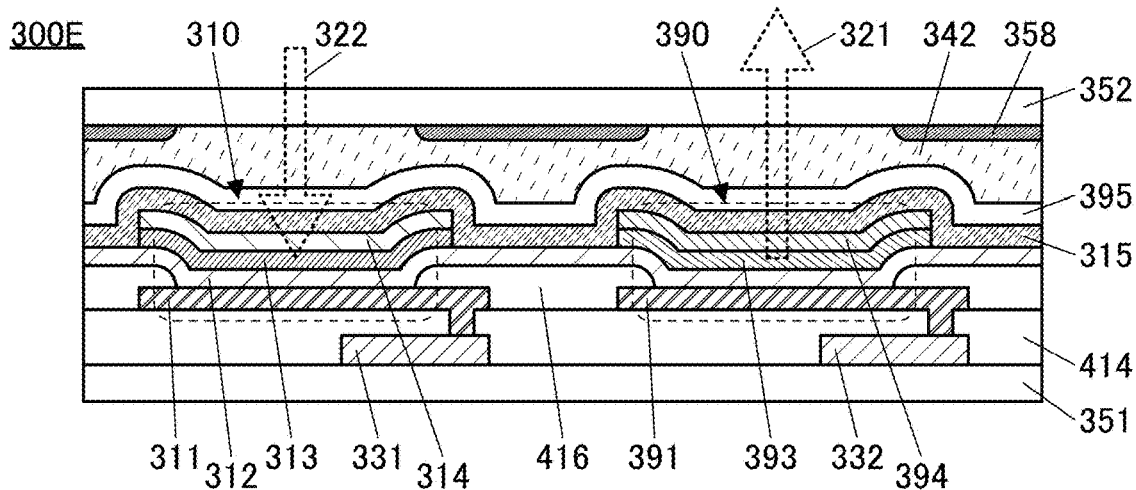

A display device 300E illustrated in FIG. 25B is different from the display device 300A mainly in that the buffer layer 314 is not a common layer.

The light-receiving element 310 includes the pixel electrode 311, the buffer layer 312, the active layer 313, the buffer layer 314, and the common electrode 315. The light-emitting element 390 includes the pixel electrode 391, the buffer layer 312, the light-emitting layer 393, a buffer layer 394, and the common electrode 315. Each of the active layer 313, the buffer layer 314, the light-emitting layer 393, and the buffer layer 394 has an island-shaped top surface.

The buffer layer 314 and the buffer layer 394 may contain different materials or the same material.

As described above, when the buffer layers are formed separately in the light-emitting element 390 and the light-receiving element 310, the degree of freedom for selecting materials of the buffer layers included in the light-emitting element 390 and the light-receiving element 310 can be increased, which facilitates optimization. In addition, the buffer layer 312 and the common electrode 315 are common layers, whereby the fabrication process can be simplified and manufacturing cost can be reduced as compared to the case where the light-emitting element 390 and the light-receiving element 310 are manufactured separately.

[Structure Example 2-6]

Figure 25C:
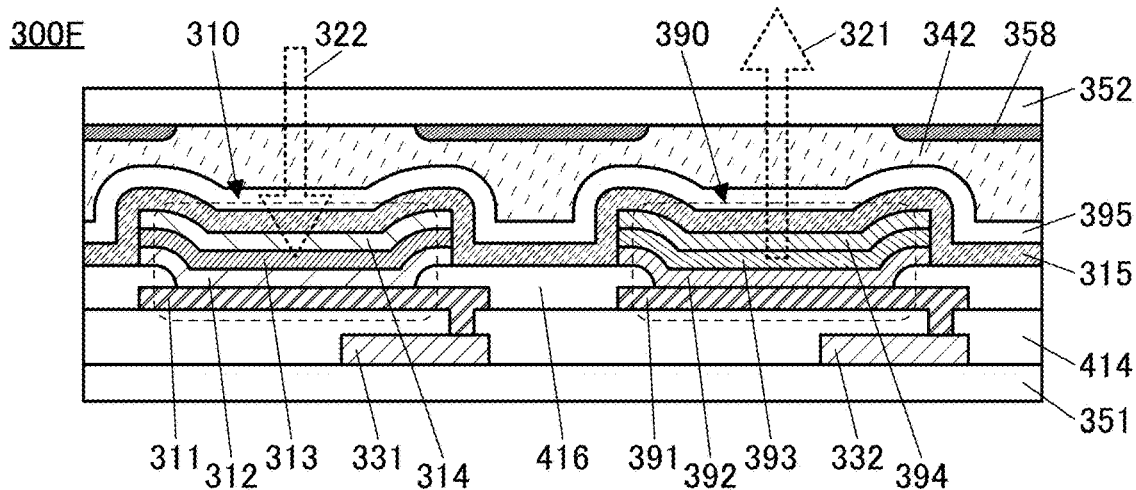

A display device 300F illustrated in FIG. 25C is different from the display device 300A mainly in that the buffer layer 312 and the buffer layer 314 are not common layers.

The light-receiving element 310 includes the pixel electrode 311, the buffer layer 312, the active layer 313, the buffer layer 314, and the common electrode 315. The light-emitting element 390 includes the pixel electrode 391, the buffer layer 392, the light-emitting layer 393, the buffer layer 394, and the common electrode 315. Each of the buffer layer 312, the active layer 313, the buffer layer 314, the buffer layer 392, the light-emitting layer 393, and the buffer layer 394 has an island-shaped top surface.

As described above, when the buffer layers are formed separately in the light-emitting element 390 and the light-receiving element 310, the degree of freedom for selecting materials of the buffer layers included in the light-emitting element 390 and the light-receiving element 310 can be increased, which facilitates optimization. In addition, the common electrode 315 is a common layer, whereby the fabrication process can be simplified and manufacturing cost can be reduced as compared to the case where the light-emitting element 390 and the light-receiving element 310 are fabricated separately.

<Structure Example 3>

A more detailed structure of a display device that can be used for the pixel portion of the electronic device of one embodiment of the present invention will be described below. Here, in particular, an example of the display device including light-emitting and light-receiving elements and light-emitting elements will be described.

Note that in the description below, the above description is referred to for portions similar to those described above and the description of the portions is omitted in some cases.

[Structure Example 3-1]

Figure 26A:
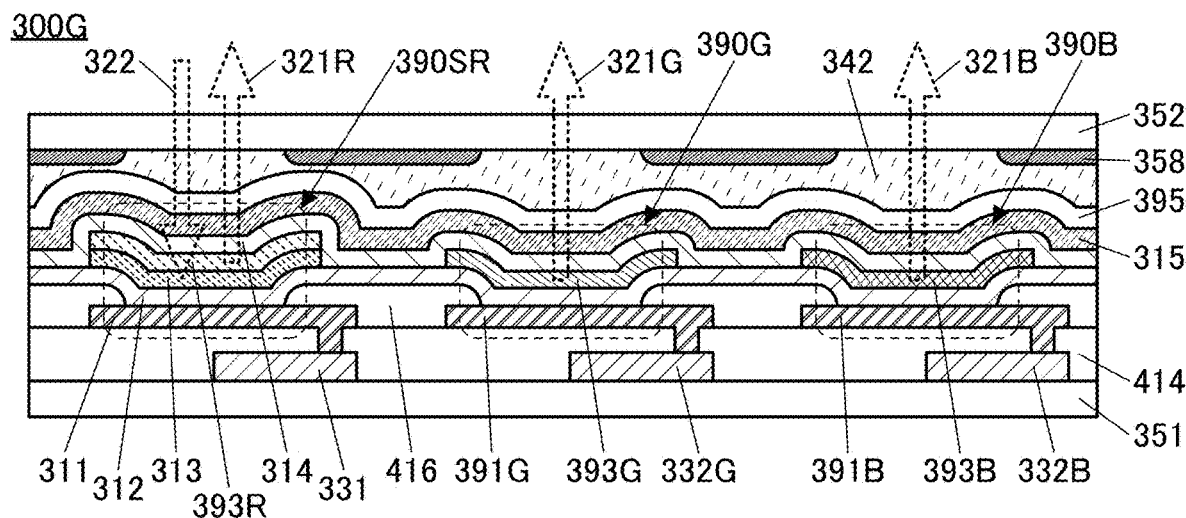
FIG. 26A and FIG. 26B are diagrams illustrating structure examples of a light-emitting element, a light-receiving element, and a light-emitting and light-receiving element.

FIG. 26A illustrates a cross-sectional view of a display device 300G. The display device 300G includes a light-emitting and light-receiving element 390SR, a light-emitting element 390G, and a light-emitting element 390B.

The light-emitting and light-receiving element 390SR has a function of a light-emitting element that emits red light 321R, and a function of a photoelectric conversion element that receives the light 322. The light-emitting element 390G can emit green light 321G. The light-emitting element 390B can emit blue light 321B.

The light-emitting and light-receiving element 390SR includes the pixel electrode 311, the buffer layer 312, the active layer 313, a light-emitting layer 393R, the buffer layer 314, and the common electrode 315. The light-emitting element 390G includes a pixel electrode 391G, the buffer layer 312, a light-emitting layer 393G, the buffer layer 314, and the common electrode 315. The light-emitting element 390B includes a pixel electrode 391B, the buffer layer 312, a light-emitting layer 393B, the buffer layer 314, and the common electrode 315.

The buffer layer 312, the buffer layer 314, and the common electrode 315 are common layers shared by the light-emitting and light-receiving element 390SR, the light-emitting element 390G, and the light-emitting element 390B and provided across them. Each of the active layer 313, the light-emitting layer 393R, the light-emitting layer 393G, and the light-emitting layer 393B has an island-shaped top surface. Note that although the stack body including the active layer 313 and the light-emitting layer 393R, the light-emitting layer 393G, and the light-emitting layer 393B are provided separately from one another in the example illustrated in FIG. 26, adjacent two of them may include an overlap region.

Note that as in the case of the display device 300D, the display device 300E, or the display device 300F, a structure in which one or both of the buffer layer 312 and the buffer layer 314 are not used as common layers can be employed.

The pixel electrode 311 is electrically connected to one of the source and the drain of the transistor 331. The pixel electrode 391G is electrically connected to one of a source and a drain of a transistor 332G. The pixel electrode 391B is electrically connected to one of a source and a drain of a transistor 332B.

With such a structure, a display device with higher resolution can be achieved.

[Structure Example 3-2]

Figure 26B:
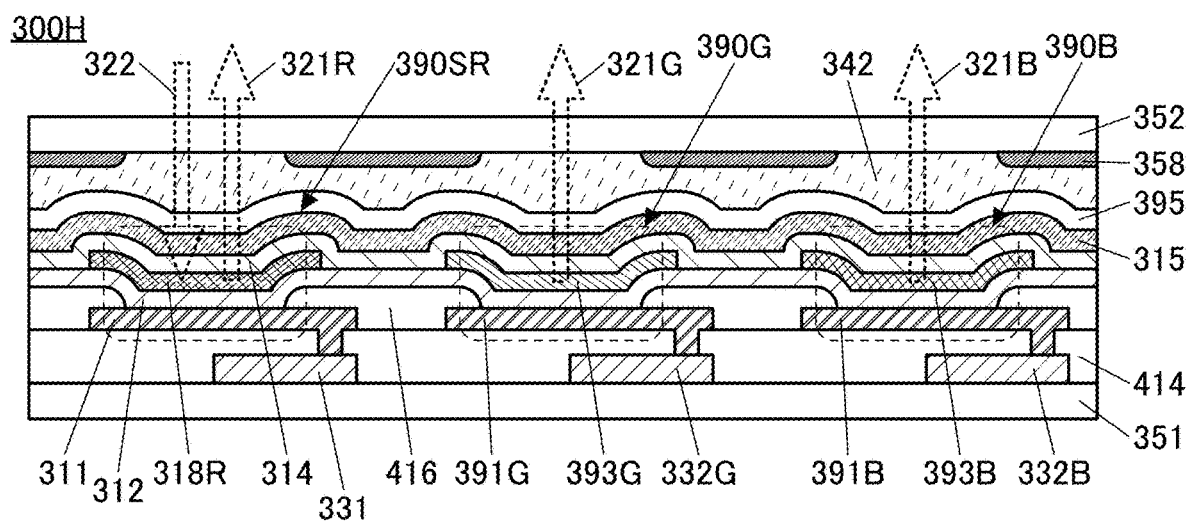

A display device 300H illustrated in FIG. 26B is different from the display device 300G mainly in the structure of the light-emitting and light-receiving element 390SR.

The light-emitting and light-receiving element 390SR includes a light-emitting and light-receiving layer 318R instead of the active layer 313 and the light-emitting layer 393R.

The light-emitting and light-receiving layer 318R is a layer that has both a function of a light-emitting layer and a function of an active layer. For example, a layer including the above-described light-emitting substance, an n-type semiconductor, and a p-type semiconductor can be used.

With such a structure, the fabrication process can be simplified, facilitating cost reduction.

Embodiment 3

In this embodiment, a display device that can be used for the pixel portion of the electronic device of one embodiment of the present invention will be described.

<Structure Example of Display Device>

Figure 27A:
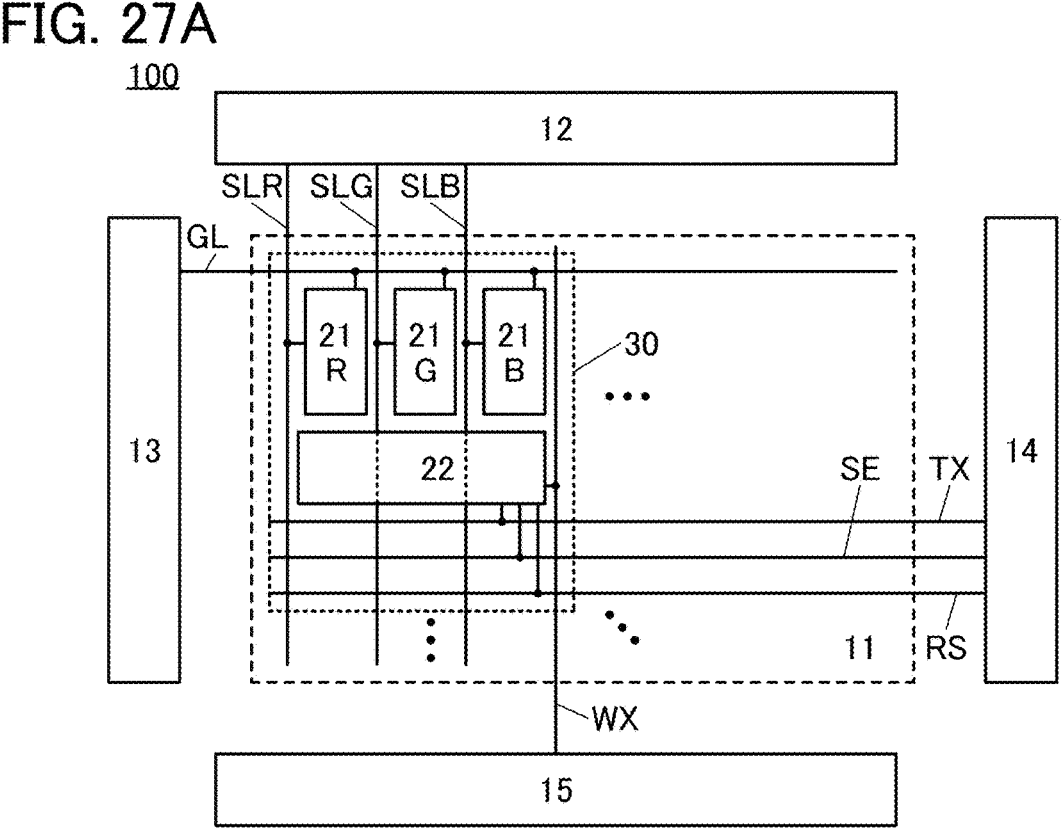
FIG. 27A is a diagram illustrating a structure example of a display device.

FIG. 27A is a block diagram of the display device 100. The display device 100 includes a pixel portion 11, a driver circuit portion 12, a driver circuit portion 13, a driver circuit portion 14, a circuit portion 15, and the like.

The pixel portion 11 includes a plurality of pixels 30 arranged in a matrix. The pixels each include a subpixel 21R, a subpixel 21G, a subpixel 21B, and an imaging pixel 22. The subpixel 21R, the subpixel 21G, and the subpixel 21B each include a light-emitting element functioning as a display element. The imaging pixel 22 includes a light-receiving element functioning as a photoelectric conversion element.

The pixel 30 is electrically connected to a wiring GL, a wiring SLR, a wiring SLG, a wiring SLB, a wiring TX, a wiring SE, a wiring RS, a wiring WX, and the like. The wiring SLR, the wiring SLG, and the wiring SLB are electrically connected to the driver circuit portion 12. The wiring GL is electrically connected to the driver circuit portion 13. The driver circuit portion 12 functions as a source line driver circuit (also referred to as a source driver). The driver circuit portion 13 functions as a gate line driver circuit (also referred to as a gate driver).

The pixels 30 each include the subpixel 21R, the subpixel 21G, and the subpixel 21B. For example, the subpixel 21R is a subpixel exhibiting a red color, the subpixel 21G is a subpixel exhibiting a green color, and the subpixel 21B is a subpixel exhibiting a blue color. Thus, the display device 100 can perform full-color display. Note that although the example where the pixel includes subpixels of three colors is shown here, subpixels of four or more colors may be included.

The subpixel 21R includes a light-emitting element emitting red light. The subpixel 21G includes a light-emitting element emitting green light. The subpixel 21B includes a light-emitting element emitting blue light. Note that the pixel 30 may include a subpixel including a light-emitting element emitting light of another color. For example, the pixel 30 may include, in addition to the three subpixels, a subpixel including a light-emitting element emitting white light, a subpixel including a light-emitting element emitting yellow light, or the like.

The wiring GL is electrically connected to the subpixel 21R, the subpixel 21G, and the subpixel 21B arranged in a row direction (an extending direction of the wiring GL). The wiring SLR, the wiring SLG, and the wiring SLB are electrically connected to the subpixels 21R, the subpixels 21G, and the subpixels 21B (not illustrated) arranged in a column direction (an extending direction of the wiring SLR and the like), respectively.

The imaging pixel 22 included in the pixel 30 is electrically connected to the wiring TX, the wiring SE, the wiring RS, and the wiring WX. The wiring TX, the wiring SE, and the wiring RS are electrically connected to the driver circuit portion 14, and the wiring WX is electrically connected to the circuit portion 15.

The driver circuit portion 14 has a function of generating a signal for driving the imaging pixel 22 and outputting the signal to the imaging pixel 22 through the wiring SE, the wiring TX, and the wiring RS. The circuit portion 15 has a function of receiving a signal output from the imaging pixel 22 through the wiring WX and outputting the signal to the outside as image data. The circuit portion 15 functions as a reading circuit.

<Structure Example 1 of Pixel Circuit>

Figure 27B:
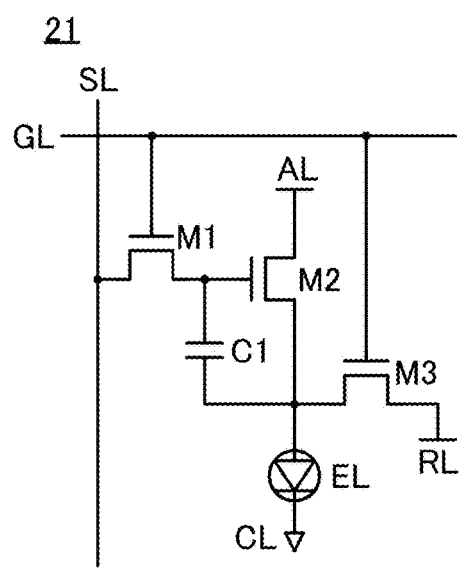
FIG. 27B and FIG. 27C are circuit diagrams of pixel circuits.

FIG. 27B illustrates an example of a circuit diagram of a pixel 21 that can be used as the subpixel 21R, the subpixel 21G, and the subpixel 21B. The pixel 21 includes a transistor M1, a transistor M2, a transistor M3, a capacitor C1, and a light-emitting element EL. The wiring GL and the wiring SL are electrically connected to the pixel 21. The wiring SL corresponds to any of the wiring SLR, the wiring SLG, and the wiring SLB illustrated in FIG. 27A.

A gate of the transistor M1 is electrically connected to the wiring GL, one of a source and a drain of the transistor M1 is electrically connected to the wiring SL, and the other thereof is electrically connected to one electrode of the capacitor C1 and a gate of the transistor M2. One of a source and a drain of the transistor M2 is electrically connected to a wiring AL, and the other of the source and the drain of the transistor M2 is electrically connected to one electrode of the light-emitting element EL, the other electrode of the capacitor C1, and one of a source and a drain of the transistor M3. A gate of the transistor M3 is electrically connected to the wiring GL, and the other of the source and the drain of the transistor M3 is electrically connected to a wiring RL. The other electrode of the light-emitting element EL is electrically connected to a wiring CL.

The transistor M1 and the transistor M3 each function as a switch. For example, the transistor M2 functions as a transistor that controls current flowing through the light-emitting element EL.

Here, it is preferable to use LTPS transistors as all of the transistor M1 to the transistor M3. Alternatively, it is preferable to use OS transistors as the transistor M1 and the transistor M3 and to use an LTPS transistor as the transistor M2.

A transistor using an oxide semiconductor having a wider band gap and a lower carrier density than silicon can achieve extremely low off-state current. Thus, such low off-state current enables long-term retention of charge accumulated in a capacitor that is connected in series with the transistor. Therefore, it is particularly preferable to use a transistor including an oxide semiconductor as the transistor M1 and the transistor M3 each of which is connected in series with the capacitor C1. The use of the transistor including an oxide semiconductor as each of the transistor M1 and the transistor M3 can prevent leakage of charge retained in the capacitor C1 through the transistor M1 or the transistor M3. Furthermore, since charge retained in the capacitor C1 can be retained for a long time, a still image can be displayed for a long time without rewriting data in the pixel 21.

A data potential D is supplied to the wiring SL. A selection signal is supplied to the wiring GL. The selection signal includes a potential for bringing a transistor into a conducting state and a potential for bringing a transistor into a non-conducting state.

A reset potential is supplied to the wiring RL. An anode potential is supplied to the wiring AL. A cathode potential is supplied to the wiring CL. In the pixel 21, the anode potential is a potential higher than the cathode potential. The reset potential supplied to the wiring RL can be set such that a potential difference between the reset potential and the cathode potential is lower than the threshold voltage of the light-emitting element EL. The reset potential can be a potential higher than the cathode potential, a potential equal to the cathode potential, or a potential lower than the cathode potential.

<Structure Example 2 of Pixel Circuit>

Figure 27C:
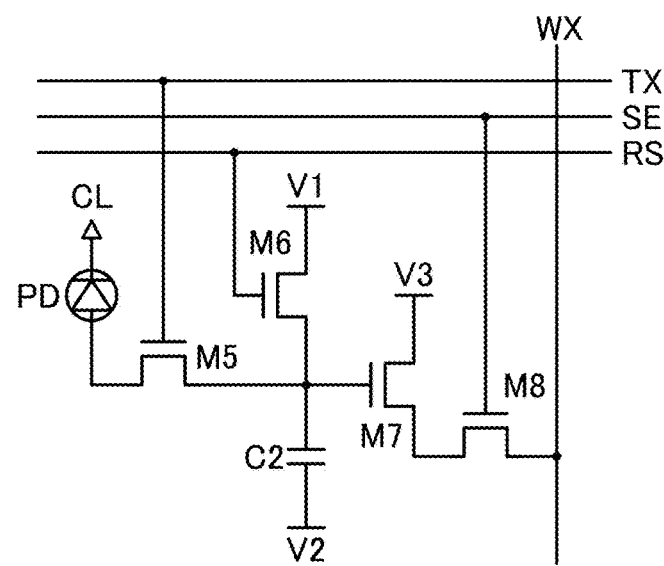

FIG. 27C illustrates an example of a circuit diagram of the imaging pixel 22. The imaging pixel 22 includes a transistor M5, a transistor M6, a transistor M7, a transistor M8, a capacitor C2, a light-receiving element PD, and the like.

A gate of the transistor M5 is electrically connected to the wiring TX, one of a source and a drain of the transistor M5 is electrically connected to an anode electrode of the light-receiving element PD, and the other of the source and the drain of the transistor M5 is electrically connected to one of a source and a drain of the transistor M6, a first electrode of the capacitor C2, and a gate of the transistor M7. A gate of the transistor M6 is electrically connected to the wiring RS, and the other of the source and the drain of the transistor M6 is electrically connected to a wiring V1. One of a source and a drain of the transistor M7 is electrically connected to a wiring V3, and the other of the source and the drain of the transistor M7 is electrically connected to one of a source and a drain of the transistor M8. A gate of the transistor M8 is electrically connected to the wiring SE, and the other of the source and the drain of the transistor M8 is electrically connected to the wiring WX. A cathode electrode of the light-receiving element PD is electrically connected to the wiring CL. A second electrode of the capacitor C2 is electrically connected to a wiring V2.

The transistor M5, the transistor M6, and the transistor M8 each function as a switch. The transistor M7 functions as an amplifier element (amplifier).

It is preferable to use LTPS transistors as all of the transistor M5 to the transistor M8. Alternatively, it is preferable to use OS transistors as the transistor M5 and the transistor M6 and to use an LTPS transistor as the transistor M7. At this time, the transistor M8 may be either an OS transistor or an LTPS transistor.

By using OS transistors as the transistor M5 and the transistor M6, a potential retained in the gate of the transistor M7 on the basis of charge generated in the light-receiving element PD can be prevented from leaking through the transistor M5 or the transistor M6.

For example, in the case where image capturing is performed using a global shutter system, a period from the end of charge transfer operation to the start of reading operation (charge retention period) varies among pixels. For example, when an image having the same gray level in all the pixels is captured, output signals in all the pixels ideally have potentials of the same level. However, in the case where the length of the charge retention period varies row by row, if charge accumulated at nodes in the pixels in each row leaks out over time, the potential of an output signal in a pixel varies row by row, and image data varies in gray level row by row. Thus, when the OS transistors are used as the transistor M5 and the transistor M6, such a potential change at the node can be extremely small. That is, even when image capturing is performed using the global shutter system, it is possible to inhibit variation in gray level of image data due to a difference in the length of the charge retention period, and it is possible to enhance the quality of captured images.

Meanwhile, it is preferable to use, as the transistor M7, an LTPS transistor using low-temperature polysilicon as a semiconductor layer. The LTPS transistor can have a higher field-effect mobility than the OS transistor, and has excellent drive capability and current capability. Thus, the transistor M7 can operate at higher speed than the transistor M5 and the transistor M6. By using the LTPS transistor as the transistor M7, an output in accordance with the extremely low potential based on the amount of light received by the light-receiving element PD can be quickly supplied to the transistor M8.

In other words, in the imaging pixel 22, the transistor M5 and the transistor M6 have low leakage current and the transistor M7 has high drive capability, whereby, when the light-receiving element PD receives light, the charge transferred through the transistor M5 can be retained without leakage and high-speed reading can be performed.

Low off-state current, high-speed operation, and the like, which are required for the transistor M5 to the transistor M7, are not necessarily required for the transistor M8, which functions as a switch for supplying the output from the transistor M7 to the wiring WX. For this reason, either low-temperature polysilicon or an oxide semiconductor may be used for the semiconductor layer of the transistor M8.

Note that although n-channel transistors are shown as the transistors in FIG. 27B and FIG. 27C, p-channel transistors can also be used. The pixel circuit may be a CMOS circuit including an n-channel transistor and a p-channel transistor. For example, an n-channel OS transistor and a p-channel LTPS transistor can be suitably used for the pixel circuit.

The transistors included in the pixel 21 and the imaging pixel 22 are preferably formed to be arranged over the same substrate.

<Structure Example 3 of Pixel Circuit>

A circuit structure different from the above is described.

In the transistor including a pair of gates, the same potential is supplied to the pair of gates electrically connected to each other, which brings advantage that the transistor can have higher on-state current and improved saturation characteristics. A potential for controlling the threshold voltage of the transistor may be supplied to one of the pair of gates. Furthermore, when a constant potential is supplied to one of the pair of gates, the stability of the electrical characteristics of the transistor can be improved. For example, one of the gates of the transistor may be electrically connected to a wiring to which a constant potential is supplied or may be electrically connected to a source or a drain of the transistor.

Figure 28A:
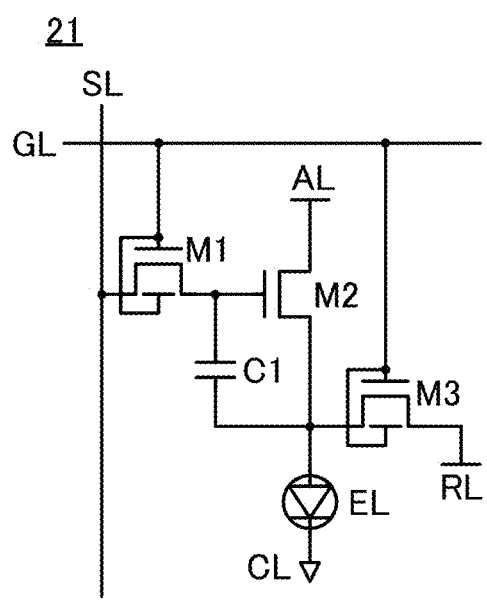
FIG. 28A and FIG. 28B are circuit diagrams of a pixel circuit.

The pixel 21 illustrated in FIG. 28A is an example where a transistor including a pair of gates is used as each of the transistor M1 and the transistor M3. In each of the transistor M1 and the transistor M3, the pair of gates are electrically connected each other. Such a structure can shorten the period in which data is written to the pixel 21.

Figure 28B:
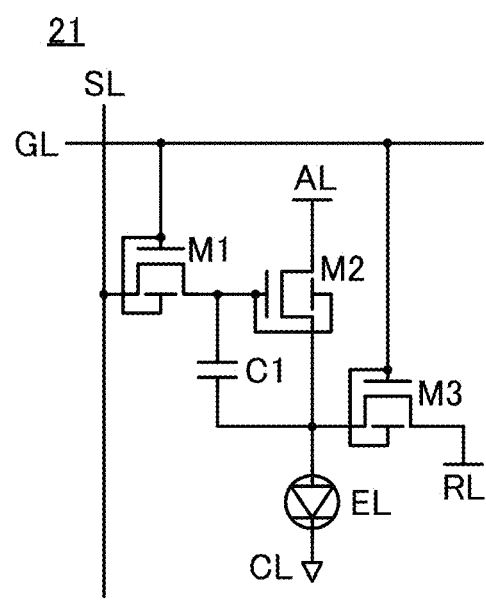

The pixel 21 illustrated in FIG. 28B is an example where a transistor including a pair of gates is used as the transistor M2 in addition to the transistor M1 and the transistor M3. A pair of gates of the transistor M2 are electrically connected to each other. When such a transistor is used as the transistor M2, the saturation characteristics are improved, whereby emission luminance of the light-emitting element EL can be controlled easily and the display quality can be increased.

Figure 29A:
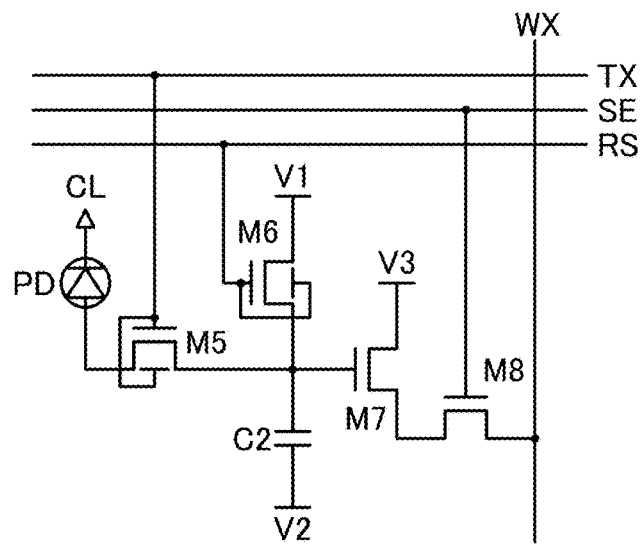
FIG. 29A to FIG. 29C are circuit diagrams of a pixel circuit.
Figure 29B:
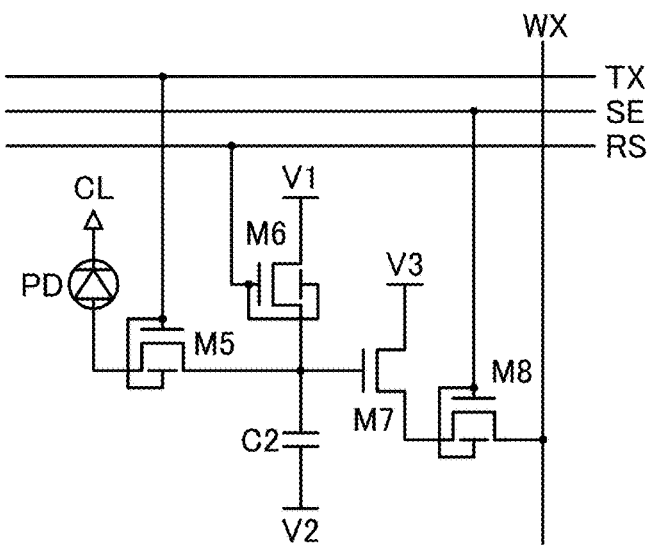

The imaging pixel 22 illustrated in FIG. 29A is an example where a transistor including a pair of gates connected to each other is used as each of the transistor M5 and the transistor M6. Such a structure can shorten the time required for the reset operation and the transfer operation. The imaging pixel 22 illustrated in FIG. 29B is an example where a transistor including a pair of gates connected to each other is used as the transistor M8 in the structure illustrated in FIG. 29A. Such a structure can shorten the time required for reading.

Figure 29C:
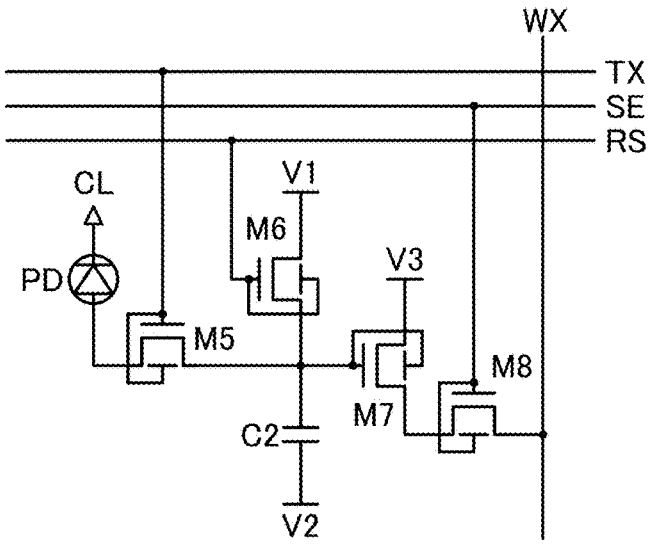

The imaging pixel 22 illustrated in FIG. 29C is an example where a transistor including a pair of gates connected to each other is used as the transistor M7 in the structure illustrated in FIG. 29B. Such a structure can further shorten the time required for reading.

Embodiment 4

In this embodiment, a more detailed structure of the display device that can be used for the pixel portion of the electronic device of one embodiment of the present invention will be described with reference to FIG. 30 to FIG. 33.

<Display Device 100A>

Figure 30:
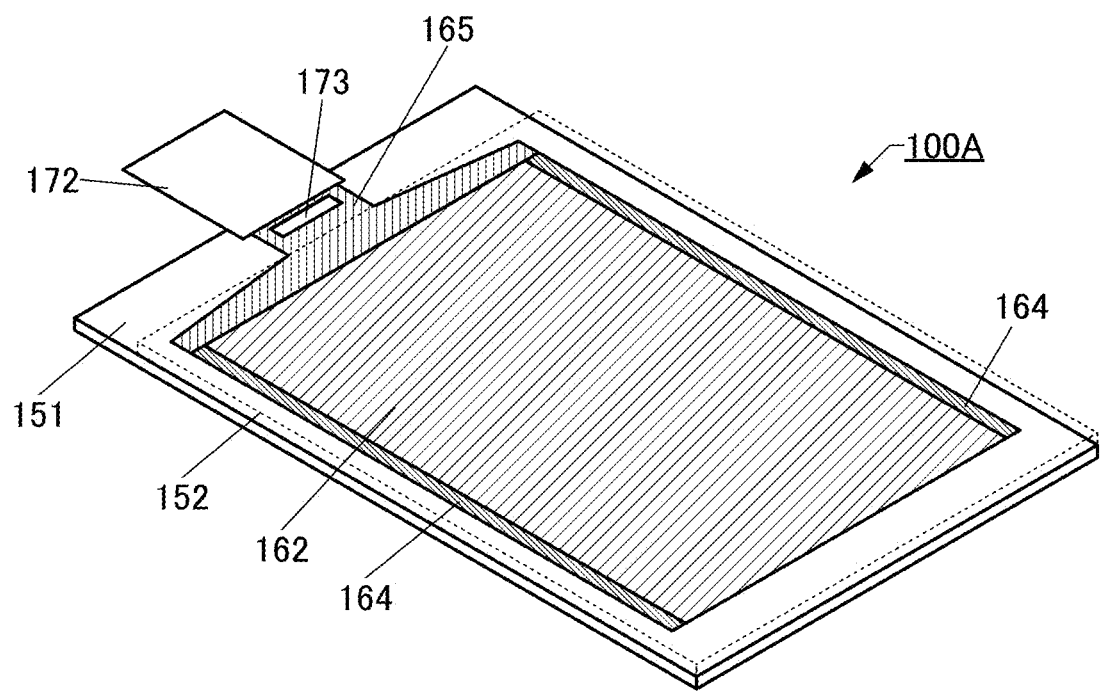
FIG. 30 is a perspective view illustrating an example of a display device that can be used for an electronic device.
Figure 31:
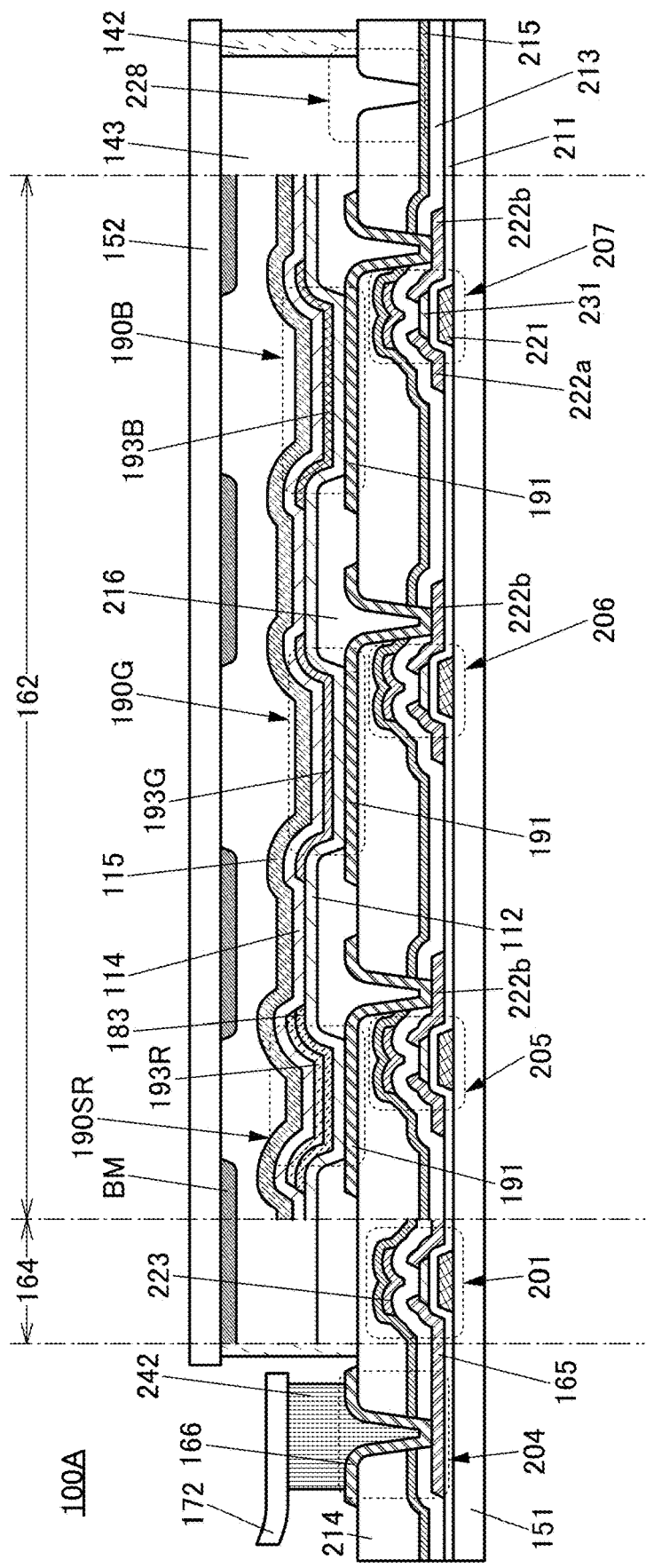
FIG. 31 is a perspective view illustrating an example of a display device that can be used for an electronic device.

FIG. 30 is a perspective view of a display device 100A, and FIG. 31 is a cross-sectional view of the display device 100A.

The display device 100A has a structure in which the substrate 152 and the substrate 151 are bonded to each other. In FIG. 30, the substrate 152 is denoted by a dashed line.

The display device 100A includes a pixel portion 162, a circuit 164, a wiring 165, and the like. FIG. 30 illustrates an example where the display device 100A is provided with an IC (integrated circuit) 173 and an FPC 172. Thus, the structure illustrated in FIG. 30 can be regarded as a display module including the display device 100A, the IC, and the FPC.

As the circuit 164, for example, a scan line driver circuit can be used.

The wiring 165 has a function of supplying a signal and power to the pixel portion 162 and the circuit 164. The signal and power are input from the outside to the wiring 165 through the FPC 172 or input from the IC 173 to the wiring 165.

FIG. 30 illustrates an example where the IC 173 is provided over the substrate 151 by a COG (Chip On Glass) method, a COF (Chip on Film) method, or the like. An IC including a scan line driver circuit or a signal line driver circuit, for example, can be used as the IC 173. Note that the display device 100A and the display module may have a structure not including an IC. The IC may be mounted on the FPC by a COF method or the like.

FIG. 31 illustrates an example of cross sections of part of a region including the FPC 172, part of a region including the circuit 164, part of a region including the pixel portion 162, and part of a region including an end portion of the display device 100A illustrated in FIG. 30.

The display device 100A in FIG. 31 includes a transistor 201, a transistor 205, a transistor 206, a transistor 207, a light-emitting element 190B, a light-emitting element 190G, a light-emitting and light-receiving element 190SR, and the like between the substrate 151 and the substrate 152.

The substrate 152 and an insulating layer 214 are attached to each other with the adhesive layer 142. A solid sealing structure, a hollow sealing structure, or the like can be employed to seal the light-emitting element 190B, the light-emitting element 190G, and the light-emitting and light-receiving element 190SR. In FIG. 31, a hollow sealing structure is employed in which a space 143 surrounded by the substrate 152, the adhesive layer 142, and the insulating layer 214 is filled with an inert gas (e.g., nitrogen or argon). The adhesive layer 142 may be provided to overlap with the light-emitting element 190B, the light-emitting element 190G, and the light-emitting and light-receiving element 190SR. The space 143 surrounded by the substrate 152, the adhesive layer 142, and the insulating layer 214 may be filled with a resin different from that of the adhesive layer 142.

The light-emitting element 190B has a stacked-layer structure in which the pixel electrode 191, the common layer 112, the light-emitting layer 193B, the common layer 114, and the common electrode 115 are stacked in this order from the insulating layer 214 side. The pixel electrode 191 is connected to a conductive layer 222b included in the transistor 207 through an opening provided in the insulating layer 214. The transistor 207 has a function of controlling the driving of the light-emitting element 190B. The end portion of the pixel electrode 191 is covered with a partition 216. The pixel electrode 191 contains a material that reflects visible light, and the common electrode 115 contains a material that transmits visible light.

The light-emitting element 190G has a stacked-layer structure in which the pixel electrode 191, the common layer 112, the light-emitting layer 193G, the common layer 114, and the common electrode 115 are stacked in this order from the insulating layer 214 side. The pixel electrode 191 is connected to the conductive layer 222b included in the transistor 206 through an opening provided in the insulating layer 214. The transistor 206 has a function of controlling the driving of the light-emitting element 190G.

The light-emitting and light-receiving element 190SR has a stacked-layer structure in which the pixel electrode 191, the common layer 112, the active layer 183, the light-emitting layer 193R, the common layer 114, and the common electrode 115 are stacked in this order from the insulating layer 214 side. The pixel electrode 191 is electrically connected to the conductive layer 222b included in the transistor 205 through an opening provided in the insulating layer 214. The transistor 205 has a function of controlling the driving of the light-emitting and light-receiving element 190SR.

Light emitted from the light-emitting element 190B, the light-emitting element 190G, and the light-emitting and light-receiving element 190SR is emitted to the substrate 152 side. Light enters the light-emitting and light-receiving element 190SR through the substrate 152 and the space 143. For the substrate 152, a material that has high visible-light-transmitting property is preferably used.

The pixel electrodes 191 can be formed using the same material in the same step. The common layer 112, the common layer 114, and the common electrode 115 are used in common in the light-emitting element 190B, the light-emitting element 190G, and the light-emitting and light-receiving element 190SR. The light-emitting and light-receiving element 190SR has a structure in which the active layer 183 is added to a red-light-emitting element. Alternatively, the light-emitting element 190B, the light-emitting element 190G, and the light-emitting and light-receiving element 190SR can have a common structure except for the active layer 183 and the light-emitting layer 193 of each color. Thus, the pixel portion 162 of the display device 100A can be provided with a light-receiving function without a significant increase in the number of fabrication steps.

A light-blocking layer BM is provided on a surface of the substrate 152 on the substrate 151 side. The light-blocking layer BM includes openings at positions overlapping with the light-emitting element 190B, the light-emitting element 190G, and the light-emitting and light-receiving element 190SR. Providing the light-blocking layer BM can control the range where the light-emitting and light-receiving element 190SR detects light. Furthermore, with the light-blocking layer BM, light can be prevented from directly entering the light-emitting and light-receiving element 190SR from the light-emitting element 190G or the light-emitting element 190B without involving any target object. Hence, a sensor with less noise and high sensitivity can be achieved.

The transistor 201, the transistor 205, the transistor 206, and the transistor 207 are formed over the substrate 151. These transistors can be formed using the same materials in the same steps.

An insulating layer 211, an insulating layer 213, an insulating layer 215, and the insulating layer 214 are provided in this order over the substrate 151. Parts of the insulating layer 211 function as gate insulating layers of the transistors. Parts of the insulating layer 213 function as gate insulating layers of the transistors. The insulating layer 215 is provided to cover the transistors. The insulating layer 214 is provided to cover the transistors and has a function of a planarization layer. Note that there is no limitation on the number of gate insulating layers and the number of insulating layers covering the transistors, and each insulating layer may be either a single layer or two or more layers.

A material into which impurities such as water or hydrogen do not easily diffuse is preferably used for at least one of the insulating layers that cover the transistors. This allows the insulating layer to function as a barrier layer. Such a structure can effectively inhibit diffusion of impurities into the transistors from the outside and increase the reliability of the display device.

An inorganic insulating film is preferably used as each of the insulating layer 211, the insulating layer 213, and the insulating layer 215. As the inorganic insulating film, for example, an inorganic insulating film such as a silicon nitride film, a silicon oxynitride film, a silicon oxide film, a silicon nitride oxide film, an aluminum oxide film, or an aluminum nitride film can be used. A hafnium oxide film, a hafnium oxynitride film, a hafnium nitride oxide film, an yttrium oxide film, a zirconium oxide film, a gallium oxide film, a tantalum oxide film, a magnesium oxide film, a lanthanum oxide film, a cerium oxide film, a neodymium oxide film, or the like may be used. A stack including two or more of the above insulating films may also be used. Note that a base film may be provided between the substrate 151 and the transistors. Any of the above-described inorganic insulating films can be used as the base film.

Here, an organic insulating film often has a lower barrier property than an inorganic insulating film. Therefore, the organic insulating film preferably has an opening in the vicinity of an end portion of the display device 100A. This can inhibit entry of impurities from the end portion of the display device 100A through the organic insulating film. Alternatively, the organic insulating film may be formed such that an end portion of the organic insulating film is positioned on the inner side of the end portion of the display device 100A, to prevent the organic insulating film from being exposed at the end portion of the display device 100A.

An organic insulating film is suitable for the insulating layer 214 functioning as a planarization layer. Examples of materials that can be used for the organic insulating film include an acrylic resin, a polyimide resin, an epoxy resin, a polyamide resin, a polyimide-amide resin, a siloxane resin, a benzocyclobutene-based resin, a phenol resin, and precursors of these resins.

In a region 228 illustrated in FIG. 31, an opening is formed in the insulating layer 214. This can inhibit entry of impurities into the pixel portion 162 from the outside through the insulating layer 214 even when an organic insulating film is used as the insulating layer 214. Thus, the reliability of the display device 100A can be increased.

The transistor 201, the transistor 205, the transistor 206, and the transistor 207 each include a conductive layer 221 functioning as a gate, the insulating layer 211 functioning as a gate insulating layer, a conductive layer 222a and the conductive layer 222b functioning as a source and a drain, a semiconductor layer 231, the insulating layer 213 functioning as a gate insulating layer, and a conductive layer 223 functioning as a gate. Here, a plurality of layers obtained by processing the same conductive film are shown with the same hatching pattern. The insulating layer 211 is positioned between the conductive layer 221 and the semiconductor layer 231. The insulating layer 213 is positioned between the conductive layer 223 and the semiconductor layer 231.

There is no particular limitation on the structure of the transistors included in the display device of this embodiment. For example, a planar transistor, a staggered transistor, or an inverted staggered transistor can be used. A top-gate or a bottom-gate transistor structure may be employed. Alternatively, gates may be provided above and below a semiconductor layer where a channel is formed.

The structure in which the semiconductor layer where a channel is formed is provided between two gates is used for the transistor 201, the transistor 205, the transistor 206, and the transistor 207. The two gates may be connected to each other and supplied with the same signal to drive the transistor. Alternatively, a potential for controlling the threshold voltage may be supplied to one of the two gates and a potential for driving may be supplied to the other to control the threshold voltage of the transistor.

There is no particular limitation on the crystallinity of a semiconductor material used in the transistor, and either an amorphous semiconductor or a semiconductor having crystallinity (a microcrystalline semiconductor, a polycrystalline semiconductor, a single crystal semiconductor, or a semiconductor partly including crystal regions) may be used. A semiconductor having crystallinity is preferably used, in which case deterioration of the transistor characteristics can be inhibited.

A semiconductor layer of a transistor preferably includes a metal oxide (also referred to as an oxide semiconductor). Alternatively, the semiconductor layer of the transistor may contain silicon.

The semiconductor layer preferably contains indium, M (M is one or more kinds selected from gallium, aluminum, silicon, boron, yttrium, tin, copper, vanadium, beryllium, titanium, iron, nickel, germanium, zirconium, molybdenum, lanthanum, cerium, neodymium, hafnium, tantalum, tungsten, and magnesium), and zinc, for example. In particular, M is preferably one or more kinds selected from aluminum, gallium, yttrium, and tin.

It is particularly preferable to use an oxide containing indium (In), gallium (Ga), and zinc (Zn) (also referred to as IGZO) for the semiconductor layer. Alternatively, it is preferable to use an oxide containing indium, gallium, zinc, and tin. Alternatively, it is preferable to use an oxide containing indium and zinc.

When the semiconductor layer is an In-M-Zn oxide, the atomic proportion of In is preferably greater than or equal to the atomic proportion of M in the In-M-Zn oxide. Examples of the atomic ratio of the metal elements in such an In-M-Zn oxide include In:M:Zn=1:1:1 or a composition in the neighborhood thereof, In:M:Zn=1:1:1.2 or a composition in the neighborhood thereof, In:M:Zn=2:1:3 or a composition in the neighborhood thereof, In:M:Zn=3:1:2 or a composition in the neighborhood thereof, In:M:Zn=4:2:3 or a composition in the neighborhood thereof, In:M:Zn=4:2:4.1 or a composition in the neighborhood thereof, In:M:Zn=5:1:3 or a composition in the neighborhood thereof, In:M:Zn=5:1:6 or a composition in the neighborhood thereof, In:M:Zn=5:1:7 or a composition in the neighborhood thereof, In:M:Zn=5:1:8 or a composition in the neighborhood thereof, In:M:Zn=10:1:3 or a composition in the neighborhood thereof, In:M:Zn=6:1:6 or a composition in the neighborhood thereof, and In:M:Zn=5:2:5 or a composition in the neighborhood thereof. Note that a composition in the neighborhood includes the range of +30% of an intended atomic ratio.

For example, when the atomic ratio is described as In:Ga:Zn=4:2:3 or a composition in the neighborhood thereof, the case is included where the atomic ratio of Ga is greater than or equal to 1 and less than or equal to 3 and the atomic ratio of Zn is greater than or equal to 2 and less than or equal to 4 with the atomic ratio of In being 4. When the atomic ratio is described as In:Ga:Zn=5:1:6 or a composition in the neighborhood thereof, the case is included where the atomic ratio of Ga is greater than 0.1 and less than or equal to 2 and the atomic ratio of Zn is greater than or equal to 5 and less than or equal to 7 with the atomic ratio of In being 5. When the atomic ratio is described as In:Ga:Zn=1:1:1 or a composition in the neighborhood thereof, the case is included where the atomic ratio of Ga is greater than 0.1 and less than or equal to 2 and the atomic ratio of Zn is greater than 0.1 and less than or equal to 2 with the atomic ratio of In being 1.

The transistor 201, the transistor 205, the transistor 206, and the transistor 207 may use different semiconductor materials for the semiconductor layers where channels are formed. For example, a transistor containing silicon (a Si transistor) can be used as the transistor 201, and a transistor including a metal oxide (an OS transistor) can be used as the transistor 205, the transistor 206, and the transistor 207. As a Si transistor, an LTPS transistor can be used, for example.

The transistor included in the circuit 164 and the transistor included in the pixel portion 162 may have the same structure or different structures. A plurality of transistors included in the circuit 164 may have the same structure or two or more kinds of structures. Similarly, a plurality of transistors included in the pixel portion 162 may have the same structure or two or more kinds of structures.

A connection portion 204 is provided in a region of the substrate 151 not overlapping with the substrate 152. In the connection portion 204, the wiring 165 is electrically connected to the FPC 172 through a conductive layer 166 and a connection layer 242. On the top surface of the connection portion 204, the conductive layer 166 obtained by processing the same conductive film as the pixel electrode 191 is exposed. Thus, the connection portion 204 and the FPC 172 can be electrically connected to each other through the connection layer 242.

A variety of optical members can be arranged on the outer surface of the substrate 152. Examples of the optical members include a polarizing plate, a retardation plate, a light diffusion layer (e.g., a diffusion film), an anti-reflection layer, and a light-condensing film. Furthermore, an antistatic film inhibiting the attachment of dust, a water repellent film inhibiting the attachment of stain, a hard coat film inhibiting generation of a scratch caused by the use, a shock absorbing layer, or the like may be provided on the outer surface of the substrate 152.

For each of the substrate 151 and the substrate 152, glass, quartz, ceramic, sapphire, a resin, or the like can be used. When a flexible material is used for the substrate 151 and the substrate 152, the flexibility of the display device can be increased.

As the adhesive layer, a variety of curable adhesives, e.g., a photocurable adhesive such as an ultraviolet curable adhesive, a reactive curable adhesive, a thermosetting adhesive, and an anaerobic adhesive can be used. Examples of these adhesives include an epoxy resin, an acrylic resin, a silicone resin, a phenol resin, a polyimide resin, an imide resin, a PVC (polyvinyl chloride) resin, a PVB (polyvinyl butyral) resin, and an EVA (ethylene vinyl acetate) resin. In particular, a material with low moisture permeability, such as an epoxy resin, is preferred. Alternatively, a two-component resin may be used. An adhesive sheet or the like may be used.

As the connection layer, an anisotropic conductive film (ACF), an anisotropic conductive paste (ACP), or the like can be used.

Examples of materials that can be used for a gate, a source, and a drain of a transistor and conductive layers such as a variety of wirings and electrodes included in a display device include metals such as aluminum, titanium, chromium, nickel, copper, yttrium, zirconium, molybdenum, silver, tantalum, or tungsten, and an alloy containing any of these metals as its main component. A film containing any of these materials can be used as a single layer or in a stacked-layer structure.

As a light-transmitting conductive material, a conductive oxide such as indium oxide, indium tin oxide, indium zinc oxide, zinc oxide, or zinc oxide containing gallium, or graphene can be used. Alternatively, a metal material such as gold, silver, platinum, magnesium, nickel, tungsten, chromium, molybdenum, iron, cobalt, copper, palladium, or titanium, or an alloy material containing the metal material can be used. Further alternatively, a nitride of the metal material (e.g., titanium nitride) may be used. Note that in the case of using the metal material or the alloy material (or the nitride thereof), the thickness is preferably set small enough to be able to transmit light. A stacked film of any of the above materials can be used as a conductive layer. For example, a stacked film of indium tin oxide and an alloy of silver and magnesium is preferably used, in which case the conductivity can be increased. These materials can also be used for conductive layers such as a variety of wirings and electrodes included in a display device, or conductive layers (conductive layers functioning as a pixel electrode or a common electrode) included in a light-emitting element and a light-emitting and light-receiving element.

Examples of an insulating material that can be used for each insulating layer include a resin such as an acrylic resin and an epoxy resin, and an inorganic insulating material such as silicon oxide, silicon oxynitride, silicon nitride oxide, silicon nitride, and aluminum oxide.

<Display Device 100B>

Figure 32:
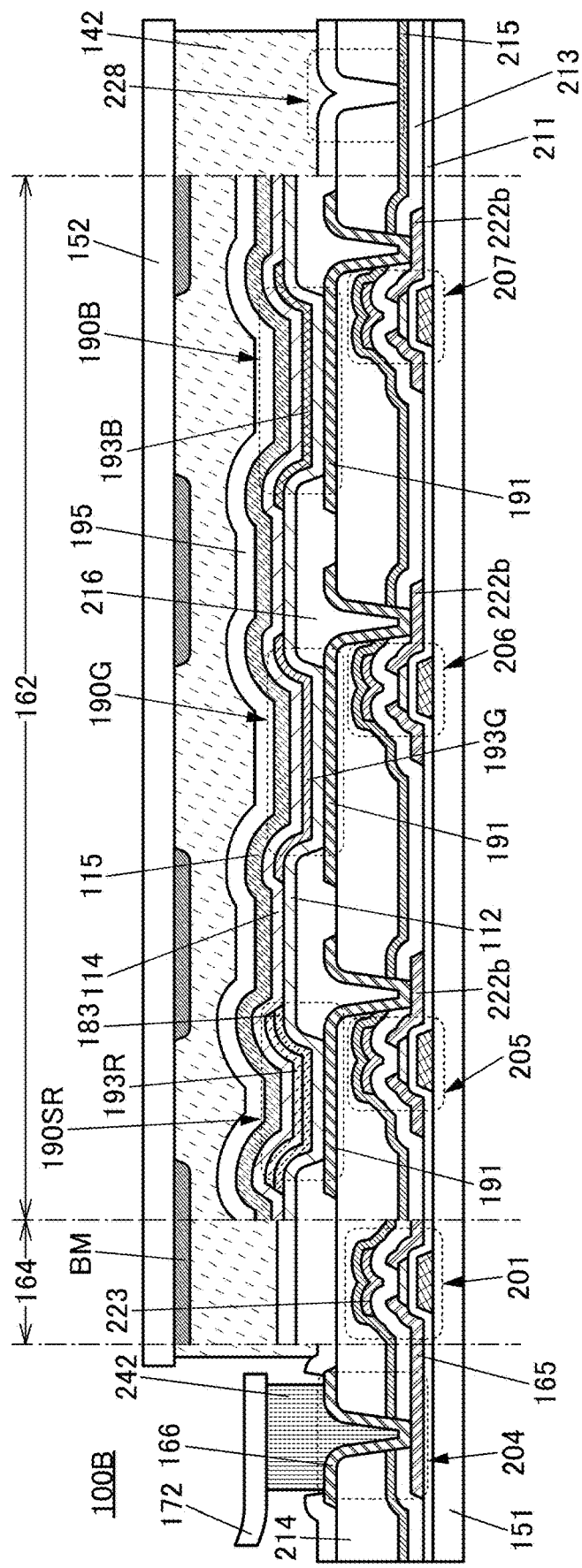
FIG. 32 is a cross-sectional view illustrating an example of a display device that can be used for an electronic device.

FIG. 32 is a cross-sectional view of a display device 100B.

The display device 100B is different from the display device 100A mainly in including a protective layer 195. Detailed description of a structure similar to that of the display device 100A is omitted.

Providing the protective layer 195 that covers the light-emitting element 190B, the light-emitting element 190G, and the light-emitting and light-receiving element 190SR can inhibit entry of impurities such as water into the light-emitting element 190B, the light-emitting element 190G, and the light-emitting and light-receiving element 190SR, leading to an increase in the reliability of the light-emitting element 190B, the light-emitting element 190G, and the light-emitting and light-receiving element 190SR.

In the region 228 in the vicinity of an end portion of the display device 100B, the insulating layer 215 and the protective layer 195 are preferably in contact with each other through an opening in the insulating layer 214. In particular, the inorganic insulating film included in the insulating layer 215 and the inorganic insulating film included in the protective layer 195 are preferably in contact with each other. Thus, entry of impurities from the outside into the pixel portion 162 through the organic insulating film can be inhibited. Consequently, the reliability of the display device 100B can be increased.

The protective layer 195 may have a single-layer structure or a stacked-layer structure; for example, the protective layer 195 may have a three-layer structure including an inorganic insulating layer over the common electrode 115, an organic insulating layer over the inorganic insulating layer, and an inorganic insulating layer over the organic insulating layer. In this case, an end portion of the inorganic insulating film preferably extends beyond an end portion of the organic insulating film.

Furthermore, a lens may be provided in a region overlapping with the light-emitting and light-receiving element 190SR. Thus, the sensitivity and accuracy of a sensor using the light-emitting and light-receiving element 190SR can be increased.

The lens preferably has a refractive index higher than or equal to 1.3 and lower than or equal to 2.5. The lens can be formed using at least one of an inorganic material and an organic material. For example, a material containing a resin can be used for the lens. Moreover, a material containing at least one of an oxide and a sulfide can be used for the lens.

Specifically, a resin containing chlorine, bromine, or iodine, a resin containing a heavy metal atom, a resin having an aromatic ring, a resin containing sulfur, or the like can be used for the lens. Alternatively, a material containing a resin and nanoparticles of a material having a higher refractive index than the resin can be used for the lens. Titanium oxide, zirconium oxide, or the like can be used for the nanoparticles.

In addition, cerium oxide, hafnium oxide, lanthanum oxide, magnesium oxide, niobium oxide, tantalum oxide, titanium oxide, yttrium oxide, zinc oxide, an oxide containing indium and tin, an oxide containing indium, gallium, and zinc, or the like can be used for the lens. Alternatively, zinc sulfide or the like can be used for the lens.

In the display device 100B, the protective layer 195 and the substrate 152 are bonded to each other with the adhesive layer 142. The adhesive layer 142 is provided to overlap with the light-emitting element 190B, the light-emitting element 190G, and the light-emitting and light-receiving element 190SR; that is, the display device 100B employs a solid sealing structure.

<Display Device 100C>

FIG. 33A is a cross-sectional view of a display device 100C.

The display device 100C is different from the display device 100B in transistor structures.

The display device 100C includes a transistor 208, a transistor 209, and a transistor 210 over the substrate 151.

The transistor 208, the transistor 209, and the transistor 210 each include the conductive layer 221 functioning as a gate, the insulating layer 211 functioning as a gate insulating layer, a semiconductor layer including a channel formation region $231i$ and a pair of low-resistance regions $231n$, the conductive layer $222a$ connected to one of the pair of low-resistance regions $231n$, the conductive layer $222b$ connected to the other of the pair of low-resistance regions $231n$, an insulating layer 225 functioning as a gate insulating layer, the conductive layer 223 functioning as a gate, and the insulating layer 215 covering the conductive layer 223. The insulating layer 211 is positioned between the conductive layer 221 and the channel formation region $231i$. The insulating layer 225 is positioned between the conductive layer 223 and the channel formation region $231i$.

The conductive layer $222a$ and the conductive layer $222b$ are connected to the corresponding low-resistance regions $231n$ through openings provided in the insulating layer 225 and the insulating layer 215. One of the conductive layer $222a$ and the conductive layer $222b$ functions as a source, and the other functions as a drain.

The pixel electrode 191 of the light-emitting element 190G is electrically connected to one of the pair of low-resistance regions 231n of the transistor 208 through the conductive layer 222b.

The pixel electrode 191 of the light-emitting and light-receiving element 190SR is electrically connected to the other of the pair of low-resistance regions 231n of the transistor 209 through the conductive layer 222b.

FIG. 33A illustrates an example where the insulating layer 225 covers the top surface and a side surface of the semiconductor layer. Meanwhile, in a transistor 202 illustrated in FIG. 33B, the insulating layer 225 overlaps with the channel formation region 231i of the semiconductor layer 231 and does not overlap with the low-resistance regions 231n. The structure illustrated in FIG. 33B can be obtained by processing the insulating layer 225 using the conductive layer 223 as a mask, for example. In FIG. 33B, the insulating layer 215 is provided to cover the insulating layer 225 and the conductive layer 223, and the conductive layer 222a and the conductive layer 222b are connected to the low-resistance regions 231n through openings in the insulating layer 215. Furthermore, an insulating layer 218 covering the transistor may be provided. In addition, the display device 100C is different from the display device 100B in that neither the substrate 151 nor the substrate 152 is included and a substrate 153, a substrate 154, an adhesive layer 155, and an insulating layer 212 are included.

The substrate 153 and the insulating layer 212 are bonded to each other with the adhesive layer 155. The substrate 154 and the protective layer 195 are bonded to each other with the adhesive layer 142.

The display device 100C is fabricated in such a manner that the insulating layer 212, the transistor 208, the transistor 209, the transistor 210, the light-emitting and light-receiving element 190SR, the light-emitting element 190G, and the like which are formed over a formation substrate are transferred onto the substrate 153. The substrate 153 and the substrate 154 preferably have flexibility. Accordingly, the flexibility of the display device 100C can be increased.

The inorganic insulating film that can be used as the insulating layer 211, the insulating layer 213, and the insulating layer 215 can be used as the insulating layer 212.

<Display Device 100D>

Figure 34A:
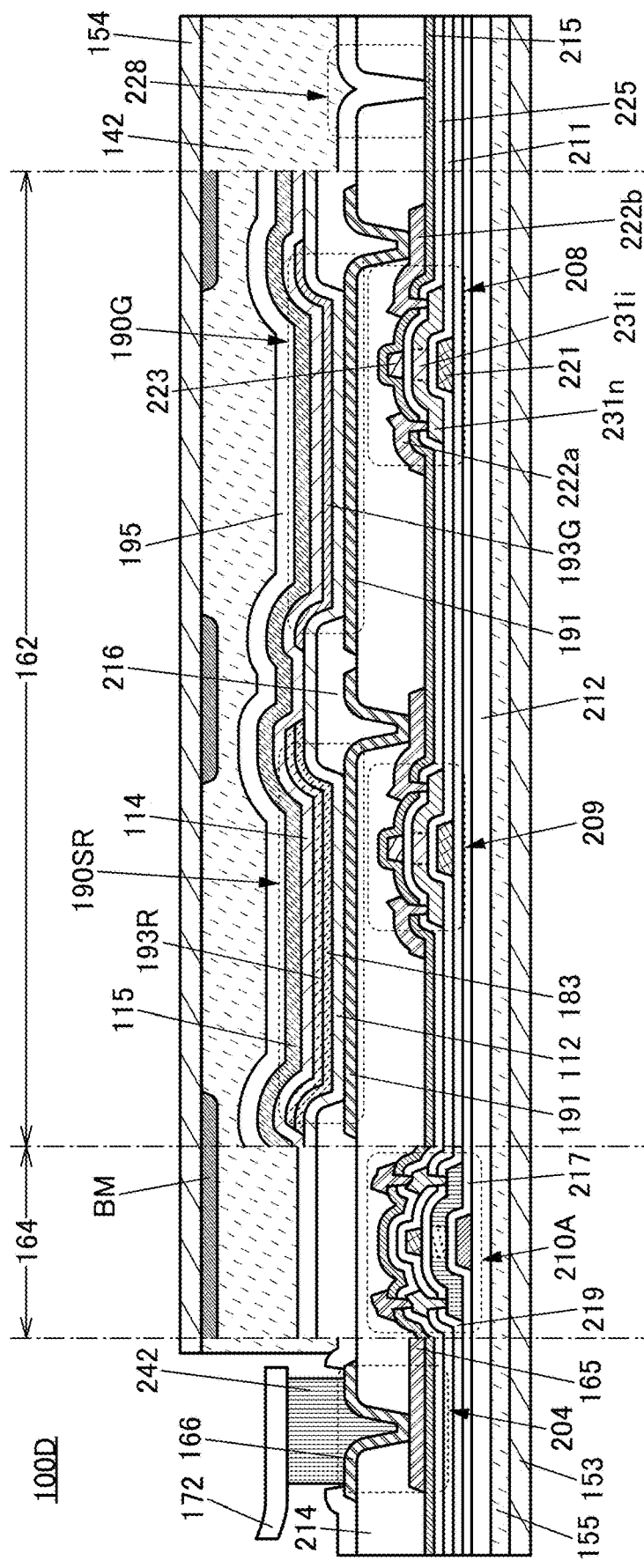
FIG. 34A is a diagram illustrating an example of an electronic device.

FIG. 34A is a cross-sectional view of a display device 100D.

The display device 100D is different from the display device 100C in the structure of the transistor 210.

Figure 34B:
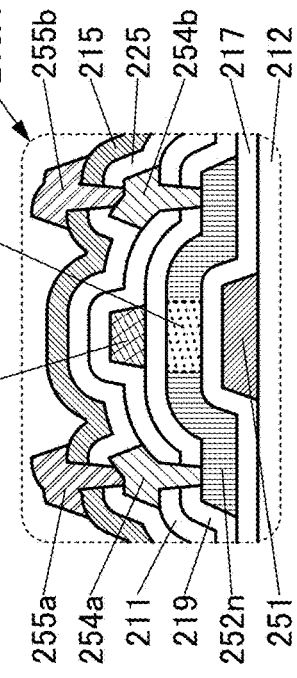
FIG. 34B is a cross-sectional view illustrating a transistor example.

The display device 100D includes the transistor 208, the transistor 209, and a transistor 210A. An enlarged view of the transistor 210A is illustrated in FIG. 34B.

A semiconductor layer of the transistor 210A is formed on a plane different from the plane where the semiconductor layers of the transistor 208 and the transistor 209 are formed. For example, an LTPS transistor can be used as the transistor 210A, and OS transistors can be used as the transistor 208 and the transistor 209.

The transistor 210A includes a conductive layer 251 functioning as a bottom gate, an insulating layer 217 functioning as a first gate insulating layer, a semiconductor layer including a channel formation region 252i and a pair of low-resistance regions 252n, a conductive layer 254a and a conductive layer 254b connected to one of the pair of low-resistance regions 252n, the conductive layer 254b connected to the other of the pair of low-resistance regions 252n, an insulating layer 219 functioning as a second gate insulating layer, a conductive layer 253 functioning as a top gate, and the insulating layer 211 covering the conductive layer 253.

The inorganic insulating film that can be used as the insulating layer 211 and the insulating layer 225 can be used as the insulating layer 217 and the insulating layer 219.

The conductive layer 254a and the conductive layer 254b are each electrically connected to the low-resistance region 252n through an opening provided in the insulating layer 219 and the insulating layer 211. One of the conductive layer 254a and the conductive layer 254b functions as a source and the other functions as a drain.

Over the transistor 210A, the insulating layer 225 and the insulating layer 215 functioning as protective layers are provided. A conductive layer 255a and a conductive layer 255b are electrically connected to the conductive layer 254a and the conductive layer 254b, respectively, through openings provided in the insulating layer 225 and the insulating layer 215.

Although FIG. 34A illustrates the structure where the conductive layer 255a is electrically connected to one of the pair of low-resistance regions 252n through the conductive layer 254a and the conductive layer 255b is electrically connected to the other of the pair of low-resistance regions 252n through the conductive layer 254b, one embodiment of the present invention is not limited to this structure. A structure without the conductive layer 254a and the conductive layer 254b, where the conductive layer 255a is in contact with one of the pair of low-resistance regions 252n and the conductive layer 255b is in contact with the other of the pair of low-resistance regions 252n, may also be employed.

In the structure illustrated in FIG. 34A, the conductive layer 253 is provided on the same plane as the plane where the bottom gate of the transistor 208 and the bottom gate of the transistor 209 are provided. The conductive layer 253 can be formed using the same material as the bottom gate of the transistor 208 and the bottom gate of the transistor 209. Furthermore, the conductive layer 253 is preferably formed by processing the same conductive film as the bottom gate of the transistor 208 and the bottom gate of the transistor 209. By formation through processing of the same conductive film, the process can be simplified.

In the structure illustrated in FIG. 34A, the conductive layer 255a and the conductive layer 255b are provided on the same plane as the plane where the source and the drain of the transistor 208 and the source and the drain of the transistor 209 are provided. The conductive layer 255a and the conductive layer 255b can be formed using the same material as the source and the drain of the transistor 208 and the source and the drain of the transistor 209. Furthermore, the conductive layer 255a and the conductive layer 255b are preferably formed by processing the same conductive film as the source and the drain of the transistor 208 and the source and the drain of the transistor 209. By formation through processing of the same conductive film, the process can be simplified.

In the display device of this embodiment, a subpixel exhibiting any of the colors includes a light-emitting and light-receiving element instead of a light-emitting element as described above. The light-emitting and light-receiving element functions as both a light-emitting element and a light-receiving element, whereby the pixel can be provided with a light-receiving function without an increase in the number of subpixels included in the pixel. Moreover, the pixel can be provided with a light-receiving function without a reduction in the resolution of the display device or the aperture ratio of each subpixel.

At least part of this embodiment can be implemented in combination with the other embodiments described in this specification as appropriate.

Embodiment 5

Described in this embodiment is a metal oxide (hereinafter also referred to as an oxide semiconductor) that can be used in an OS transistor described in the above embodiment.

The metal oxide preferably contains at least indium or zinc. In particular, indium and zinc are preferably contained. In addition, aluminum, gallium, yttrium, tin, or the like is preferably contained. Furthermore, one or more kinds selected from boron, silicon, titanium, iron, nickel, germanium, zirconium, molybdenum, lanthanum, cerium, neodymium, hafnium, tantalum, tungsten, magnesium, cobalt, and the like may be contained.

The metal oxide can be formed by a sputtering method, a chemical vapor deposition (CVD) method such as a metal organic chemical vapor deposition (MOCVD) method, an atomic layer deposition (ALD) method, or the like.

<Classification of Crystal Structure>

Amorphous (including a completely amorphous structure), CAAC (c-axis-aligned crystalline), nc (nanocrystalline), CAC (cloud-aligned composite), single-crystal, and polycrystalline (poly crystal) structures can be given as examples of a crystal structure of an oxide semiconductor.

A crystal structure of a film or a substrate can be analyzed with an X-ray diffraction (XRD) spectrum. For example, evaluation is possible using an XRD spectrum which is obtained by GIXD (Grazing-Incidence XRD) measurement. Note that a GIXD method is also referred to as a thin film method or a Seemann-Bohlin method.

For example, the XRD spectrum of a quartz glass substrate shows a peak with a substantially bilaterally symmetrical shape. On the other hand, the peak of the XRD spectrum of an IGZO film having a crystal structure has a bilaterally asymmetrical shape. The asymmetrical peak of the XRD spectrum clearly shows the existence of crystal in the film or the substrate. In other words, the crystal structure of the film or the substrate cannot be regarded as "amorphous" unless it has a bilaterally symmetrical peak in the XRD spectrum.

A crystal structure of a film or a substrate can also be evaluated with a diffraction pattern obtained by a nanobeam electron diffraction (NBED) method (such a pattern is also referred to as a nanobeam electron diffraction pattern). For example, a halo pattern is observed in the diffraction pattern of the quartz glass substrate, which indicates that the quartz glass substrate is in an amorphous state. Furthermore, not a halo pattern but a spot-like pattern is observed in the diffraction pattern of the IGZO film formed at room temperature. Thus, it is presumed that the IGZO film formed at room temperature is in an intermediate state, which is neither a crystal state nor an amorphous state, and it cannot be concluded that the IGZO film is in an amorphous state.

<Structure of Oxide Semiconductor>

Oxide semiconductors might be classified in a manner different from the above-described one when classified in terms of the structure. Oxide semiconductors are classified into a single crystal oxide semiconductor and a non-single-crystal oxide semiconductor, for example. Examples of the non-single-crystal oxide semiconductor include the above-described CAAC-OS and nc-OS. Other examples of the non-single-crystal oxide semiconductor include a polycrystalline oxide semiconductor, an amorphous-like oxide semiconductor (a-like OS), and an amorphous oxide semiconductor.

Here, the above-described CAAC-OS, nc-OS, and a-like OS are described in detail.

[CAAC-OS]

The CAAC-OS is an oxide semiconductor that has a plurality of crystal regions each of which has c-axis alignment in a particular direction. Note that the particular direction refers to the film thickness direction of a CAAC-OS film, the normal direction of the surface where the CAAC-OS film is formed, or the normal direction of the surface of the CAAC-OS film. The crystal region refers to a region having a periodic atomic arrangement. When an atomic arrangement is regarded as a lattice arrangement, the crystal region also refers to a region with a uniform lattice arrangement. The CAAC-OS has a region where a plurality of crystal regions are connected in the a-b plane direction, and the region has distortion in some cases. Note that distortion refers to a portion where the direction of a lattice arrangement changes between a region with a uniform lattice arrangement and another region with a uniform lattice arrangement in a region where a plurality of crystal regions are connected. That is, the CAAC-OS is an oxide semiconductor having c-axis alignment and having no clear alignment in the a-b plane direction.

Note that each of the plurality of crystal regions is formed of one or more fine crystals (crystals each of which has a maximum diameter of less than 10 nm). In the case where the crystal region is formed of one fine crystal, the maximum diameter of the crystal region is less than 10 nm. In the case where the crystal region is formed of a large number of fine crystals, the size of the crystal region may be approximately several tens of nanometers.

In the case of an In-M-Zn oxide (the element M is one or more kinds selected from aluminum, gallium, yttrium, tin, titanium, and the like), the CAAC-OS tends to have a layered crystal structure (also referred to as a layered structure) in which a layer containing indium (In) and oxygen (hereinafter, an In layer) and a layer containing the element M, zinc (Zn), and oxygen (hereinafter, an (M,Zn) layer) are stacked. Indium and the element M can be replaced with each other. Therefore, indium may be contained in the (M,Zn) layer. In addition, the element M may be contained in the In layer. Note that Zn may be contained in the In layer. Such a layered structure is observed as a lattice image in a high-resolution transmission electron microscope (TEM) image, for example.

When the CAAC-OS film is subjected to structural analysis by Out-of-plane XRD measurement with an XRD apparatus using $\theta/2\theta$ scanning, for example, a peak indicating c-axis alignment is detected at $2\theta$ of $31°$ or around $31°$. Note that the position of the peak indicating c-axis alignment (the value of $2\theta$) may change depending on the kind, composition, or the like of the metal element contained in the CAAC-OS.

For example, a plurality of bright spots are observed in the electron diffraction pattern of the CAAC-OS film. Note that one spot and another spot are observed point-symmetrically with a spot of the incident electron beam passing through a sample (also referred to as a direct spot) as the symmetric center.

When the crystal region is observed from the particular direction, a lattice arrangement in the crystal region is basically a hexagonal lattice arrangement; however, a unit lattice is not always a regular hexagon and is a non-regular hexagon in some cases. Furthermore, a pentagonal or heptagonal lattice arrangement, for example, is included in the distortion in some cases. Note that a clear crystal grain boundary (grain boundary) cannot be observed even in the vicinity of the distortion in the CAAC-OS. That is, formation of a crystal grain boundary is inhibited by the distortion of lattice arrangement. This is probably because the CAAC-OS can tolerate distortion owing to a low density of arrangement of oxygen atoms in the a-b plane direction, an interatomic bond distance changed by substitution of a metal atom, or the like.

A crystal structure in which a clear crystal grain boundary is observed is what is called polycrystal. It is highly probable that the crystal grain boundary becomes a recombination center and captures carriers and thus decreases the on-state current and field-effect mobility of a transistor, for example. Thus, the CAAC-OS in which no clear crystal grain boundary is observed is one of crystalline oxides having a crystal structure suitable for a semiconductor layer of a transistor. Note that Zn is preferably contained to form the CAAC-OS. For example, an In—Zn oxide and an In—Ga—Zn oxide are suitable because they can inhibit generation of a crystal grain boundary as compared with an In oxide.

The CAAC-OS is an oxide semiconductor with high crystallinity in which no clear crystal grain boundary is observed. Thus, in the CAAC-OS, a reduction in electron mobility due to the crystal grain boundary is less likely to occur. Moreover, since the crystallinity of an oxide semiconductor might be decreased by entry of impurities, formation of defects, or the like, the CAAC-OS can be regarded as an oxide semiconductor that has small amounts of impurities and defects (e.g., oxygen vacancies). Thus, an oxide semiconductor including the CAAC-OS is physically stable. Therefore, the oxide semiconductor including the CAAC-OS is resistant to heat and has high reliability. In addition, the CAAC-OS is stable with respect to high temperatures in the manufacturing process (what is called thermal budget). Accordingly, the use of the CAAC-OS for the OS transistor can extend the degree of freedom of the manufacturing process.

[nc-OS]

In the nc-OS, a microscopic region (e.g., a region with a size greater than or equal to 1 nm and less than or equal to 10 nm, in particular, a region with a size greater than or equal to 1 nm and less than or equal to 3 nm) has a periodic atomic arrangement. In other words, the nc-OS includes a fine crystal. Note that the size of the fine crystal is, for example, greater than or equal to 1 nm and less than or equal to 10 nm, particularly greater than or equal to 1 nm and less than or equal to 3 nm; thus, the fine crystal is also referred to as a nanocrystal. Furthermore, there is no regularity of crystal orientation between different nanocrystals in the nc-OS. Thus, the orientation in the whole film is not observed. Accordingly, the ne-OS cannot be distinguished from an a-like OS or an amorphous oxide semiconductor by some analysis methods. For example, when an nc-OS film is subjected to structural analysis by Out-of-plane XRD measurement with an XRD apparatus using θ/2θ scanning, a peak indicating crystallinity is not detected. Furthermore, a diffraction pattern like a halo pattern is observed when the nc-OS film is subjected to electron diffraction (also referred to as selected-area electron diffraction) using an electron beam with a probe diameter larger than the diameter of a nanocrystal (e.g., larger than or equal to 50 nm). Meanwhile, in some cases, a plurality of spots in a ring-like region with a direct spot as the center are observed in the obtained electron diffraction pattern when the nc-OS film is subjected to electron diffraction (also referred to as nanobeam electron diffraction) using an electron beam with a probe diameter nearly equal to or smaller than the diameter of a nanocrystal (e.g., larger than or equal to 1 nm and smaller than or equal to 30 nm).

[A-Like OS]

The a-like OS is an oxide semiconductor having a structure between those of the nc-OS and the amorphous oxide semiconductor. The a-like OS has a void or a low-density region. That is, the a-like OS has lower crystallinity than the nc-OS and the CAAC-OS. Moreover, the a-like OS has higher hydrogen concentration in the film than the nc-OS and the CAAC-OS.

<Structure of Oxide Semiconductor>

Next, the above-described CAC-OS is described in detail. Note that the CAC-OS relates to the material composition.

[CAC-OS]

The CAC-OS refers to one composition of a material in which elements constituting a metal oxide are unevenly distributed with a size greater than or equal to 0.5 nm and less than or equal to 10 nm, preferably greater than or equal to 1 nm and less than or equal to 3 nm, or a similar size, for example. Note that a state in which one or more metal elements are unevenly distributed and regions including the metal element(s) are mixed with a size greater than or equal to 0.5 nm and less than or equal to 10 nm, preferably greater than or equal to 1 nm and less than or equal to 3 nm, or a similar size in a metal oxide is hereinafter referred to as a mosaic pattern or a patch-like pattern.

In addition, the CAC-OS has a composition in which materials are separated into a first region and a second region to form a mosaic pattern, and the first regions are distributed in the film (this composition is hereinafter also referred to as a cloud-like composition). That is, the CAC-OS is a composite metal oxide having a composition in which the first regions and the second regions are mixed.

Note that the atomic ratios of In, Ga, and Zn to the metal elements contained in the CAC-OS in an In—Ga—Zn oxide are denoted by [In], [Ga], and [Zn], respectively. For example, the first region in the CAC-OS in the In—Ga—Zn oxide has [In] higher than that in the composition of the CAC-OS film. Moreover, the second region has [Ga] higher than that in the composition of the CAC-OS film. For example, the first region has higher [In] and lower [Ga] than the second region. Moreover, the second region has higher [Ga] and lower [In] than the first region.

Specifically, the first region includes indium oxide, indium zinc oxide, or the like as its main component. The second region includes gallium oxide, gallium zinc oxide, or the like as its main component. That is, the first region can be referred to as a region containing In as its main component. The second region can be referred to as a region containing Ga as its main component.

Note that a clear boundary between the first region and the second region cannot be observed in some cases.

In a material composition of a CAC-OS in an In—Ga—Zn oxide that contains In, Ga, Zn, and O, regions containing Ga as a main component are observed in part of the CAC-OS and regions containing In as a main component are observed in part thereof. These regions are randomly present to form a mosaic pattern. Thus, it is suggested that the CAC-OS has a structure in which metal elements are unevenly distributed.

The CAC-OS can be formed by a sputtering method under a condition where a substrate is not heated intentionally, for example. Moreover, in the case of forming the CAC-OS by a sputtering method, any one or more selected from an inert gas (typically, argon), an oxygen gas, and a nitrogen gas are used as a deposition gas. The ratio of the flow rate of the oxygen gas to the total flow rate of the deposition gas in deposition is preferably as low as possible, for example, the ratio of the flow rate of the oxygen gas to the total flow rate of the deposition gas in deposition is higher than or equal to 0% and lower than 30%, preferably higher than or equal to 0% and lower than or equal to 10%.

For example, energy dispersive X-ray spectroscopy (EDX) is used to obtain EDX mapping, and according to the EDX mapping, the CAC-OS in the In—Ga—Zn oxide has a structure in which the region containing In as its main component (the first region) and the region containing Ga as its main component (the second region) are unevenly distributed and mixed.

Here, the first region has a higher conductivity than the second region. In other words, when carriers flow through the first region, the conductivity of a metal oxide is exhibited. Accordingly, when the first regions are distributed in a metal oxide as a cloud, high field-effect mobility ($\mu$) can be achieved.

The second region has a higher insulating property than the first region. In other words, when the second regions are distributed in a metal oxide, leakage current can be inhibited.

Thus, in the case where a CAC-OS is used for a transistor, by the complementary action of the conductivity due to the first region and the insulating property due to the second region, the CAC-OS can have a switching function (On/Off function). A CAC-OS has a conducting function in part of the material and has an insulating function in another part of the material; as a whole, the CAC-OS has a function of a semiconductor. Separation of the conducting function and the insulating function can maximize each function. Accordingly, when the CAC-OS is used for a transistor, high on-state current ($I_{on}$), high field-effect mobility ($\mu$), and excellent switching operation can be achieved.

A transistor using a CAC-OS has high reliability. Thus, the CAC-OS is most suitable for a variety of semiconductor devices such as display devices.

An oxide semiconductor has various structures with different properties. Two or more kinds among the amorphous oxide semiconductor, the polycrystalline oxide semiconductor, the a-like OS, the CAC-OS, the nc-OS, and the CAAC-OS may be included in an oxide semiconductor of one embodiment of the present invention.

<Transistor Including Oxide Semiconductor>

Next, the case where the above oxide semiconductor is used for a transistor is described.

When the above oxide semiconductor is used for a transistor, a transistor with high field-effect mobility can be achieved. In addition, a transistor having high reliability can be achieved.

An oxide semiconductor having a low carrier concentration is preferably used for the transistor. For example, the carrier concentration of an oxide semiconductor is lower than or equal to $1\times10^{17}$ cm$^{-3}$, preferably lower than or equal to $1\times10^{15}$ cm$^{-3}$, further preferably lower than or equal to $1\times10^{13}$ cm$^{-3}$, still further preferably lower than or equal to $1\times10^{11}$ cm$^{-3}$, yet further preferably lower than $1\times10^{10}$ cm$^{-3}$, and higher than or equal to $1\times10^{-9}$ cm$^{-3}$. In order to reduce the carrier concentration of an oxide semiconductor film, the impurity concentration in the oxide semiconductor film is reduced so that the density of defect states can be reduced. In this specification and the like, a state with a low impurity concentration and a low density of defect states is referred to as a highly purified intrinsic or substantially highly purified intrinsic state. Note that an oxide semiconductor having a low carrier concentration may be referred to as a highly purified intrinsic or substantially highly purified intrinsic oxide semiconductor.

A highly purified intrinsic or substantially highly purified intrinsic oxide semiconductor film has a low density of defect states and thus has a low density of trap states in some cases.

Charge trapped by the trap states in the oxide semiconductor takes a long time to disappear and might behave like fixed charge. Thus, a transistor whose channel formation region is formed in an oxide semiconductor with a high density of trap states has unstable electrical characteristics in some cases.

Accordingly, in order to obtain stable electrical characteristics of a transistor, reducing impurity concentration in an oxide semiconductor is effective. In order to reduce the impurity concentration in the oxide semiconductor, it is preferable that the impurity concentration in an adjacent film be also reduced. Examples of impurities include hydrogen, nitrogen, an alkali metal, an alkaline earth metal, iron, nickel, and silicon.

<Impurity>

Here, the influence of each impurity in the oxide semiconductor is described.

When silicon or carbon, which is one of Group 14 elements, is contained in the oxide semiconductor, defect states are formed in the oxide semiconductor. Thus, the concentration of silicon or carbon in the oxide semiconductor and the concentration of silicon or carbon in the vicinity of an interface with the oxide semiconductor (the concentration obtained by secondary ion mass spectrometry (SIMS)) are each set lower than or equal to $2\times10^{18}$ atoms/cm$^3$, preferably lower than or equal to $2\times10^{17}$ atoms/cm$^3$.

When the oxide semiconductor contains an alkali metal or an alkaline earth metal, defect states are formed and carriers are generated in some cases. Accordingly, a transistor including an oxide semiconductor that contains an alkali metal or an alkaline earth metal tends to have normally-on characteristics. Thus, the concentration of an alkali metal or an alkaline earth metal in the oxide semiconductor, which is obtained by SIMS, is set lower than or equal to $1\times10^{18}$ atoms/cm$^3$, preferably lower than or equal to $2\times10^{16}$ atoms/cm$^3$.

An oxide semiconductor containing nitrogen easily becomes n-type by generation of electrons serving as carriers and an increase in carrier concentration. Thus, a transistor using an oxide semiconductor containing nitrogen as the semiconductor tends to have normally-on characteristics. When nitrogen is contained in the oxide semiconductor, a trap state is sometimes formed. This might make the electrical characteristics of the transistor unstable. Therefore, the concentration of nitrogen in the oxide semiconductor, which is obtained by SIMS, is set lower than $5\times10^{19}$ atoms/cm$^3$, preferably lower than or equal to $5\times10^{18}$ atoms/cm$^3$, further preferably lower than or equal to $1\times10^{18}$ atoms/cm$^3$, still further preferably lower than or equal to $5\times10^{17}$ atoms/cm$^3$.

Hydrogen contained in the oxide semiconductor reacts with oxygen bonded to a metal atom to be water, and thus forms an oxygen vacancy in some cases. Entry of hydrogen into the oxygen vacancy generates an electron serving as a carrier in some cases. Furthermore, bonding of part of hydrogen to oxygen bonded to a metal atom causes generation of an electron serving as a carrier in some cases. Thus, a transistor using an oxide semiconductor containing hydrogen is likely to have normally-on characteristics. Accordingly, hydrogen in the oxide semiconductor is preferably reduced as much as possible. Specifically, the hydrogen concentration in the oxide semiconductor, which is obtained by SIMS, is set lower than $1\times10^{20}$ atoms/cm$^3$, preferably lower than $1\times10^{19}$ atoms/cm$^3$, further preferably lower than $5\times10^{18}$ atoms/cm$^3$, still further preferably lower than $1\times10^{18}$ atoms/cm$^3$.

When an oxide semiconductor with sufficiently reduced impurities is used for the channel formation region of the transistor, stable electrical characteristics can be given.

At least part of this embodiment can be implemented in combination with the other embodiments described in this specification as appropriate.

Embodiment 6

In this embodiment, electronic devices of embodiments of the present invention are described with reference to FIG. 35A and FIG. 35B.

The electronic device of one embodiment of the present invention includes a pixel portion having a function of detecting light, and thus can perform biological authentication with the pixel portion or detect a touch operation (a contact or an approach) or the like. Consequently, the electronic device can have improved functionality and convenience.

Examples of electronic devices include a digital camera, a digital video camera, a digital photo frame, a mobile phone, a portable game console, a portable information terminal, and an audio reproducing device, in addition to electronic devices with a relatively large screen, such as a television device, a desktop or laptop personal computer, a monitor of a computer or the like, digital signage, and a large game machine such as a pachinko machine.

The electronic device in this embodiment may include a sensor (a sensor having a function of measuring force, displacement, position, speed, acceleration, angular velocity, rotational frequency, distance, light, liquid, magnetism, temperature, a chemical substance, sound, time, hardness, electric field, current, voltage, electric power, radiation, flow rate, humidity, gradient, oscillation, a smell, or infrared rays).

The electronic device in this embodiment can have a variety of functions. For example, the electronic device can have a function of displaying a variety of data (a still image, a moving image, a text image, and the like) on the pixel portion, a touch panel function, a function of displaying a calendar, date, time, and the like, a function of executing a variety of software (programs), a wireless communication function, and a function of reading out a program or data stored in a recording medium.

Figure 35A:
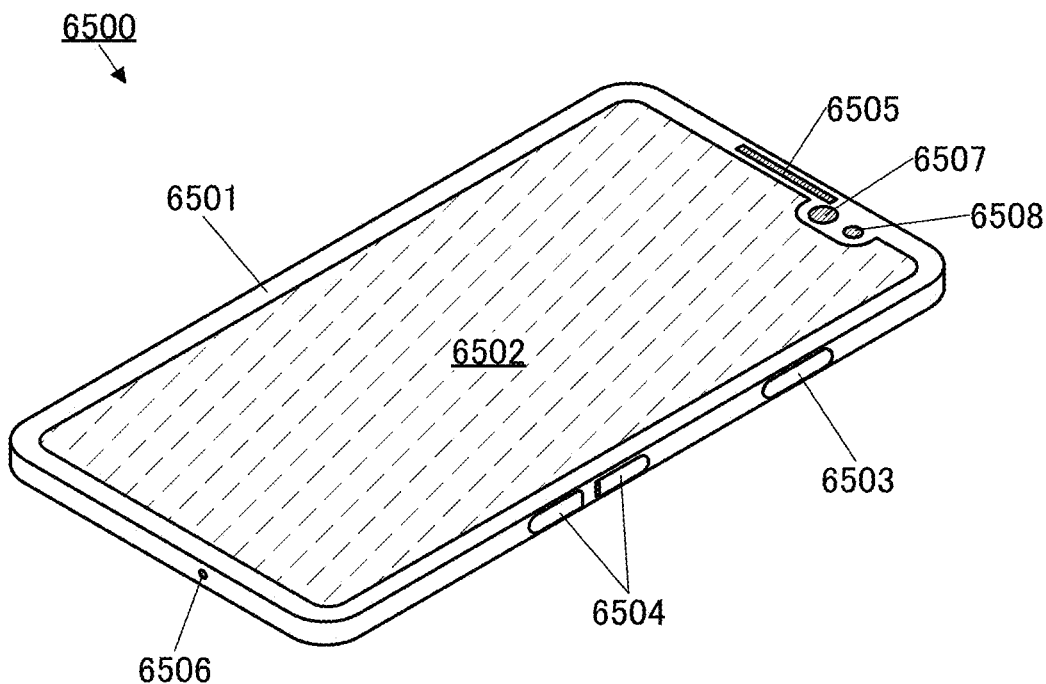
FIG. 35A and FIG. 35B are diagrams illustrating an example of an electronic device.

An electronic device 6500 illustrated in FIG. 35A is a wearable portable information terminal.

The electronic device 6500 includes a housing 6501, a pixel portion 6502, a power button 6503, buttons 6504, a speaker 6505, a microphone 6506, a camera 6507, a light source 6508, and the like. The pixel portion 6502 has a touch panel function.

The display device of one embodiment of the present invention can be used in the pixel portion 6502.

Figure 35B:
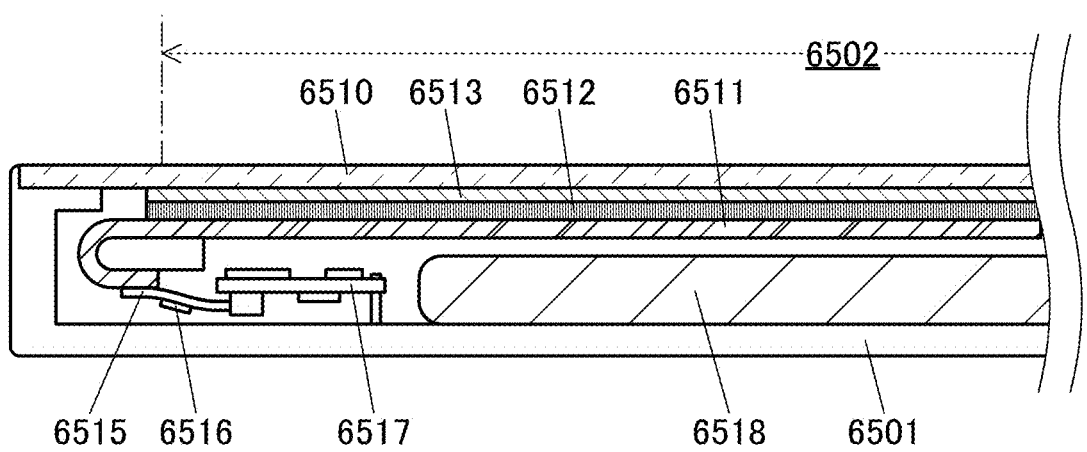

FIG. 35B is a schematic cross-sectional view including an end portion of the housing 6501 on the microphone 6506 side.

A protection member 6510 having a light-transmitting property is provided on the display surface side of the housing 6501, and a display panel 6511, an optical member 6512, a touch sensor panel 6513, a printed circuit board 6517, a battery 6518, and the like are provided in a space surrounded by the housing 6501 and the protection member 6510.

The display panel 6511, the optical member 6512, and the touch sensor panel 6513 are fixed to the protection member 6510 with an adhesive layer (not illustrated).

Part of the display panel 6511 is folded back in a region outside the pixel portion 6502, and an FPC 6515 is connected to the part that is folded back. An IC 6516 is mounted on the FPC 6515. The FPC 6515 is connected to a terminal provided on the printed circuit board 6517.

A flexible display of one embodiment of the present invention can be used as the display panel 6511. Thus, an extremely lightweight electronic device can be achieved. Since the display panel 6511 is extremely thin, the battery 6518 with high capacity can be mounted while an increase in the thickness of the electronic device is inhibited. An electronic device with a narrow frame can be achieved when part of the display panel 6511 is folded back so that the portion connected to the FPC 6515 is provided on the rear side of a pixel portion.

Using the display device of one embodiment of the present invention as the display panel 6511 allows image capturing on the pixel portion 6502. For example, a fingerprint image is captured by the display panel 6511; thus, fingerprint identification can be performed.

When the pixel portion 6502 further includes the touch sensor panel 6513, the pixel portion 6502 can be provided with a touch panel function. A variety of types such as a capacitive type, a resistive type, a surface acoustic wave type, an infrared type, an optical type, and a pressure-sensitive type can be used for the touch sensor panel 6513. Alternatively, the display panel 6511 may function as a touch sensor; in such a case, the touch sensor panel 6513 is not necessarily provided.

At least part of this embodiment can be implemented in combination with the other embodiments described in this specification as appropriate.

REFERENCE NUMERALS

C1: capacitor, C2: capacitor, M1: transistor, M2: transistor, M3: transistor, M5: transistor, M6: transistor, M7: transistor, M8: transistor, V1: wiring, V2: wiring, V3: wiring, 10: electronic device, 10A: electronic device, 11: pixel portion, 12: driver circuit portion, 13: driver circuit portion, 14: driver circuit portion, 15: circuit portion, 21: pixel, 21B: subpixel, 21G: subpixel, 21R: subpixel, 22: imaging pixel, 30: pixel, 100: display device, 100A: display device, 100B: display device, 100C: display device, 100D: display device, 112: common layer, 114: common layer, 115: common electrode, 142: adhesive layer, 143: space, 151: substrate, 152: substrate, 153: substrate, 154: substrate, 155: adhesive layer, 162: pixel portion, 164: circuit, 165: wiring, 166: conductive layer, 172: FPC, 173: IC, 183: active layer, 190B: light-emitting element, 190G: light-emitting element, 190SR: light-emitting and light-receiving element, 191: pixel electrode, 193: light-emitting layer, 193B: light-emitting layer, 193G: light-emitting layer, 193R: light-emitting layer, 195: protective layer, 200: display device, 200A: display device, 200B: display device, 201: transistor, 202: transistor, 204: connection portion, 205: transistor, 206: transistor, 207: transistor, 208: transistor, 209: transistor, 210: transistor, 210A: transistor, 211: insulating layer, 212: insulating layer, 213: insulating layer, 214: insulating layer, 215: insulating layer, 216: partition, 217: insulating layer, 218: insulating layer, 219: insulating layer, 221: conductive layer, 222*a*: conductive layer, 222*b*: conductive layer, 223: conductive layer, 225: insulating layer, 228: region, 231: semiconductor layer, 231*i*: channel formation region, 231*n*: low-resistance region, 242: connection layer, 251: conductive layer, 252*i*: channel formation region, 252*n*: low-resistance region, 253: conductive layer, 254*a*: conductive layer, 254*b*: conductive layer, 255*a*: conductive layer, 255*b*: conductive layer, 270B: light-emitting element, 270G: light-emitting element, 270PD: light-receiving element, 270R: light-emitting element, 270SR: light-emitting and light-receiving element, 271: pixel electrode, 273: active layer, 275: common electrode, 277: electrode, 278: electrode, 280A: pixel portion, 280B: pixel portion, 280C: pixel portion, 281: hole-injection layer, 281-2: hole-transport layer, 282: hole-transport layer, 282-1: hole-transport layer, 282-2: hole-transport layer, 283: light-emitting layer, 283B: light-emitting layer, 283G: light-emitting layer, 283R: light-emitting layer, 284: electron-transport layer, 285: electron-injection layer, 289: layer, 300A: display device, 300B: display device, 300C: display device, 300D: display device, 300E: display device, 300F: display device, 300G: display device, 300H: display device, 310: light-receiving element, 311: pixel electrode, 312: buffer layer, 313: active layer, 314: buffer layer, 315: common electrode, 318R: light-emitting and light-receiving layer, 321: visible light, 321B: light, 321G: light, 321R: light, 322: light, 323: light, 324: reflected light, 331: transistor, 332: transistor, 332B: transistor, 332G: transistor, 342: adhesive layer, 349: lens, 351: substrate, 352: substrate, 358: light-blocking layer, 390: light-emitting element, 390B: light-emitting element, 390G: light-emitting element, 390SR: light-emitting and light-receiving element, 391: pixel electrode, 391B: pixel electrode, 391G: pixel electrode, 392: buffer layer, 393: light-emitting layer, 393B: light-emitting layer, 393G: light-emitting layer, 393R: light-emitting layer, 394: buffer layer, 395: protective layer, 401: control portion, 402: pixel portion, 403: sensor portion, 404: memory portion, 405: display element, 405B: display element, 405G: display element, 405IR: display element, 405R: display element, 405W: display element, 405X: display element, 406: light-receiving element, 407: authentication portion, 408: touch sensor, 413R: light-emitting and light-receiving element, 414: insulating layer, 416: partition, 420: electronic device, 420A: electronic device, 422: pixel portion, 425: region, 426: image, 431: housing, 433: operation button, 435: band, 437: buckle, 438: light-emitting element, 438*a*: light-emitting element, 438*b*: light-emitting element, 439: light-receiving element, 451*a*: authentication information, 451*b*: authentication information, 461: wrist, 462: finger, 463: finger, 463*a*: finger, 463*b*: finger, 465: blood vessel, 467: fingerprint, 469: contact portion, 471: substrate, 472: substrate, 473: functional layer, 475: stylus, 477: path, 6500: electronic device, 6501: housing, 6502: pixel portion, 6503: power button, 6504: button, 6505: speaker, 6506: microphone, 6507: camera, 6508: light source, 6510: protective member, 6511: display panel, 6512: optical member, 6513: touch sensor panel, 6515: FPC, 6516: IC, 6517: printed circuit board, 6518: battery

The invention claimed is:

1. An electronic device comprising:
a pixel portion;
a sensor portion;
an authentication portion;
a memory portion; and
a control portion,
wherein the pixel portion comprises:
a first display element configured to emit one of blue light, green light, and red light;
a second display element configured to emit infrared light; and
a first light-receiving element,
wherein the first display element, the second display element, and the first light-receiving element are provided on a same surface,
wherein the sensor portion comprises:
a third display element configured to emit infrared light; and
a second light-receiving element,
wherein the sensor portion is configured to obtain first authentication information by capturing an image of a first target object using light which is emitted by the third display element and incident on the second light-receiving element,
wherein the first authentication information is one of a vein shape, a pulse wave, a blood glucose level, a cholesterol concentration in blood, and a neutral fat concentration in the blood,
wherein the authentication portion is configured to perform first authentication processing using the first authentication information,
wherein the pixel portion is configured to turn on the first display element and the second display element after the authentication portion has determined that the first authentication information matches data of a user retained in the memory portion,
wherein, after the first display element and the second display element have been turned on, the pixel portion is configured to obtain second authentication information by capturing an image of a second target object touching the pixel portion using light which is emitted by the second display element and incident on the first light-receiving element,
wherein the authentication portion is configured to perform second authentication processing using the second authentication information,
wherein, after the authentication portion has determined that the second authentication information matches data of the user retained in the memory portion, the control portion is configured to unlock the electronic device,
wherein the first display element and the second display element are configured to emit light in a first direction, and
wherein the third display element is configured to emit light in a second direction opposite the first direction.

2. The electronic device according to claim 1,
wherein the pixel portion comprises a first transistor,
wherein the first transistor is electrically connected to the second display element or the first light-receiving element, and
wherein the first transistor comprises a metal oxide in a channel formation region.

3. The electronic device according to claim 1,
wherein the pixel portion comprises a first transistor,
wherein the first transistor is electrically connected to the second display element or the first light-receiving element, and
wherein the first transistor comprises silicon in a channel formation region.

4. The electronic device according to claim 1,
wherein the pixel portion comprises a first transistor and a second transistor,
wherein the first transistor is electrically connected to one of the second display element and the first light-receiving element, wherein the second transistor is electrically connected to the other of the second display element and the first light-receiving element,
wherein the first transistor comprises a metal oxide in a channel formation region, and
wherein the second transistor comprises silicon in a channel formation region.

5. The electronic device according to claim 1,
wherein the pixel portion comprises a touch sensor,
wherein the touch sensor is configured to sense a position of the second target object touching the pixel portion, and
wherein the pixel portion is configured to turn on the second display element at and in the vicinity of the position.

6. An electronic device comprising:
a pixel portion;
a sensor portion;
an authentication portion;
a housing; and
a memory portion,
wherein the pixel portion comprises:
  a first display element configured to emit one of blue light, green light, and red light;
  a second display element configured to emit infrared light; and
  a first light-receiving element,
wherein the first display element, the second display element, and the first light-receiving element are provided on a same surface,
wherein the sensor portion comprises:
  a third display element configured to emit infrared light; and
  a second light-receiving element,
wherein the sensor portion is configured to obtain first authentication information by capturing an image of a first target object using light which is emitted by the third display element and incident on the second light-receiving element,
wherein the first authentication information is one of a vein shape, a pulse wave, a blood glucose level, a cholesterol concentration in blood, and a neutral fat concentration in the blood,
wherein the authentication portion is configured to perform first authentication processing using the first authentication information,
wherein the pixel portion is configured to turn on the first display element and the second display element after the authentication portion has determined that the first authentication information matches data of a user retained in the memory portion,
wherein, after the first display element and the second display element have been turned on, the pixel portion is configured to obtain second authentication information by capturing an image of a second target object touching the pixel portion using light which is emitted by the second display element and incident on the first light-receiving element,
wherein the authentication portion is configured to perform second authentication processing using the second authentication information,
wherein the housing comprises a first surface and a second surface opposite to the first surface,
wherein the pixel portion is positioned on the first surface, and
wherein the sensor portion is positioned on the second surface.

7. The electronic device according to claim 6,
wherein the pixel portion comprises a first transistor,
wherein the first transistor is electrically connected to the second display element or the first light-receiving element, and
wherein the first transistor comprises a metal oxide in a channel formation region.

8. An electronic device comprising:
a pixel portion;
a sensor portion;
an authentication portion; and
a memory portion,
wherein the pixel portion comprises:
  a first display element configured to emit infrared light; and
  a first light-receiving element,
wherein the sensor portion comprises:
  a second display element configured to emit infrared light; and
  a second light-receiving element,
wherein the sensor portion is configured to obtain first authentication information by capturing an image of a first target object using light which is emitted by the second display element and incident on the second light-receiving element,
wherein the first authentication information is one of a vein shape, a pulse wave, a blood glucose level, a cholesterol concentration in blood, and a neutral fat concentration in the blood,
wherein the authentication portion is configured to perform first authentication processing using the first authentication information,
wherein the pixel portion is configured to turn on the first display element after the authentication portion has determined that the first authentication information matches data of a user retained in the memory portion,
wherein, after the first display element has been turned on, the pixel portion is configured to obtain second authentication information by capturing an image of a second target object touching the pixel portion using light which is emitted by the first display element and incident on the first light-receiving element,
wherein the authentication portion is configured to perform second authentication processing using the second authentication information,
wherein the first display element is configured to emit light in a first direction, and
wherein the second display element is configured to emit light in a second direction opposite the first direction.

9. The electronic device according to claim 6,
wherein the pixel portion comprises a first transistor and a second transistor,
wherein the first transistor is electrically connected to one of the second display element and the first light-receiving element,
wherein the second transistor is electrically connected to the other of the second display element and the first light-receiving element,
wherein the first transistor comprises a metal oxide in a channel formation region, and
wherein the second transistor comprises silicon in a channel formation region.

10. The electronic device according to claim 6,
wherein the pixel portion comprises a touch sensor,
wherein the touch sensor is configured to sense a position of the second target object touching the pixel portion, and wherein the pixel portion is configured to turn on the second display element at and in the vicinity of the position.

11. The electronic device according to claim 8,
wherein the pixel portion comprises a first transistor,
wherein the first transistor is electrically connected to the first display element or the first light-receiving element, and
wherein the first transistor comprises silicon in a channel formation region.

12. The electronic device according to claim 11,
wherein the pixel portion comprises a first transistor,
wherein the first transistor is electrically connected to the first display element or the first light-receiving element, and
wherein the first transistor comprises a metal oxide in a channel formation region.

13. The electronic device according to claim 6,
wherein the pixel portion comprises a first transistor,
wherein the first transistor is electrically connected to the second display element or the first light-receiving element, and
wherein the first transistor comprises silicon in a channel formation region.

14. The electronic device according to claim 11,
wherein the pixel portion comprises a first transistor and a second transistor,
wherein the first transistor is electrically connected to one of the first display element and the first light-receiving element,
wherein the second transistor is electrically connected to the other of the first display element and the first light-receiving element,
wherein the first transistor comprises a metal oxide in a channel formation region, and
wherein the second transistor comprises silicon in a channel formation region.

15. The electronic device according to claim 11,
wherein the pixel portion comprises a touch sensor,
wherein the touch sensor is configured to sense a position of the second target object touching the pixel portion, and
wherein the pixel portion is configured to turn on the first display element at and in the vicinity of the position.

* * * * *